United States Patent
Munetsugu

(10) Patent No.: US 12,306,567 B2
(45) Date of Patent: May 20, 2025

(54) REPLENISHING SYSTEM

(71) Applicant: CANON KABUSHIKI KAISHA, Tokyo (JP)

(72) Inventor: Hiroyuki Munetsugu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/420,989

(22) Filed: Jan. 24, 2024

(65) Prior Publication Data

US 2024/0168425 A1     May 23, 2024

Related U.S. Application Data

(63) Continuation of application No. PCT/JP2022/028283, filed on Jul. 13, 2022.

(30) Foreign Application Priority Data

Aug. 6, 2021    (JP) ................................. 2021-130309
Dec. 2, 2021    (JP) ................................. 2021-196005

(51) Int. Cl.
    *G03G 15/00*       (2006.01)
    *G03G 15/08*       (2006.01)

(52) U.S. Cl.
    CPC ..... *G03G 15/5091* (2013.01); *G03G 15/0865* (2013.01); *G03G 15/5016* (2013.01); *G03G 2215/0695* (2013.01)

(58) Field of Classification Search
    CPC ........... G03G 15/0865; G03G 15/5016; G03G 15/5091

(Continued)

(56) References Cited

U.S. PATENT DOCUMENTS 8,160,478 B2    4/2012   Munetsugu et al.
8,165,493 B2    4/2012   Chadani et al.
(Continued)

FOREIGN PATENT DOCUMENTS

CN        106019890    * 11/2019
JP         2011-145384 A    7/2011
(Continued)

OTHER PUBLICATIONS

International Search Report and Written Opinion for International Patent Application No. PCT/JP2022/028283.
(Continued)

*Primary Examiner* — Hoan H Tran
(74) *Attorney, Agent, or Firm* — Venable LLP

(57) ABSTRACT

A replenishing system includes a first image forming apparatus including a first image forming portion, a first accommodating portion and a first mounting port, a second image forming apparatus including a second image forming portion, a second accommodating portion and a second mounting port different from the first mounting port in a shape, a first accommodating device including a first interface portion and accommodating a consumable agent, a second accommodating device including a second interface portion different from the first interface portion in a shape and accommodating a consumable agent. The first interface portion is mountable on the first mounting port, the consumable agent accommodated by the first accommodating device is capable of being replenished, the second interface portion is not mountable on the first mounting port, each of the first and second interface portions is mountable on the second mounting port, and the consumable agent accommodated by the first and second accommodating device are capable of being replenished each other.

23 Claims, 31 Drawing Sheets

(58) Field of Classification Search
USPC .................................................. 399/8, 12, 13
See application file for complete search history.

(56) References Cited

U.S. PATENT DOCUMENTS

| | | | |
|---|---|---|---|
| 8,559,849 B2 | 10/2013 | Suzuki et al. |
| 9,213,306 B2 | 12/2015 | Morioka et al. |
| 9,377,714 B2 | 6/2016 | Nakazawa et al. |
| 9,588,460 B2 | 3/2017 | Kasai et al. |
| 10,374,909 B2 | 8/2019 | Kawai et al. |
| 10,386,786 B2 | 8/2019 | Sato et al. |
| 10,459,402 B2 | 10/2019 | Kashiide et al. |
| 10,635,047 B2 | 4/2020 | Kamoshida et al. |
| 10,782,647 B2 | 9/2020 | Kashiide et al. |
| 11,067,950 B2 | 7/2021 | Kashiide et al. |
| 11,131,960 B2 | 9/2021 | Sato et al. |
| 11,132,155 B2 | 9/2021 | Fukusada et al. |
| 11,269,267 B2 | 3/2022 | Chick et al. |
| 11,307,529 B2 | 4/2022 | Sato et al. |
| 11,314,199 B2 | 4/2022 | Sato et al. |
| 11,353,822 B2 | 6/2022 | Kashiide et al. |
| 11,567,445 B2 | 1/2023 | Munetsugu et al. |
| 11,592,766 B2 | 2/2023 | Ozaki et al. |
| 11,662,673 B2 | 5/2023 | Ozaki et al. |
| 11,662,687 B2 | 5/2023 | Kashiide et al. |
| 11,693,355 B2 | 7/2023 | Sato et al. |
| 11,698,601 B2 | 7/2023 | Sato et al. |
| 11,720,301 B2 | 8/2023 | Fukusada et al. |
| 11,796,958 B2 | 10/2023 | Munetsugu et al. |
| 11,822,265 B2 | 11/2023 | Ozaki et al. |
| 11,960,239 B2 | 4/2024 | Kashiide et al. |
| 11,977,344 B2 | 5/2024 | Toba et al. |
| 2016/0139537 A1 | 5/2016 | Kasai et al. |
| 2017/0063646 A1 | 3/2017 | Kawai |
| 2021/0096793 A1 | 4/2021 | Fukusada |
| 2021/0116837 A1 | 4/2021 | Chick et al. |
| 2021/0373823 A1 | 12/2021 | Fukusada et al. |
| 2023/0096202 A1 | 3/2023 | Sato et al. |
| 2023/0176503 A1 | 6/2023 | Fukui et al. |
| 2023/0205129 A1 | 6/2023 | Suetsugu et al. |
| 2023/0244157 A1 | 8/2023 | Kubo et al. |
| 2023/0266695 A1 | 8/2023 | Munetsugu et al. |
| 2023/0297024 A1 | 9/2023 | Sato et al. |
| 2023/0324829 A1 | 10/2023 | Munetsugu et al. |
| 2023/0408970 A1 | 12/2023 | Munetsugu et al. |
| 2024/0036496 A1 | 2/2024 | Ozaki et al. |
| 2024/0045367 A1 | 2/2024 | Uoo et al. |
| 2024/0142913 A1 | 5/2024 | Sato et al. |

FOREIGN PATENT DOCUMENTS

| | | | |
|---|---|---|---|
| JP | 2014170052 | * | 9/2014 |
| JP | 2016-095375 A | | 5/2016 |
| JP | 2017-049767 A | | 9/2018 |
| JP | 2021-056289 A | | 4/2021 |
| WO | 2020/046338 A1 | | 3/2020 |

OTHER PUBLICATIONS

Co-pending U.S. Appl. No. 18/603,393, filed Mar. 13, 2024.
Co-pending U.S. Appl. No. 18/609,077, filed Mar. 19, 2024.
Co-pending U.S. Appl. No. 18/648,713, filed Apr. 29, 2024.
Co-pending U.S. Appl. No. 18/648,727, filed Apr. 29, 2024.
Co-pending U.S. Appl. No. 18/628,926, filed Apr. 8, 2024.

* cited by examiner

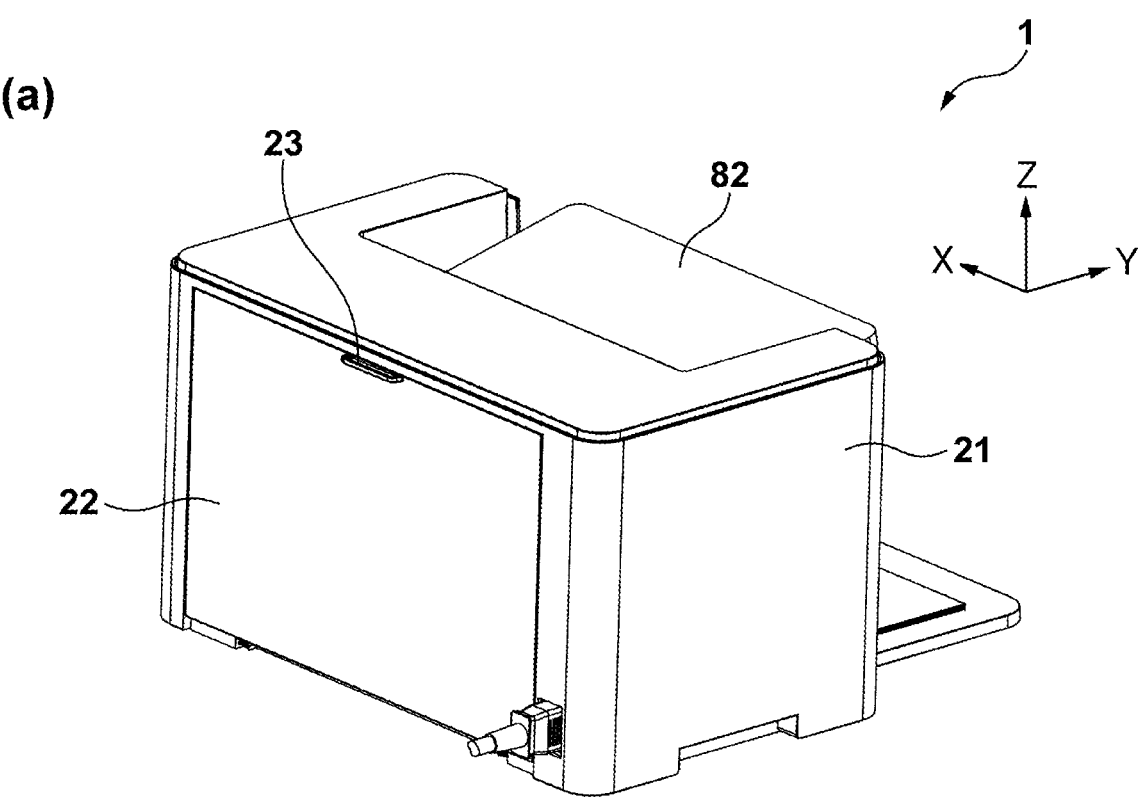
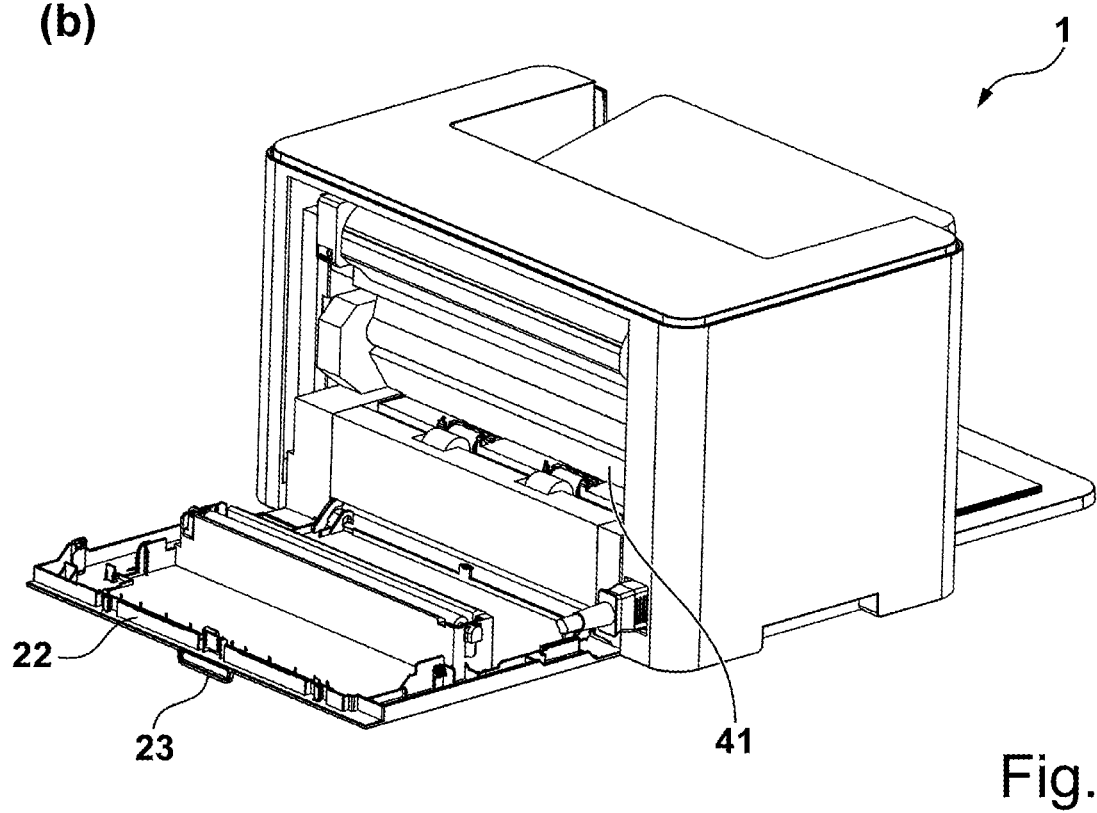
Fig. 1

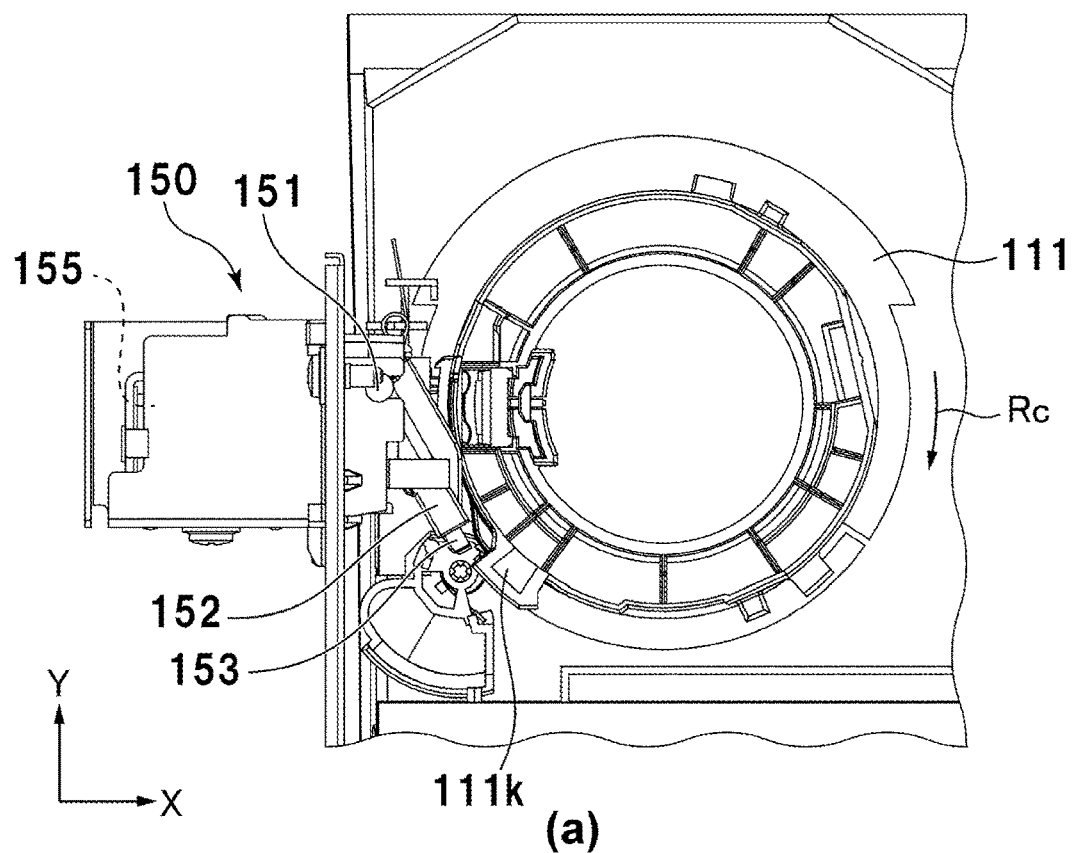
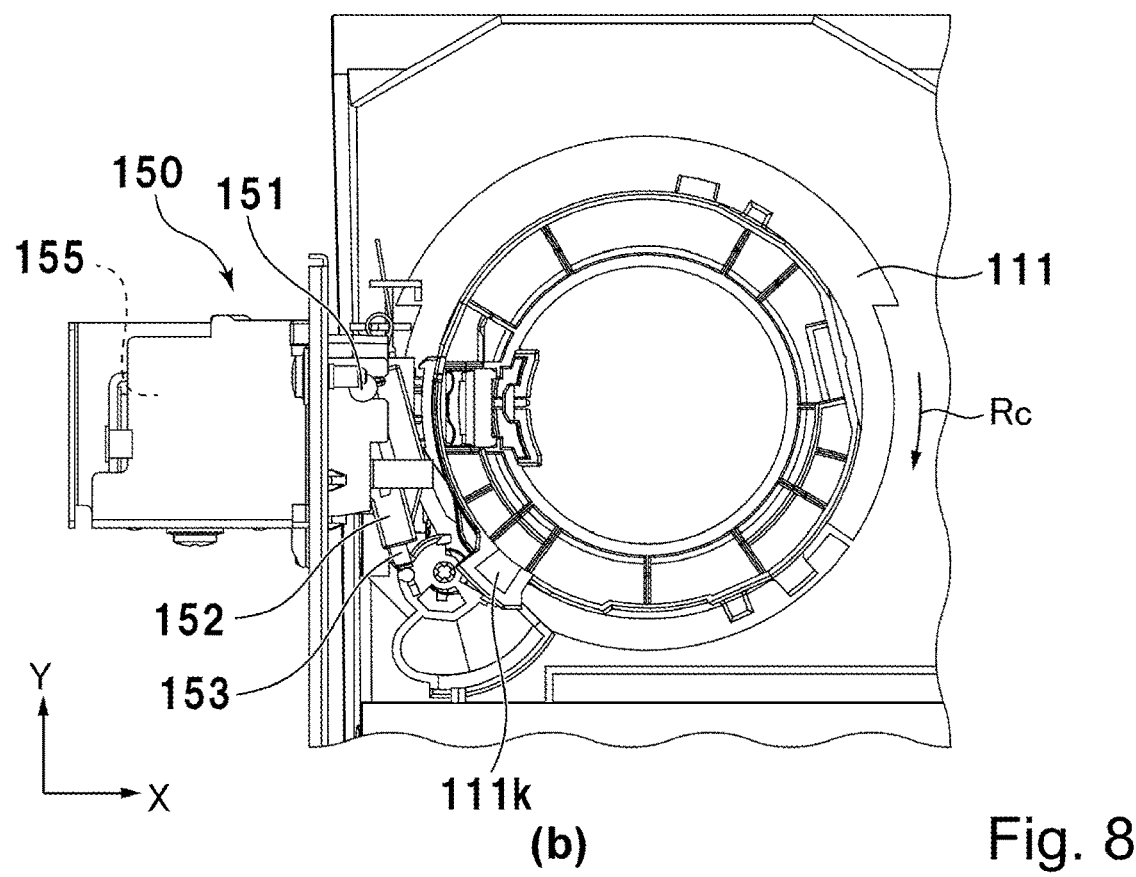
Fig. 8

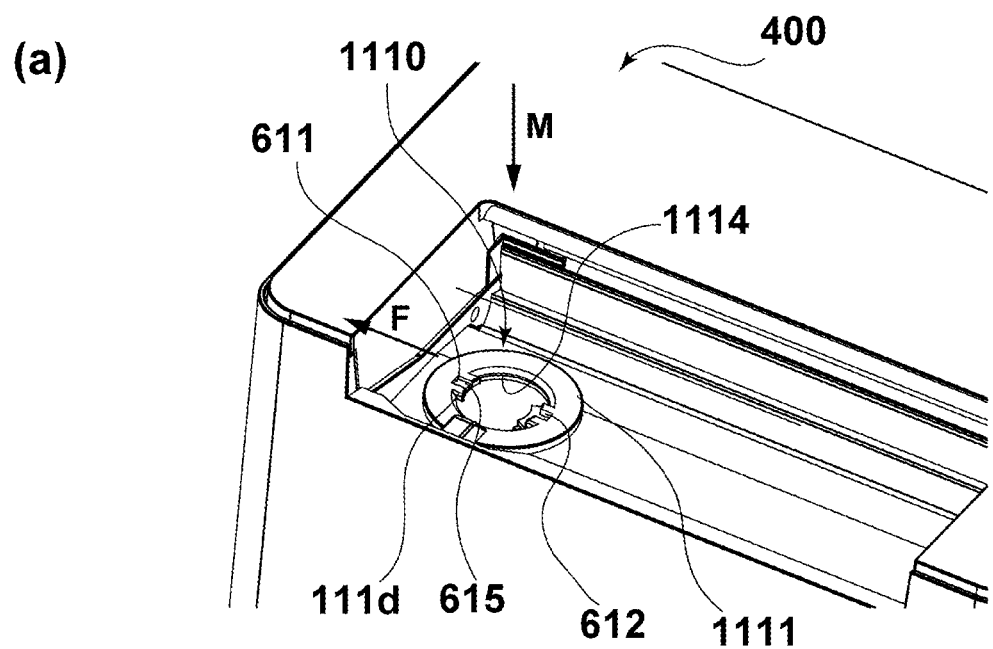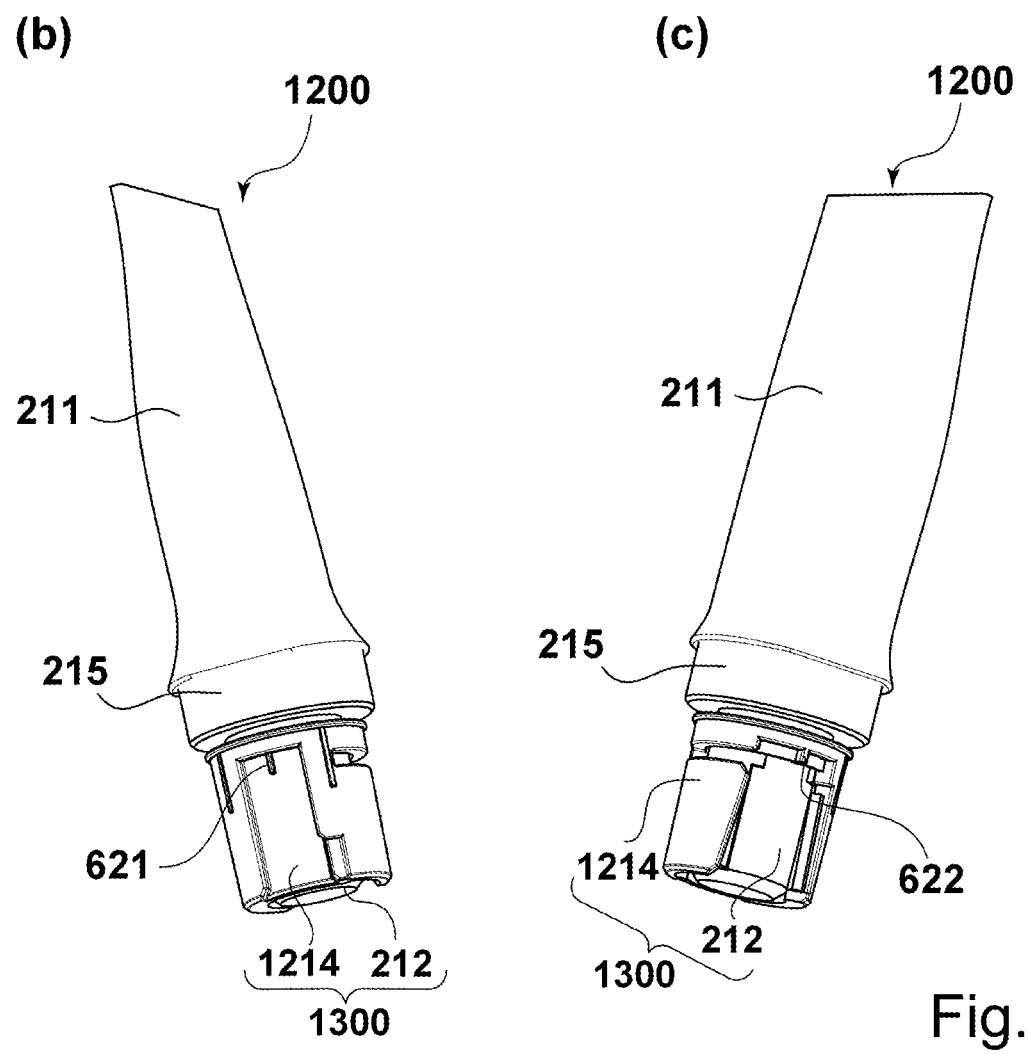
Fig. 10

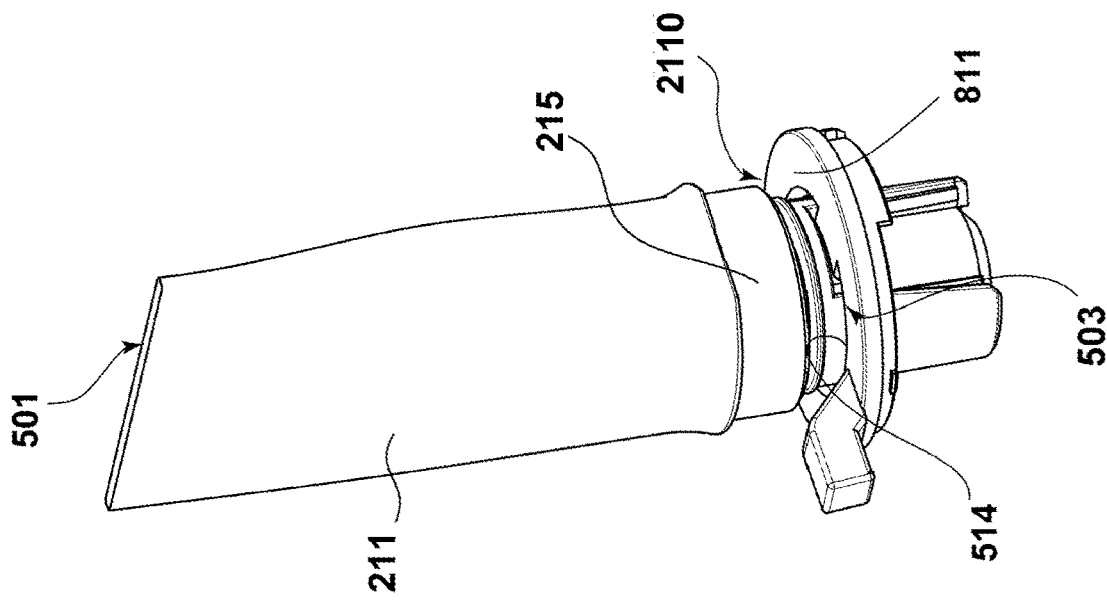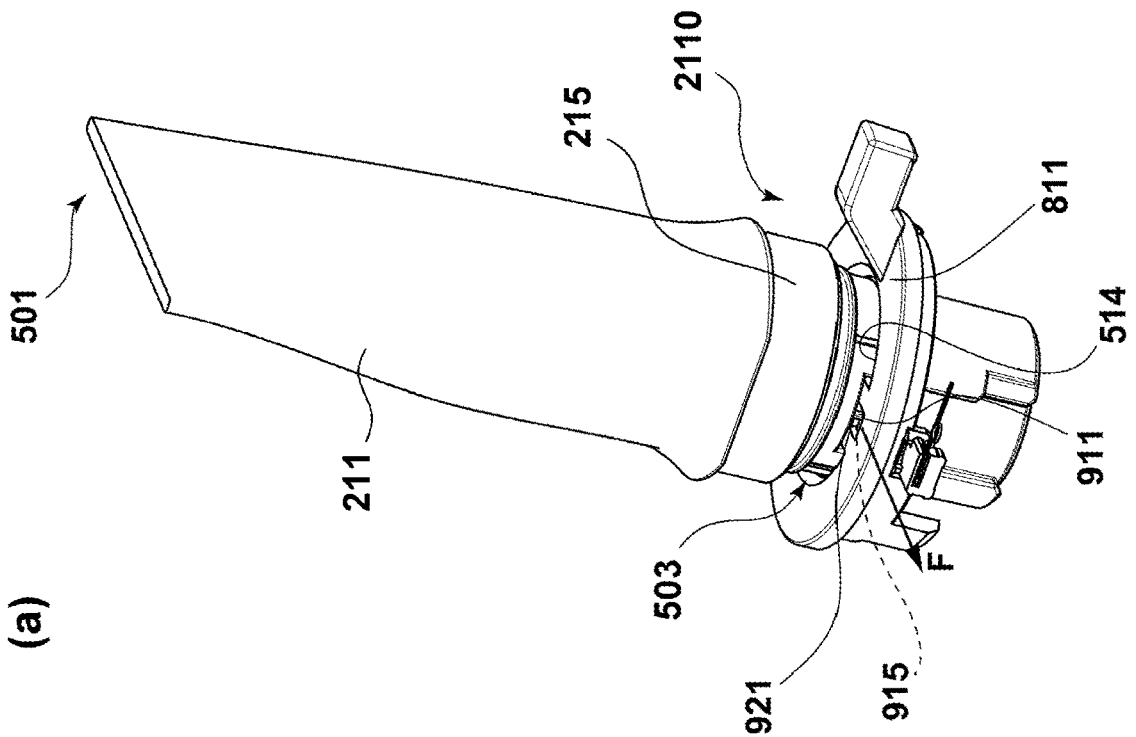
Fig. 16

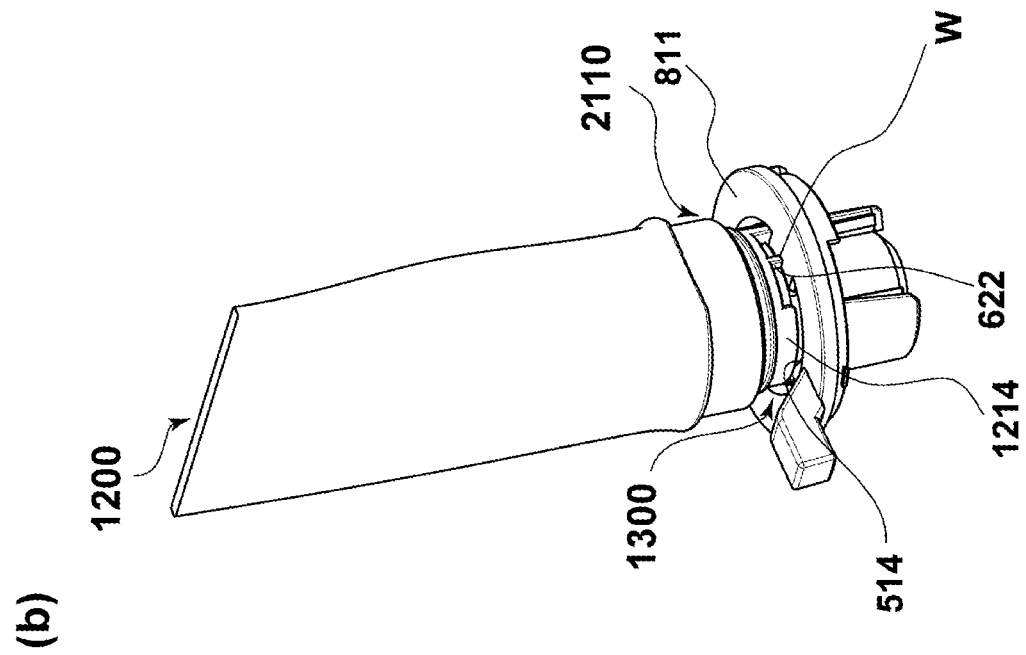
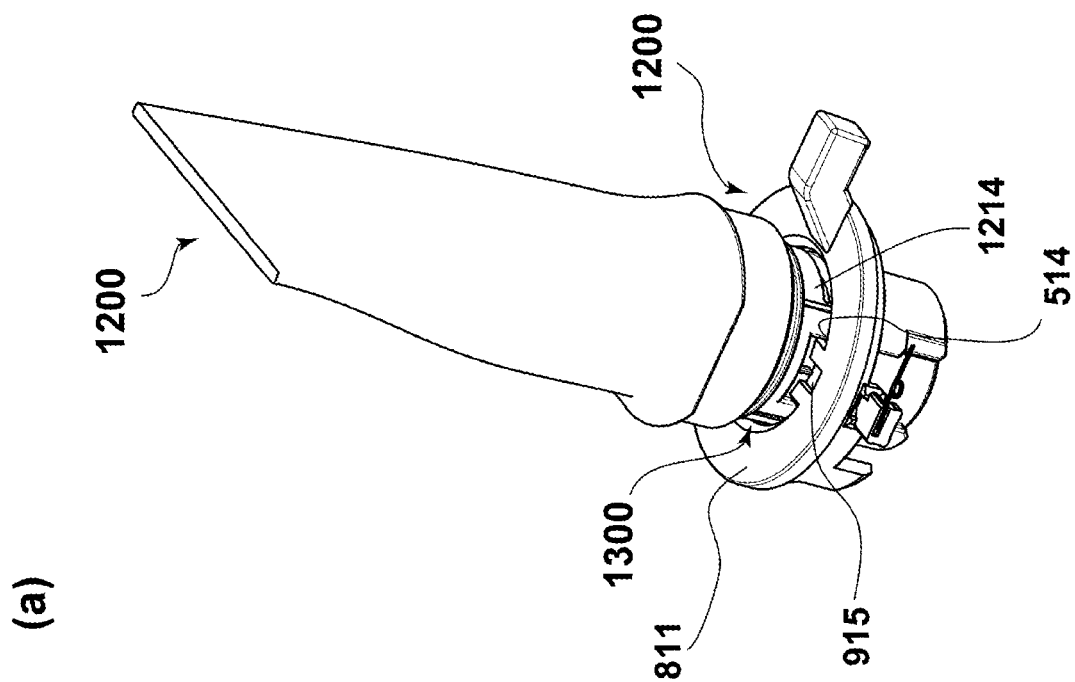
Fig. 17

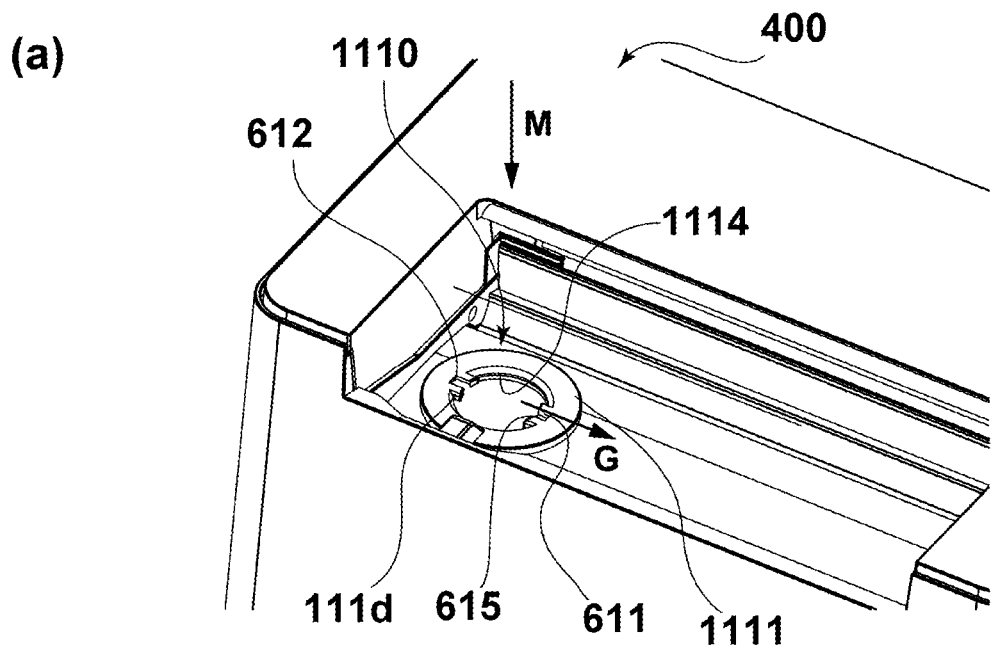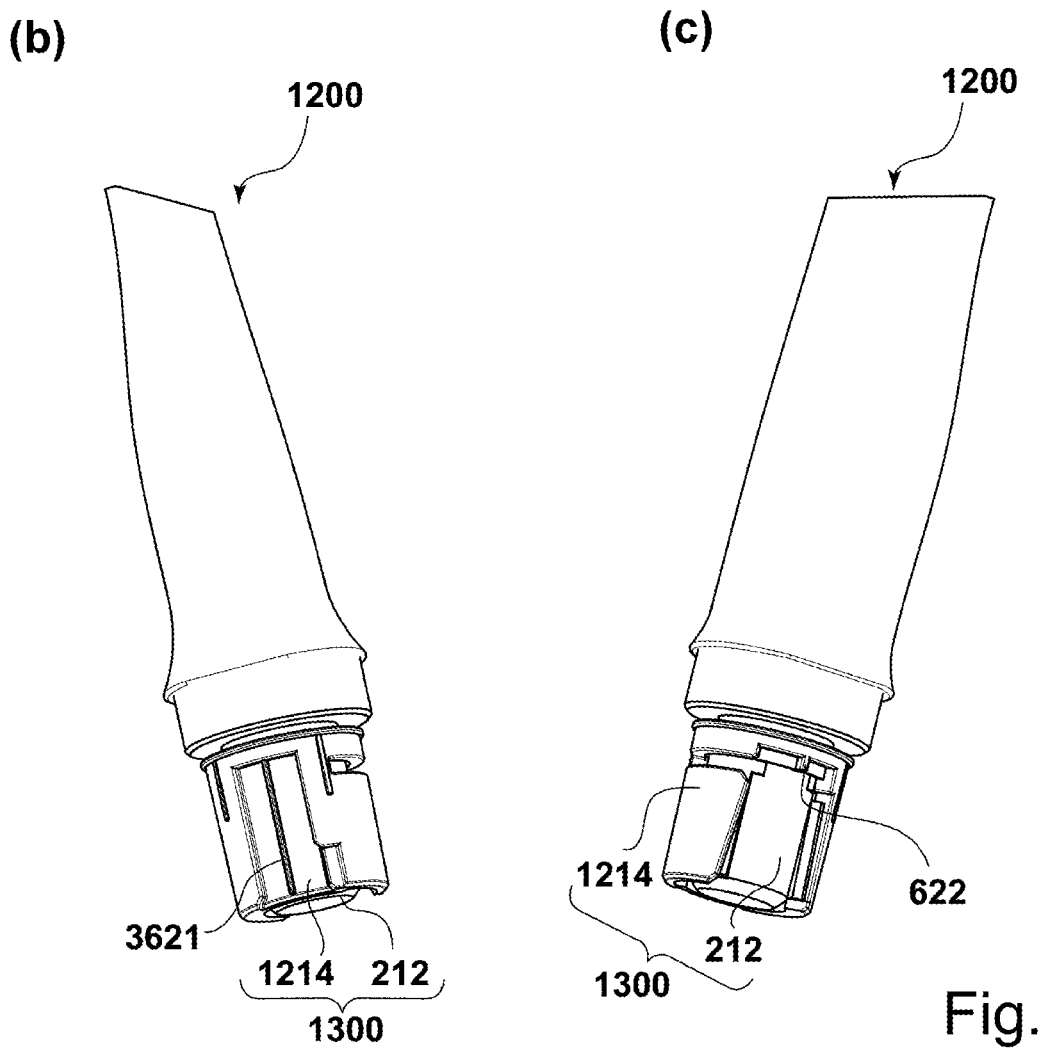
Fig. 19

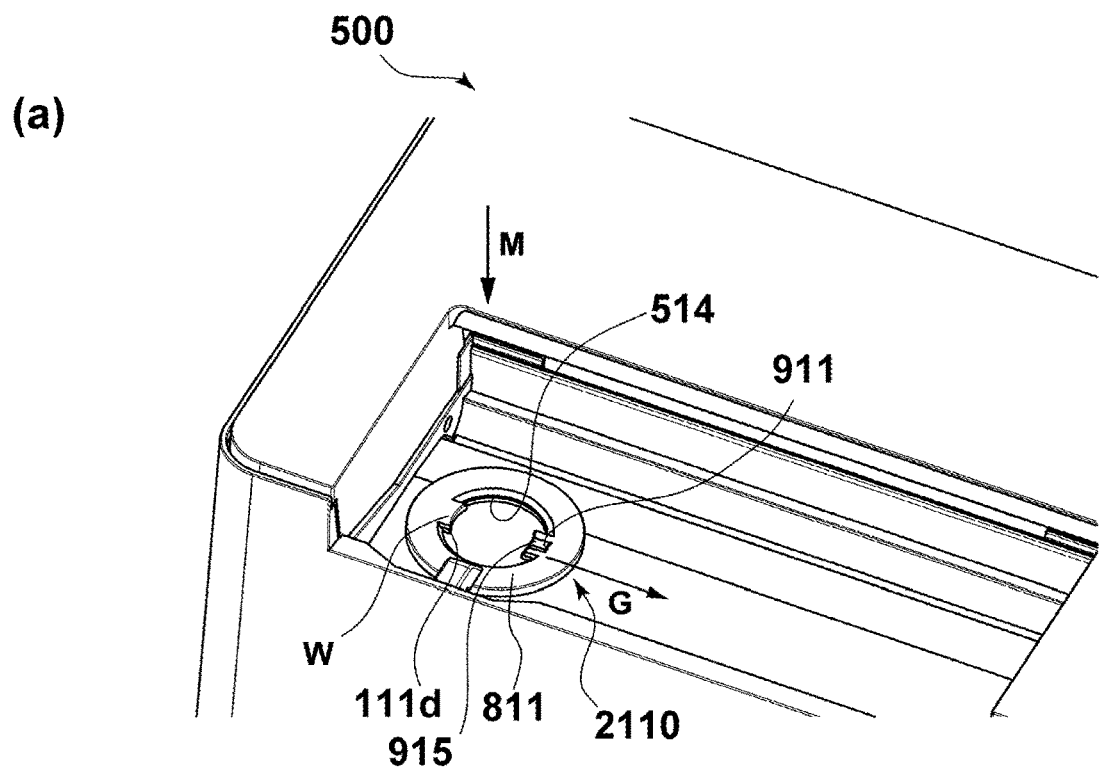
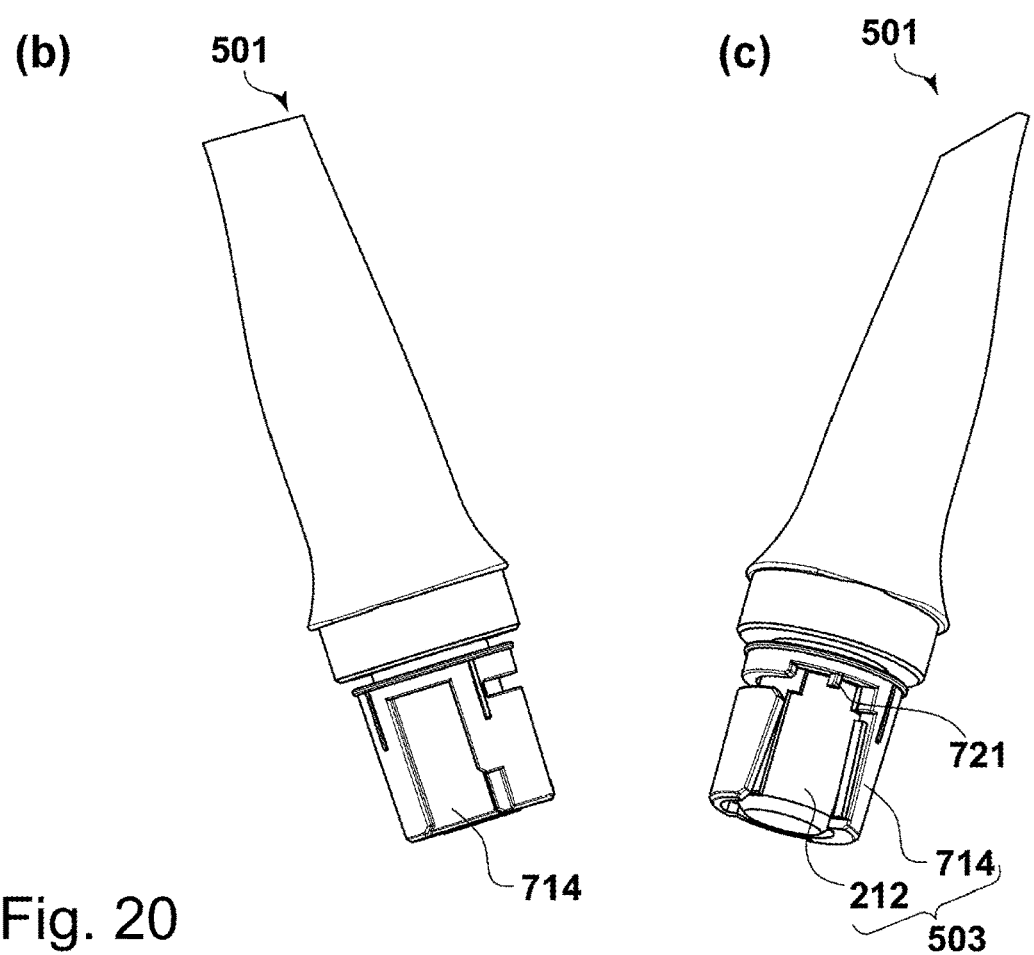
Fig. 20

REPLENISHING SYSTEM

TECHNICAL FIELD

The present invention relates to a replenishing system for replenishing a consumable agent to an image forming apparatus.

BACKGROUND ART

An image forming apparatus such as a copier, a printer, and a facsimile receiving device consumes a consumable agent such as toner or ink to form an image on a recording medium. When the consumable agent is depleted, a user replaces a used cartridge with a new cartridge. At this time, the cartridge contains the consumable agent and various functional components, which are main components of an image forming operation, and such a cartridge is called a process cartridge. On the other hand, a replenishing method has been devised, in which the consumable agent is replenished into a tank of the image forming apparatus from a pack accommodating the consumable agent, which does not contain the functional components described above. Compared to the process cartridge method, the replenishing method, in which a device such as a replenishing pack is connected to the image forming apparatus to replenish (e.g., injection) the consumable agent into the apparatus only upon the replenishment, has advantages of low cost and low environmental load, etc. For example, International Patent Application Laid-Open No. 2020/046338 proposes a mechanism, in which a cylinder-shaped accommodating device containing toner is connected to a printer and the toner is replenished from the accommodating device to the printer.

On the other hand, in a field of an image forming apparatus, subscription services are beginning to spread in recent years. Here, a subscription service is, for example, a service in which a user registers a printer to be used online in advance and pays a certain amount of money to a dealer, then the user becomes capable of performing predetermined number of prints. In a case in which the subscription service is applied to the image forming apparatus of the aforementioned replenishing method, the dealer will send an accommodating device for toner replenishment to the contracting user when a remaining amount of the consumable agent contained in the contracted printer becomes low. The contracting user then can perform prints under contracted conditions by replenishing the toner from the accommodating device to the contracted printer. For example, the user can continue printing up to the predetermined number of sheets specified in the contract.

Here, as one of the replenishing methods, the applicant is considering a method in which toner is replenished at once from an accommodating device to a printer. In this case, however, if a user accidentally replenishes the toner to another printer which is not covered by the contract, it is difficult to retrieve the replenished toner from an inside of the printer, and in addition, an issue arises that management of the subscription service becomes complicated.

SUMMARY OF THE INVENTION

Problem to be Solved by the Invention

Therefore, an object of the present invention is to provide a replenishing system which can suppress a case in which an accommodating device for replenishing a consumable agent, which is provided through a predetermined service, is used by an image forming apparatus, which is not subject to the predetermined service.

Means for Solving the Problem

According to the present invention, there is provided a replenishing system comprising: a first image forming apparatus including a first mounting port; a second image forming apparatus including a second mounting port different from the first mounting port in a shape; a first accommodating device provided with a first interface portion and configured to accommodate a consumable agent consumed for image formation, a second accommodating device with a second interface portion different from the first interface portion in a shape and configured to accommodate the consumable agent consumed for the image formation, wherein the first interface portion is mountable on the first mounting port and the second interface portion is not mountable, and wherein each of the first interface portion and the second interface portion is mountable on the second mounting port.

According to another aspect of the present invention, there is provided a replenishing system comprising: a first image forming apparatus including a first image forming portion for forming an image on a recording material with a consumable agent, a first accommodating portion for accommodating the consumable agent, a first mounting port and a first open/close portion capable of opening and closing a first replenishing passage of the consumable agent from the first mounting port to the first accommodating portion; a second image forming apparatus including a second image forming portion for forming an image on a recording material with a consumable agent, a second accommodating portion for accommodating a consumable agent, a second mounting port and a second open/close portion capable of opening and closing a second replenishing passage of the consumable agent from the second mounting port to the second accommodating portion; a first accommodating device and a second accommodating device configured to accommodate the consumable agent consumed for image formation; an acquiring means for acquiring code inherent to the first accommodating device and the second accommodating device, respectively; and a server apparatus configured to perform authentication of the first accommodating device and the second accommodating device based on the code acquired by the acquiring means, wherein the server apparatus permits to open the first replenishing passage by moving the first open/close portion in a case in which the first accommodating device is used for the first image forming apparatus and in a case in which the second accommodating device is used for the first image forming apparatus, and wherein the server apparatus does not permit to open the second replenishing passage in a case in which the first accommodating device is used for the second image forming apparatus and permits to open the second replenishing passage by moving the second open/close portion in a case in which the second accommodating device is used for the second image forming apparatus.

Effect of the Invention

According to the present invention, it becomes possible to suppress a case in which an accommodating device for replenishing a consumable agent, which is provided through a predetermined service, is used by an image forming apparatus, which is not subject to the predetermined service.

BRIEF DESCRIPTION OF THE DRAWINGS

Part (a) of FIG. 1 is a perspective view illustrating an image forming apparatus of a state in which a rear side cover is closed, and part (b) of FIG. 1 is a perspective view illustrating the image forming apparatus of a state in which the rear side cover is opened.

Figure 5:
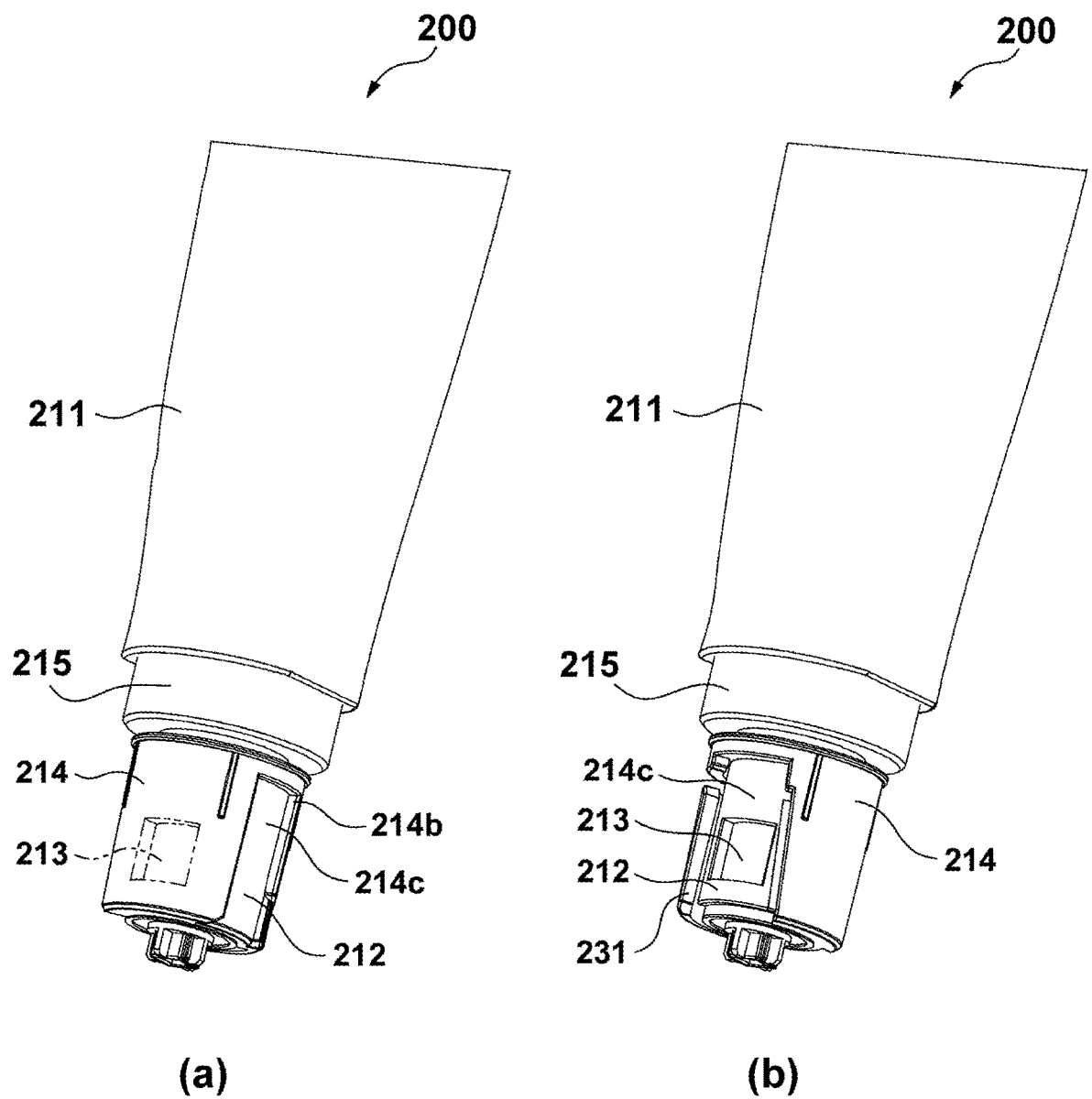

Part (a) of FIG. 5 is a perspective view illustrating a replenishing pack when a pack shutter is positioned in a closed position, and part (b) of FIG. 5 is another perspective view illustrating the replenishing pack when the pack shutter is positioned in an opening position.

Figure 6:
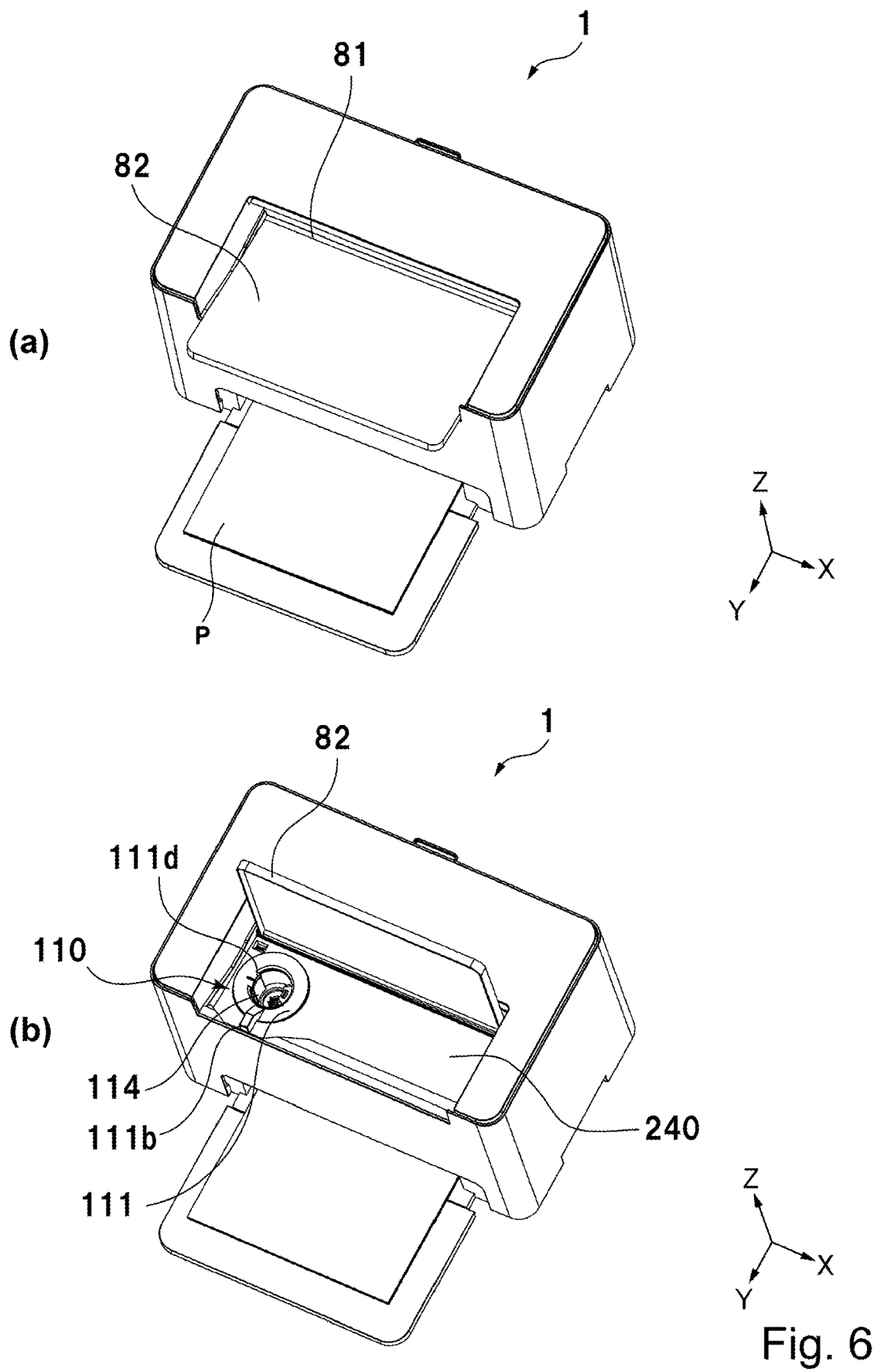

Part (a) of FIG. 6 is a perspective view illustrating the image forming apparatus of a state in which a discharge tray is closed, and part (b) of FIG. 6 is a perspective view illustrating the image forming apparatus of a state in which the discharge tray is opened.

Figure 7:
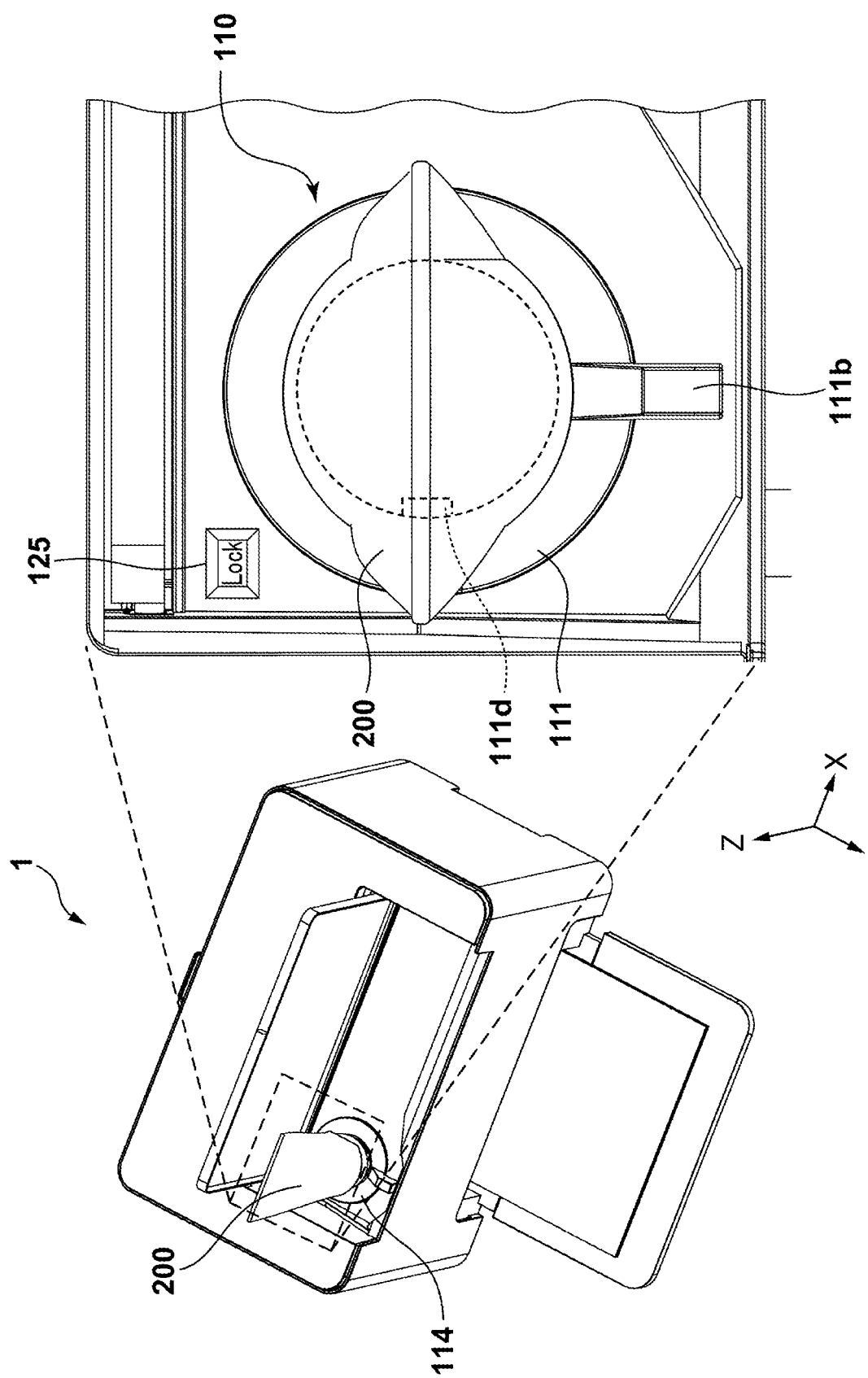

FIG. 7 is a perspective view and an enlarged plan view of a broken line portion illustrating the image forming apparatus of a state in which the replenishing pack is mounted thereon.

Part (a) of FIG. 8 is a bottom view illustrating a lock member positioned in a locking position, and part (b) of FIG. 8 is a bottom view illustrating the lock member positioned in an unlocking position.

Figure 9:
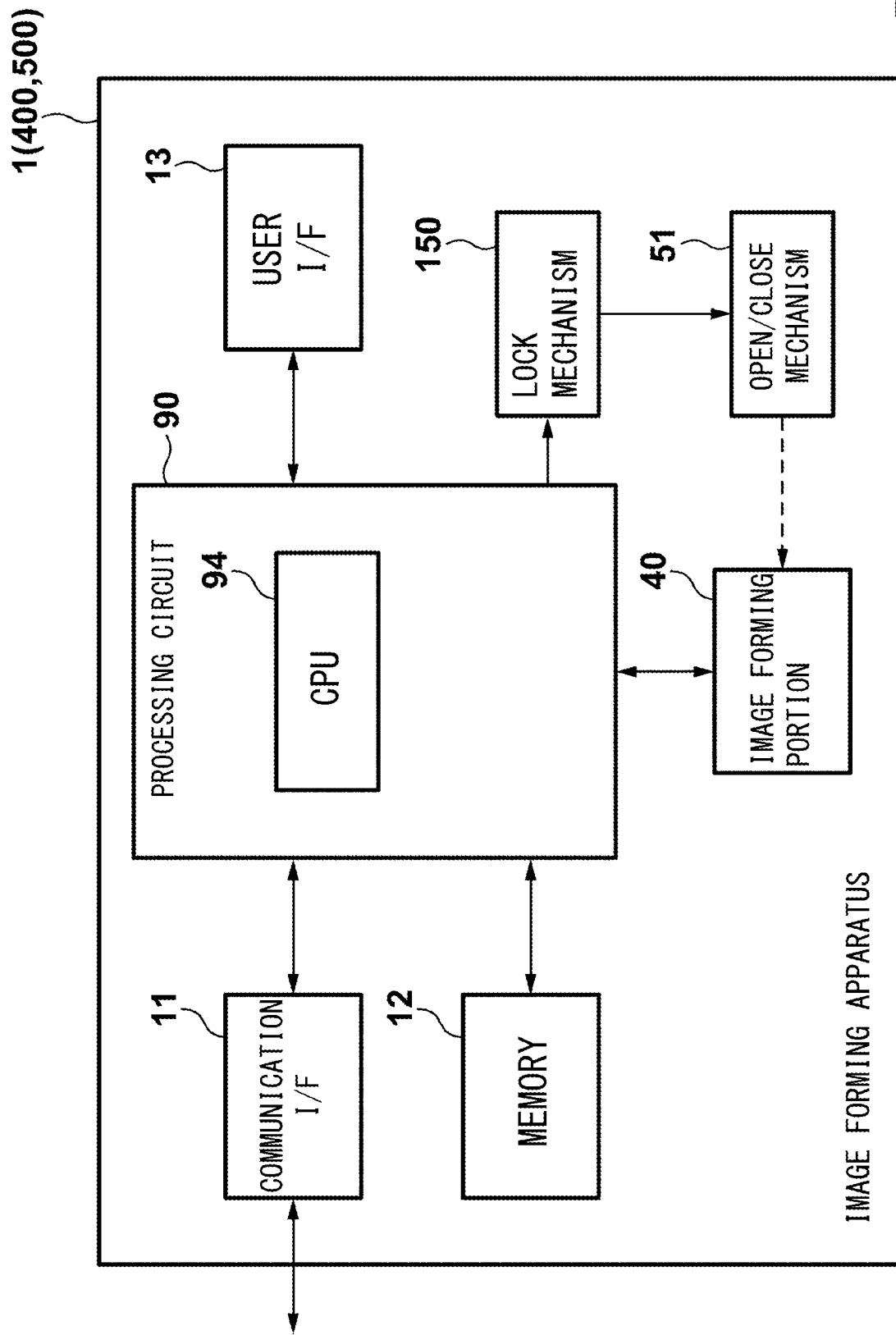

FIG. 9 is a block diagram illustrating an example of a control block of an image forming apparatus according to an Embodiment 1 through an Embodiment 4.

Part (a) of FIG. 10 is a perspective view illustrating an operating portion of an image forming apparatus of registration-type according to the Embodiment 1, part (b) of FIG. 10 is a perspective view illustrating a replenishing pack of registration-type, and part (c) of FIG. 10 is another perspective view illustrating the replenishing pack of registration-type.

Figure 11:
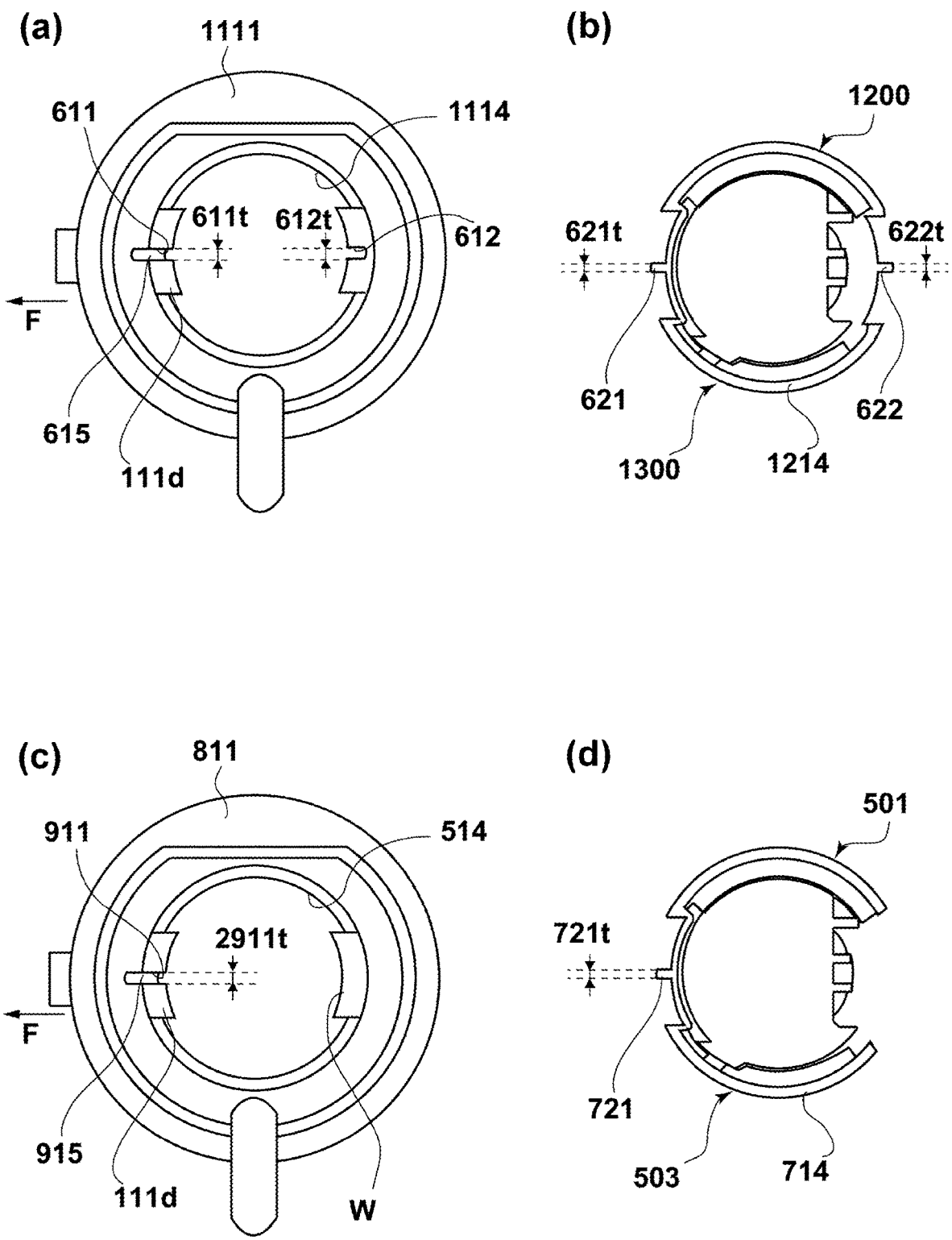

Part (a) of FIG. 11 is a plan view illustrating the operating portion of the image forming apparatus of registration-type, part (b) of FIG. 11 is a plan view illustrating a pack shutter of the replenishing pack of registration-type, part (c) of FIG. 11 is a plan view illustrating an operating portion of a standard image forming apparatus, and part (d) of FIG. 11 is a plan view illustrating a pack shutter of a standard replenishing pack.

Figure 12:
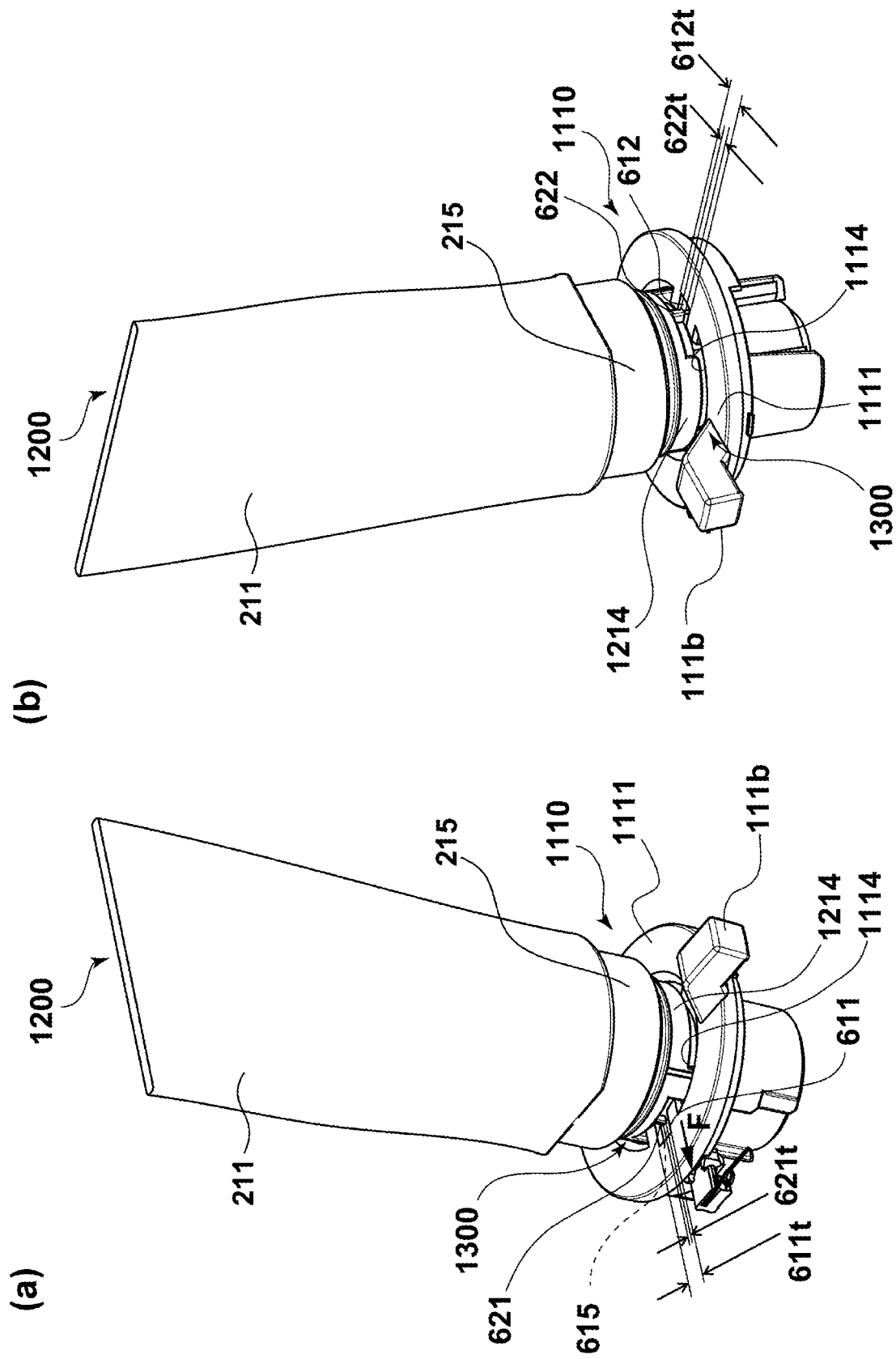

Part (a) of FIG. 12 is a perspective view illustrating a process in which the replenishing pack of registration-type is mounted on a mounting port, and part (b) of FIG. 12 is another perspective view illustrating the process in which the replenishing pack of registration-type is mounted on the mounting port.

Figure 13:
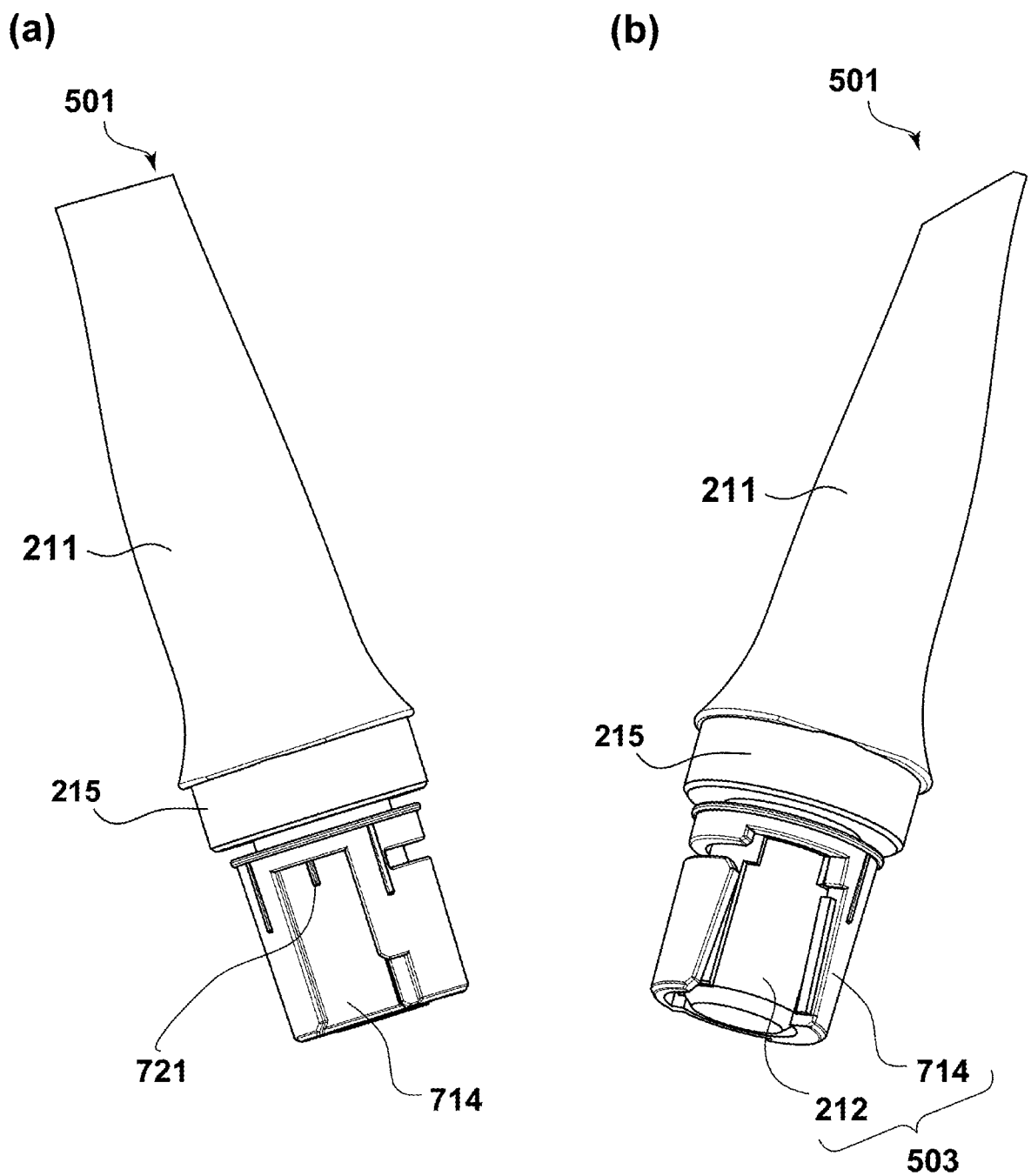

Part (a) of FIG. 13 is a perspective view illustrating the standard replenishing pack and part (b) of FIG. 13 is another perspective view illustrating the standard replenishing pack.

Figure 14:
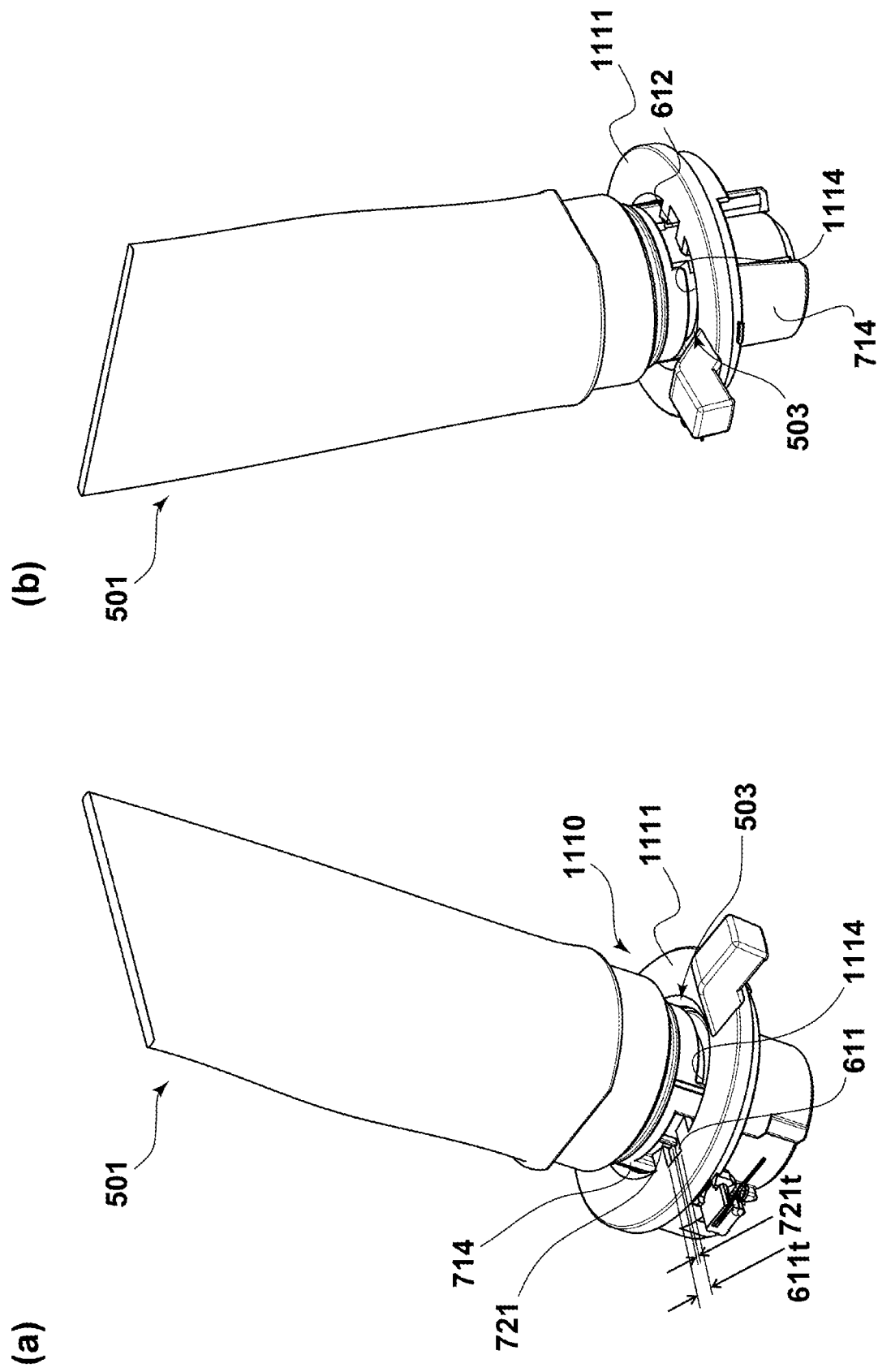

Part (a) of FIG. 14 is a perspective view illustrating a process in which the standard replenishing pack is mounted on a mounting port of an image forming apparatus of registration-type, and part (b) of FIG. 14 is another perspective view illustrating the process of the standard replenishing pack is mounted on the mounting port of the image forming apparatus of registration-type.

Figure 15:
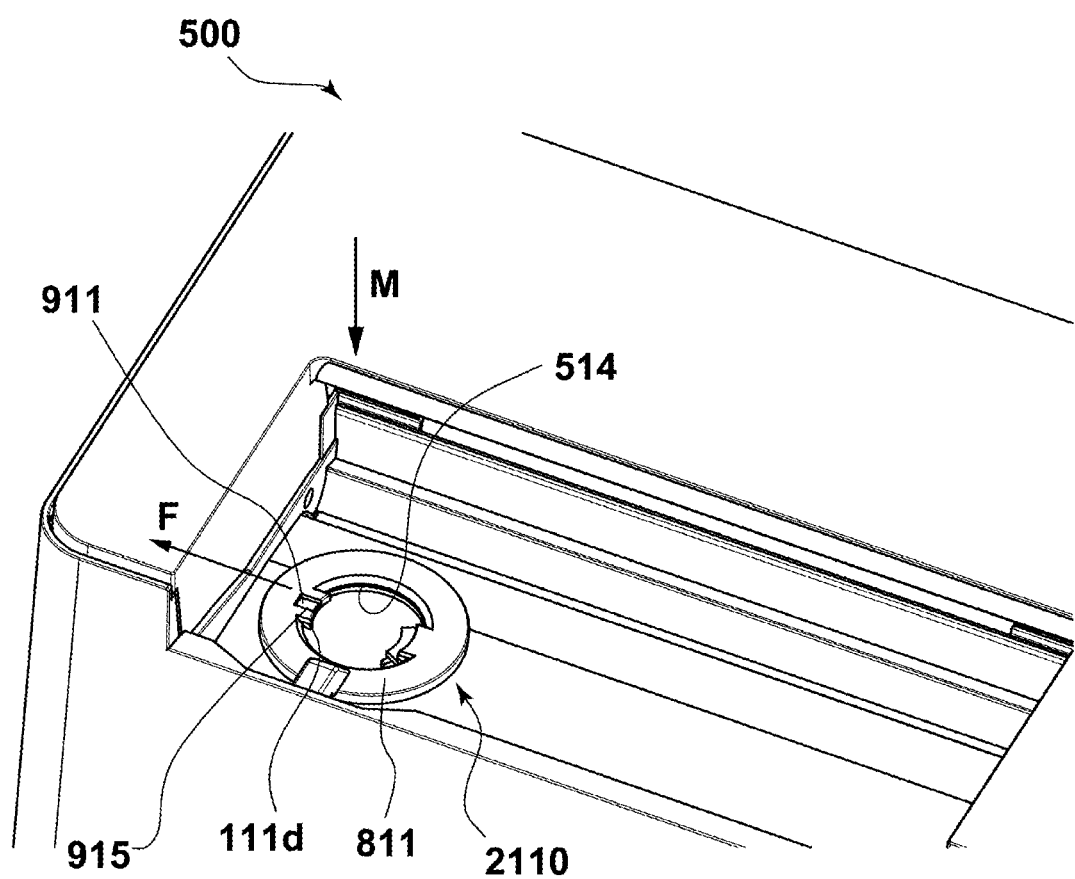

FIG. 15 is a perspective view illustrating the operating portion of the standard image forming apparatus.

Part (a) of FIG. 16 is a perspective view illustrating a process in which the standard replenishing pack is mounted on a mounting port of the standard image forming apparatus, and part (b) of FIG. 16 is another perspective view illustrating the process in which the standard replenishing pack is mounted on the mounting port of the standard image forming apparatus.

Part (a) of FIG. 17 is a perspective view illustrating a process in which the replenishing pack of registration-type is mounted on the mounting port of the standard image forming apparatus, and part (b) of FIG. 17 is another perspective view illustrating the process in which the replenishing pack of registration-type is mounted on the mounting port of the standard image forming apparatus.

Figure 18:
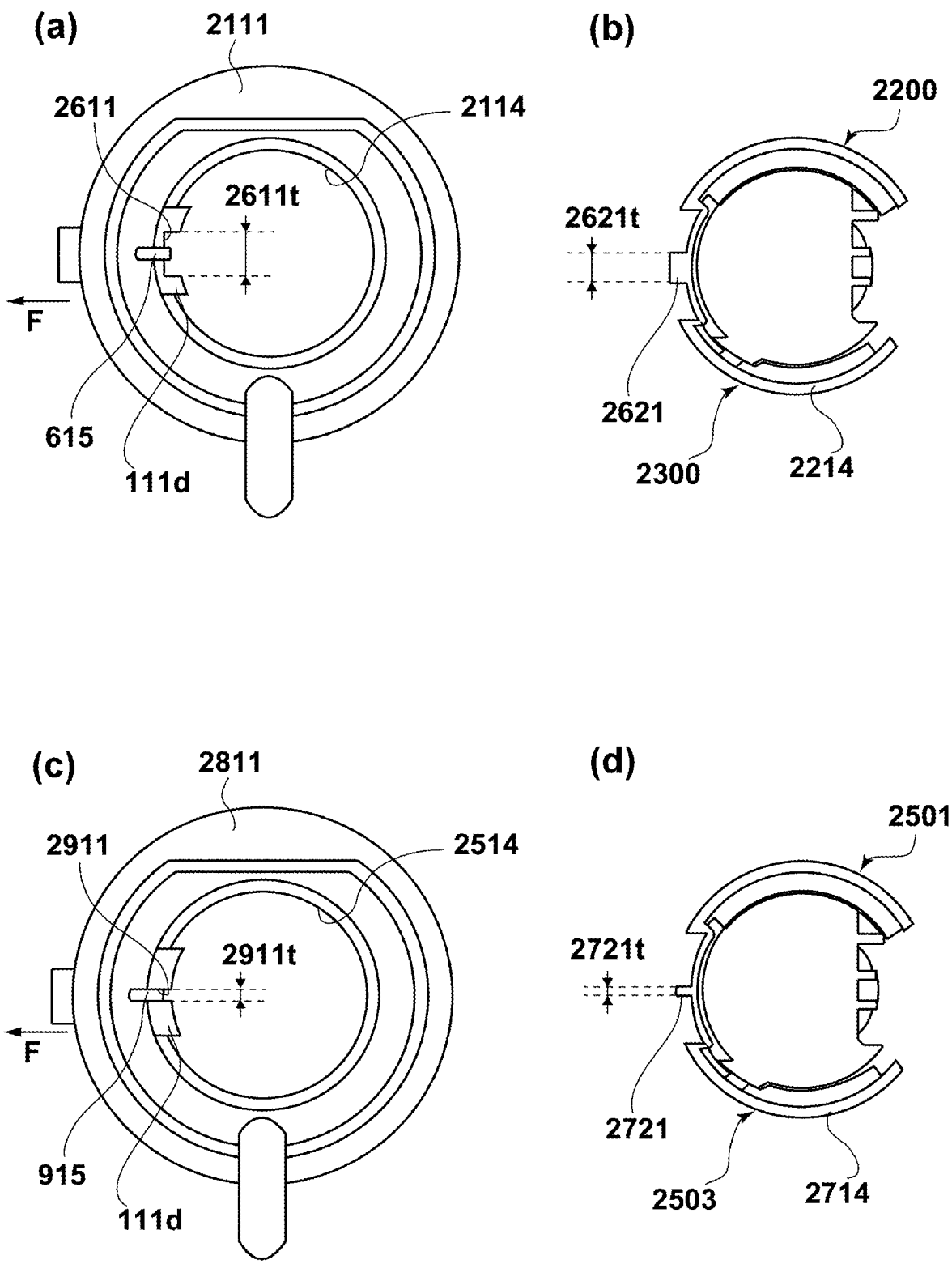

Part (a) of FIG. 18 is a plan view illustrating an operating portion of an image forming apparatus of registration-type according to an Embodiment 2, part (b) of FIG. 18 is a plan view illustrating a pack shutter of a replenishing pack of registration-type according to the Embodiment 2, part (c) of FIG. 18 is a plan view illustrating an operating portion of a standard image forming apparatus according to the Embodiment 2, and part (d) of FIG. 18 is a plan view illustrating a pack shutter of a standard replenishing pack according to the Embodiment 2.

Part (a) of FIG. 19 is a perspective view illustrating an operating portion of an image forming apparatus of registration-type according to an Embodiment 3, part (b) of FIG. 19 is a perspective view illustrating a replenishing pack of registration-type according to the Embodiment 3, and part (c) of FIG. 19 is another perspective view of the replenishing pack of registration-type according to the Embodiment 3.

Part (a) of FIG. 20 is a perspective view illustrating an operating portion of a standard image forming apparatus according to the Embodiment 3, part (b) of FIG. 20 is a perspective view illustrating a standard replenishing pack according to the Embodiment 3, and part (c) of FIG. 20 is another perspective view of the standard replenishing pack according to the Embodiment 3.

Figure 21:
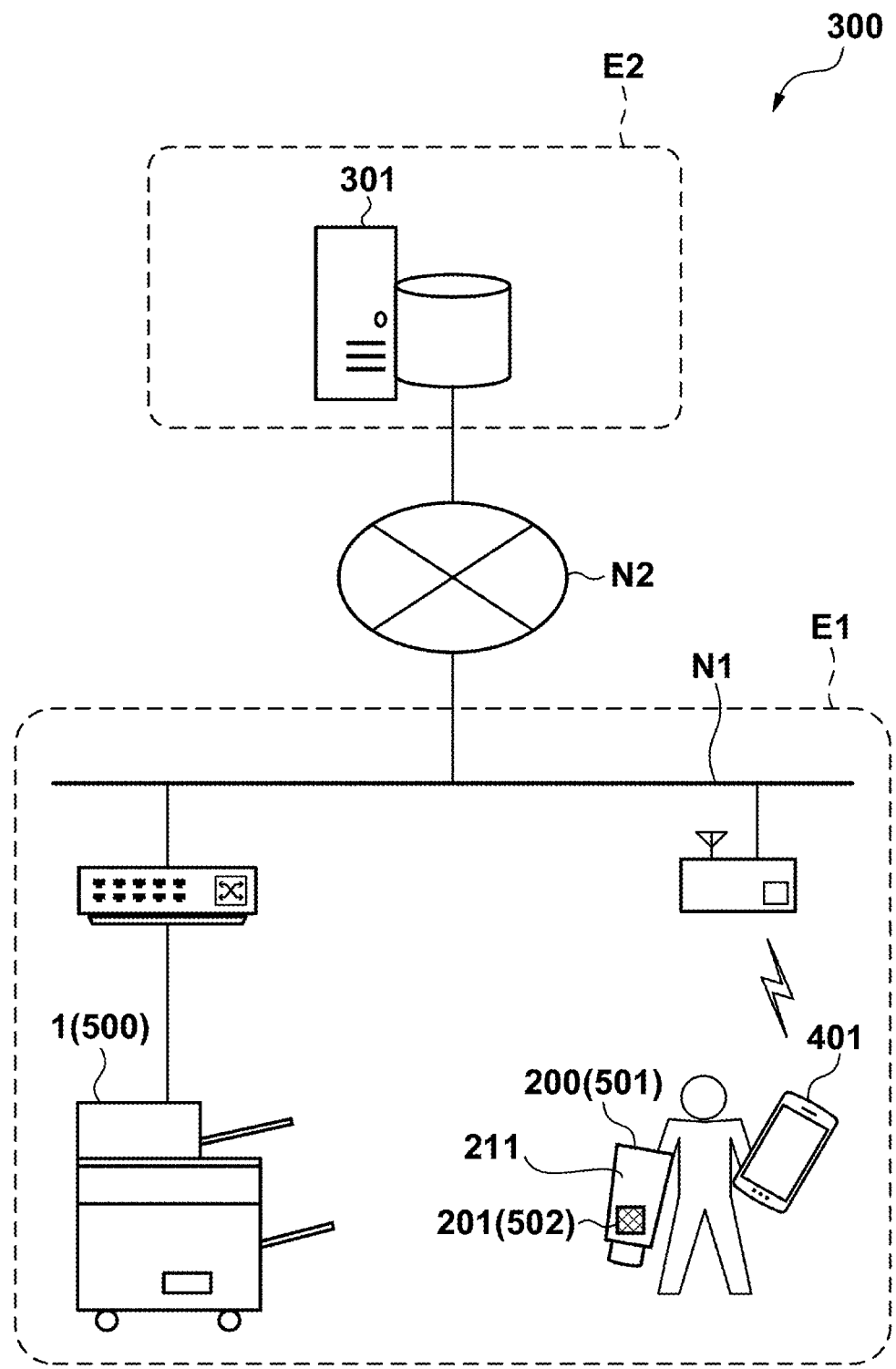

FIG. 21 is a schematic diagram illustrating an example of a configuration of a replenishment managing system according to an Embodiment 5.

Figure 22:
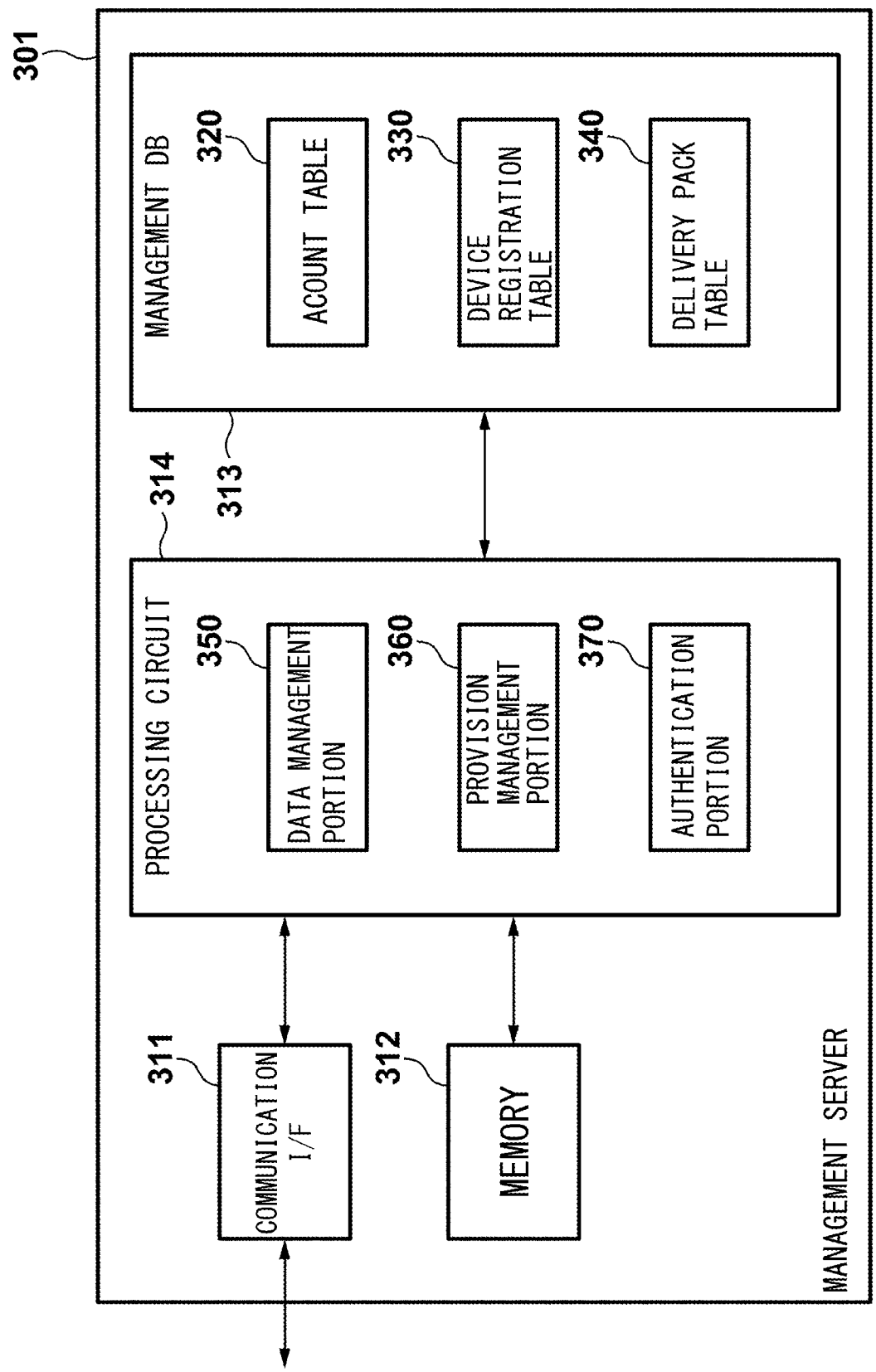

FIG. 22 is a block diagram illustrating a configuration of a managing server according to the Embodiment 5.

Figure 23:
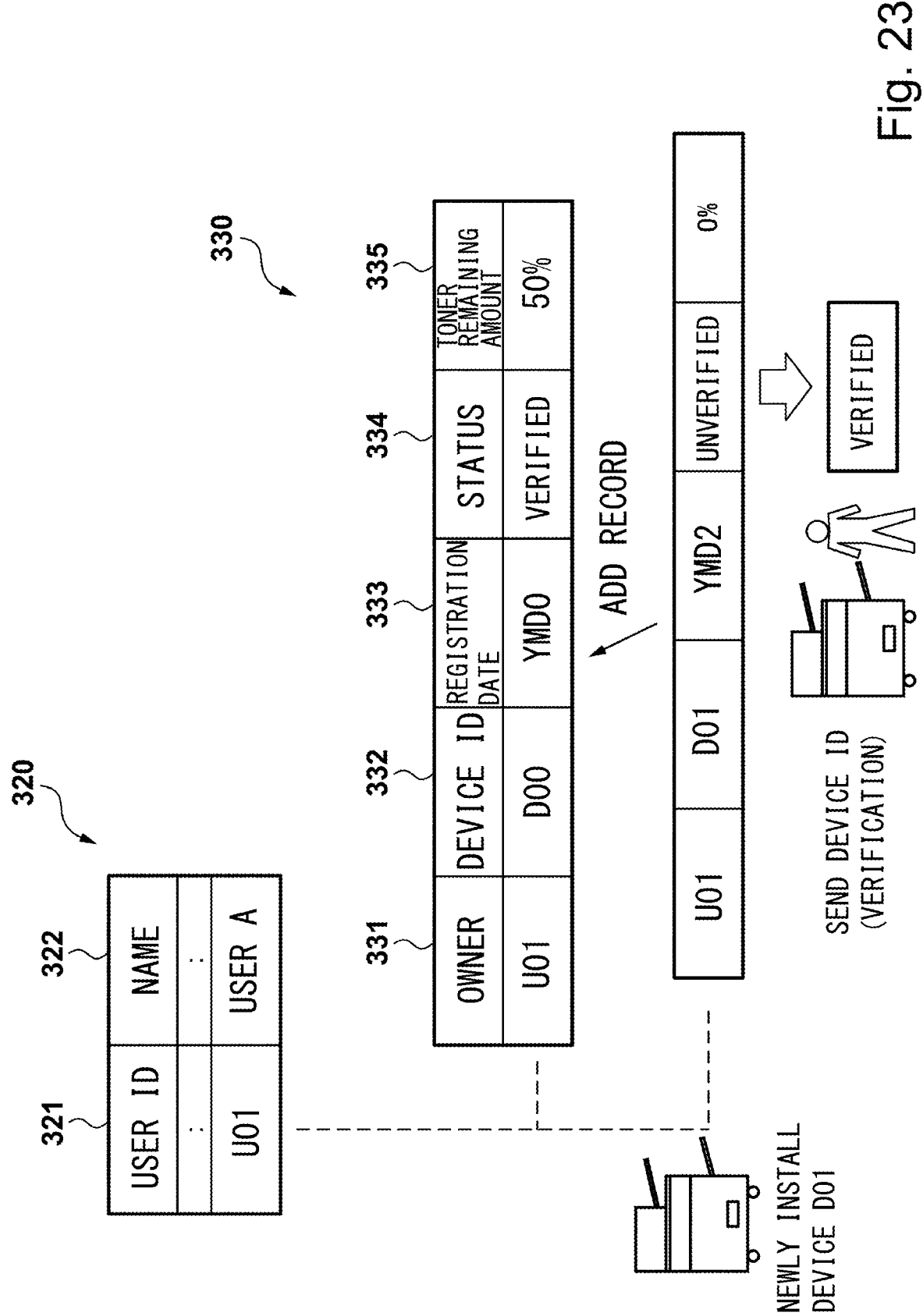

FIG. 23 is an explanation view for illustrating an update of a database upon a device registration.

Figure 24:
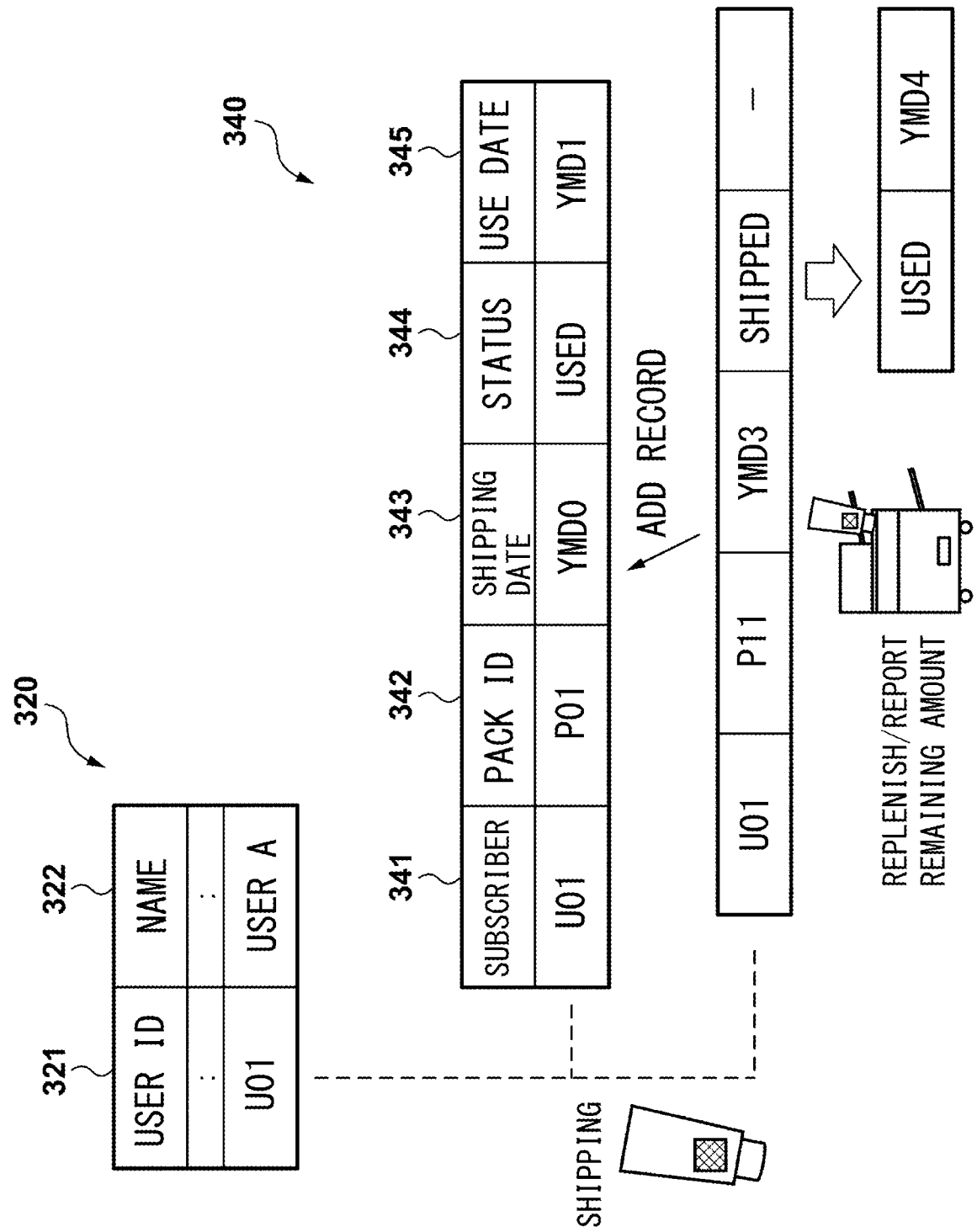

FIG. 24 is an explanation view for illustrating an update of a database upon a pack delivery.

Figure 25:
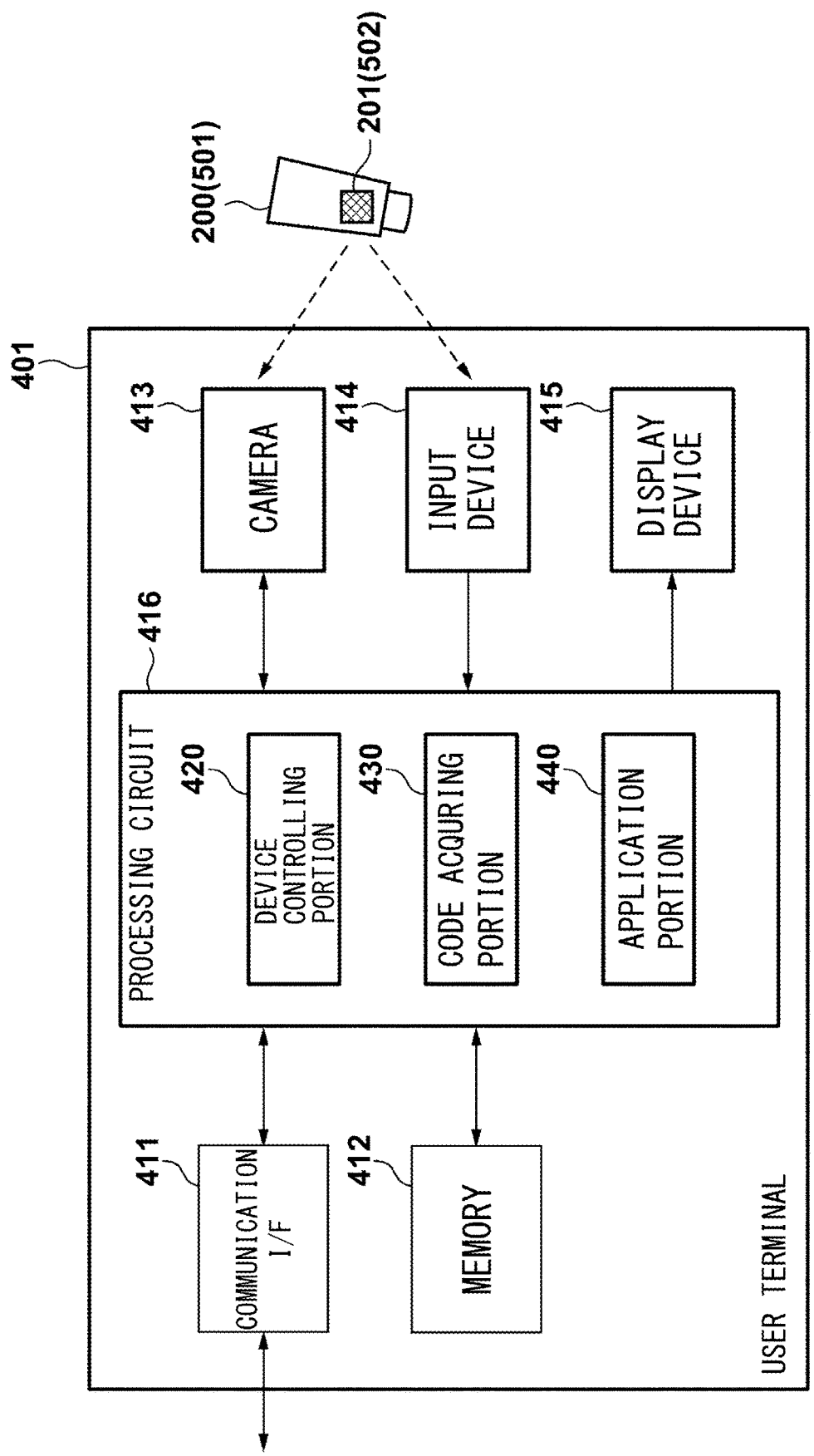

FIG. 25 is a block diagram illustrating a configuration of a user terminal device according to the Embodiment 5.

Figure 26:
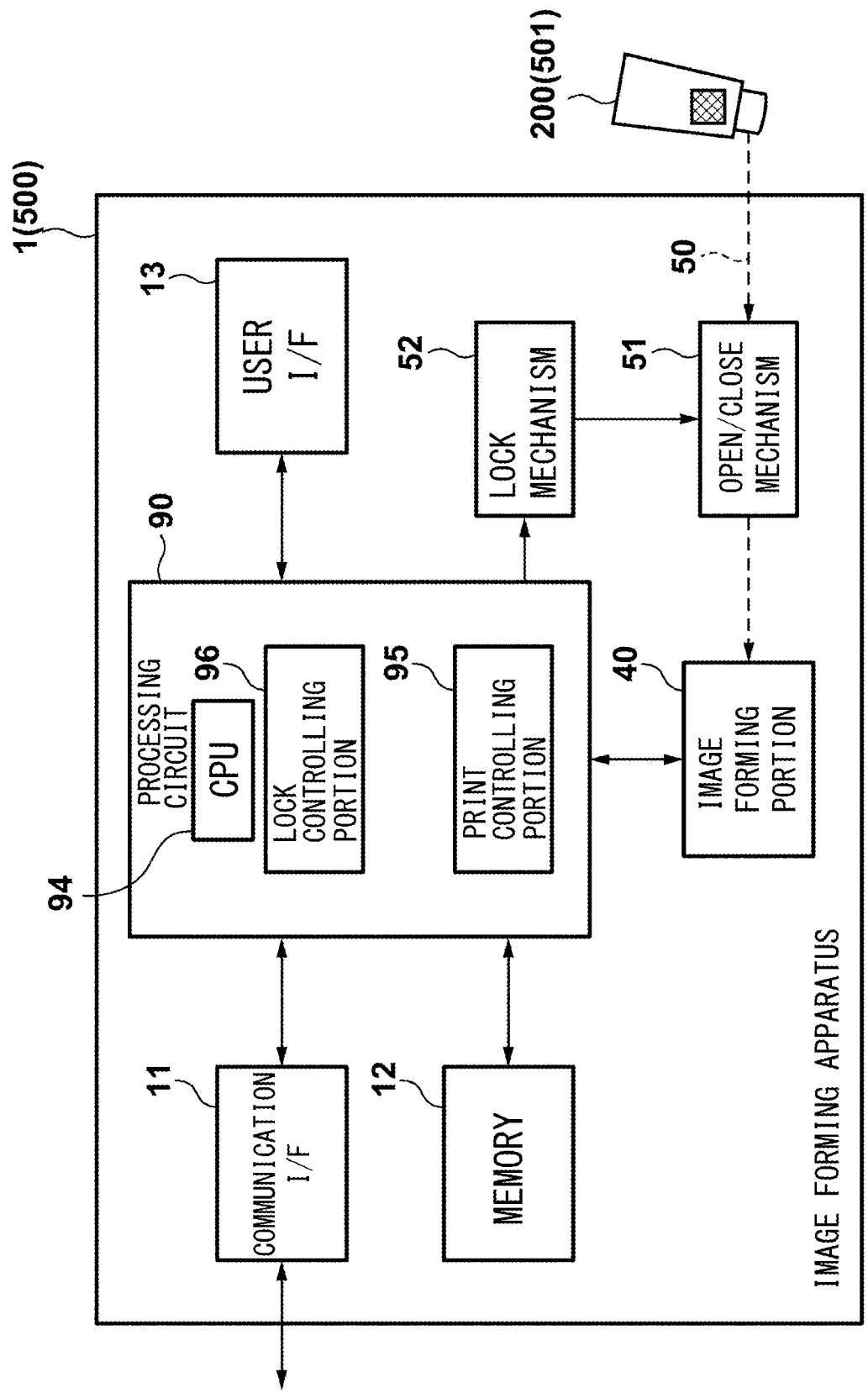

FIG. 26 is a block diagram illustrating a functional aspect of an image forming apparatus according to the Embodiment 5.

Figure 27:
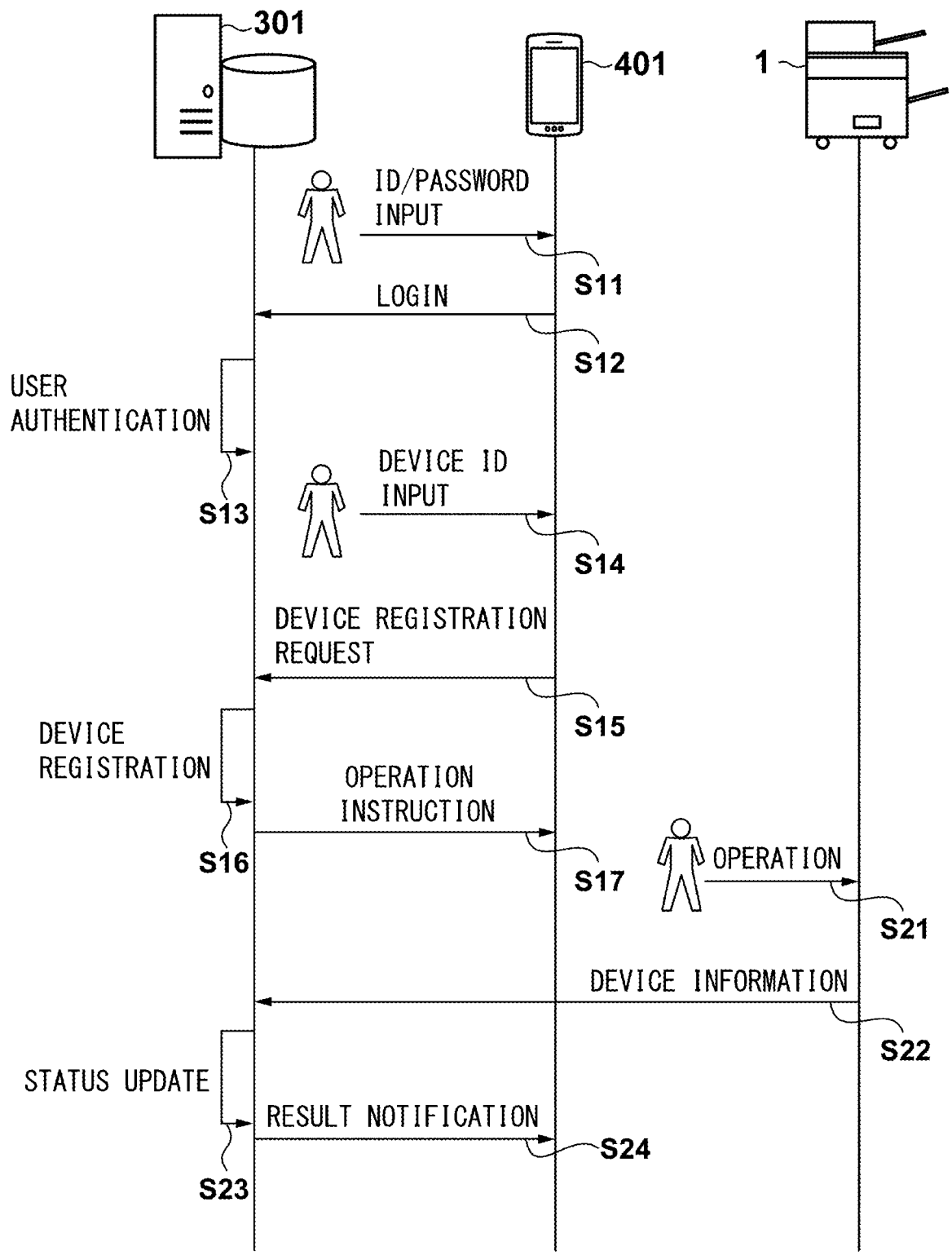

FIG. 27 is a sequence diagram illustrating a schematic flow of processes associated with the device registration.

Figure 28:
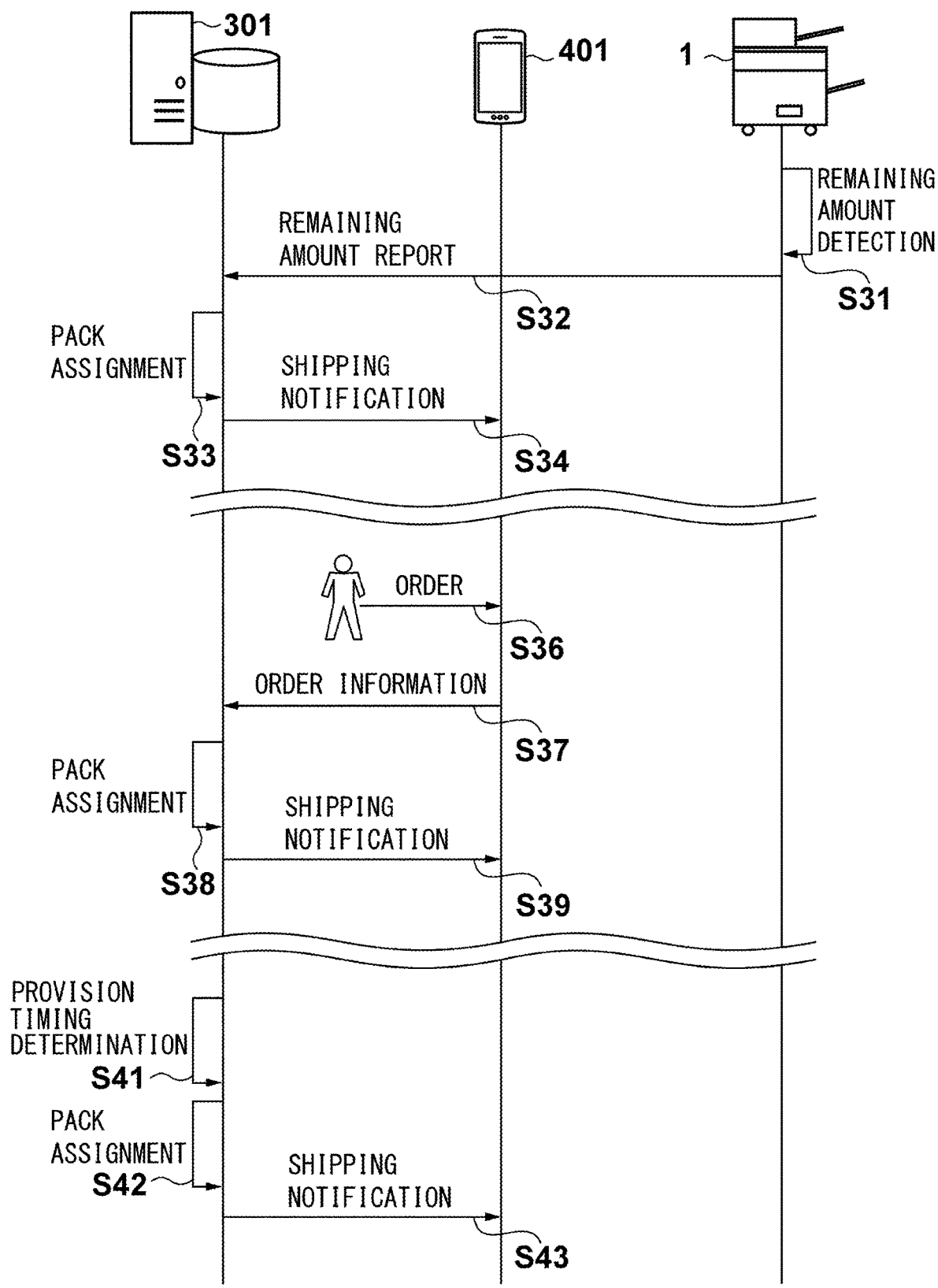

FIG. 28 is a sequence diagram illustrating some examples of a schematic flow of processes associated with supply of a replenishing pack to a user.

Figure 29:
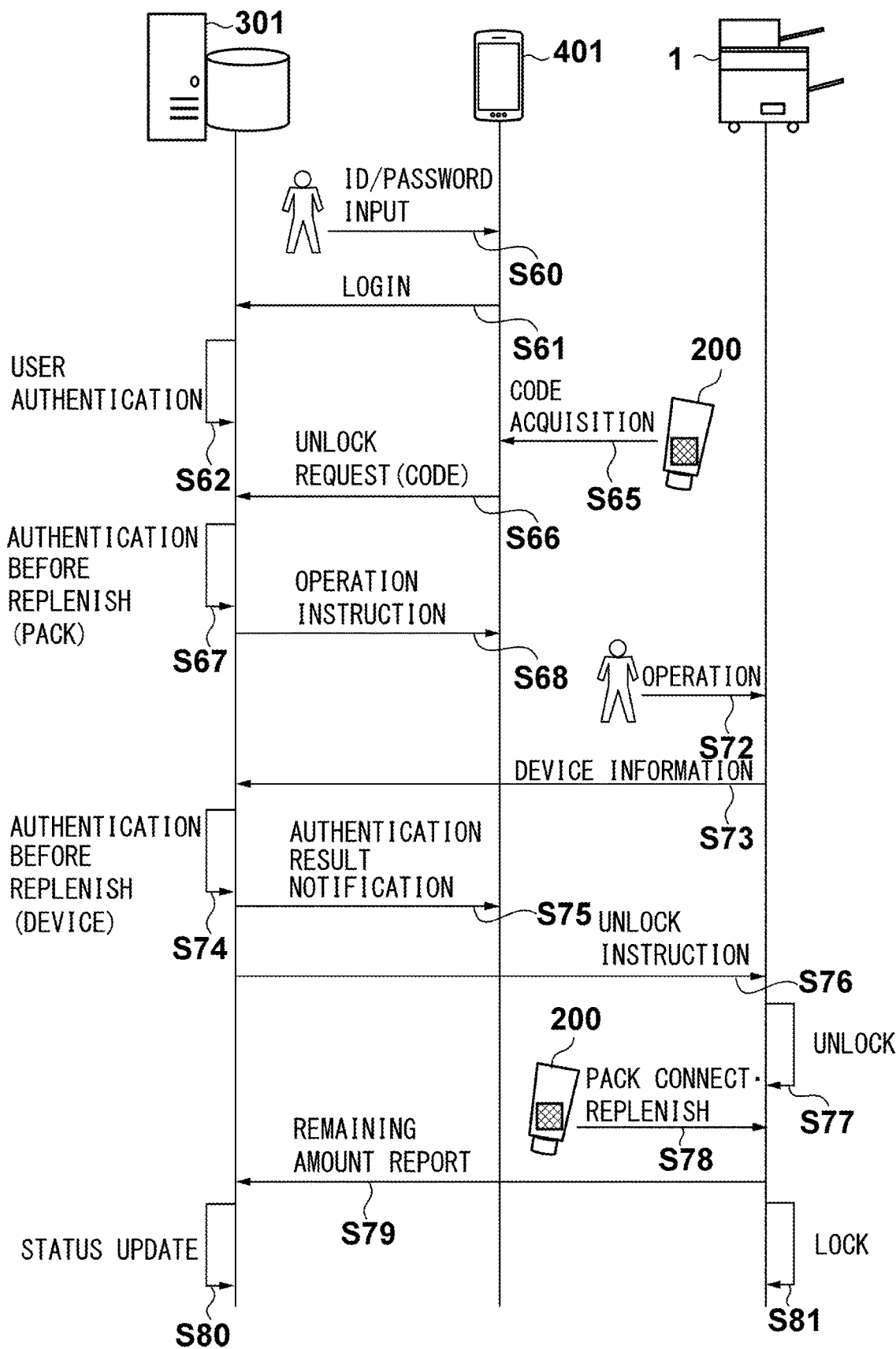

FIG. 29 is a sequence diagram illustrating a schematic flow of processes upon a toner replenishment.

Figure 30:
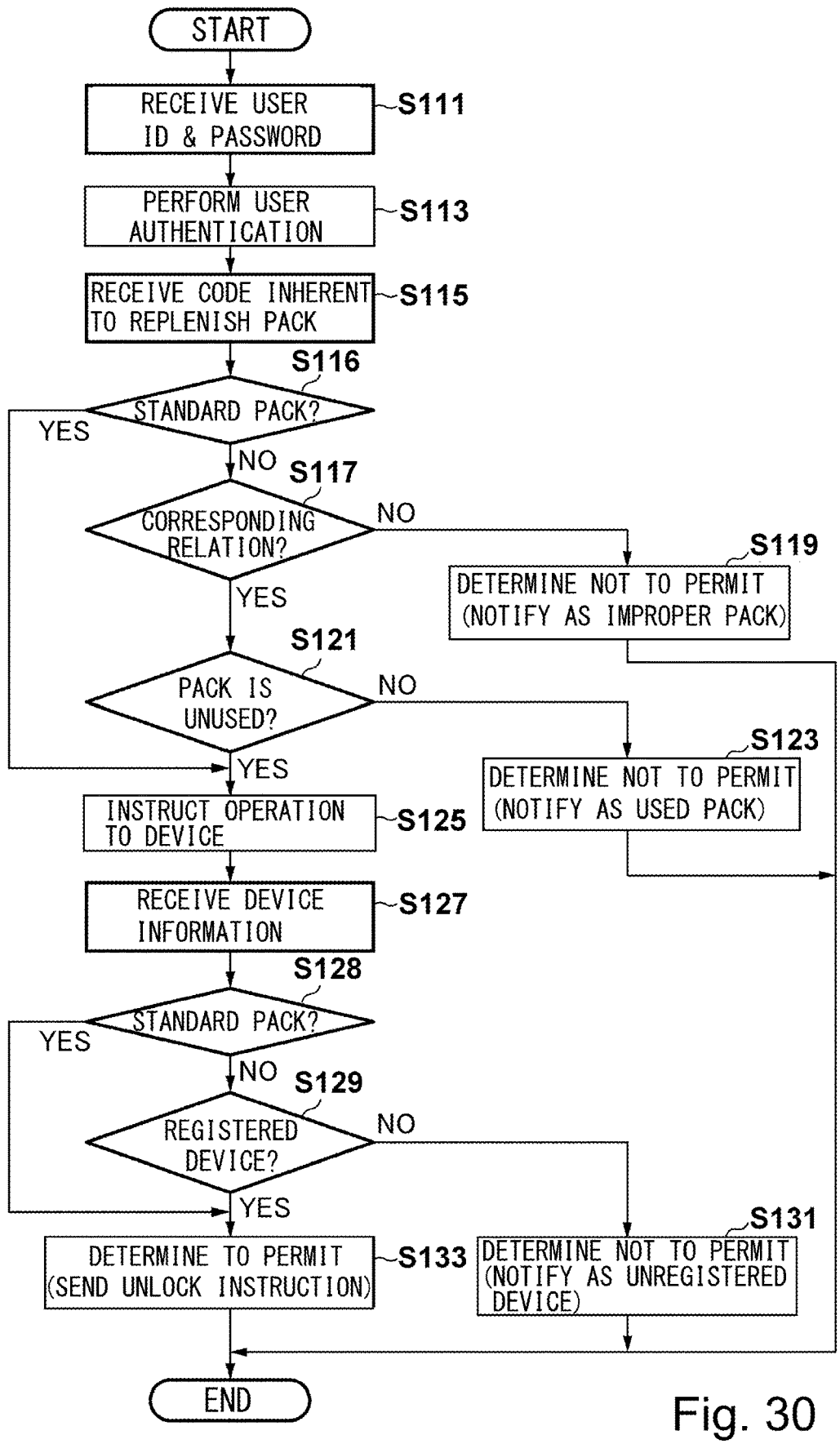

FIG. 30 is a flowchart diagram illustrating a flow of an authentication process performed by the managing server.

Figure 31:
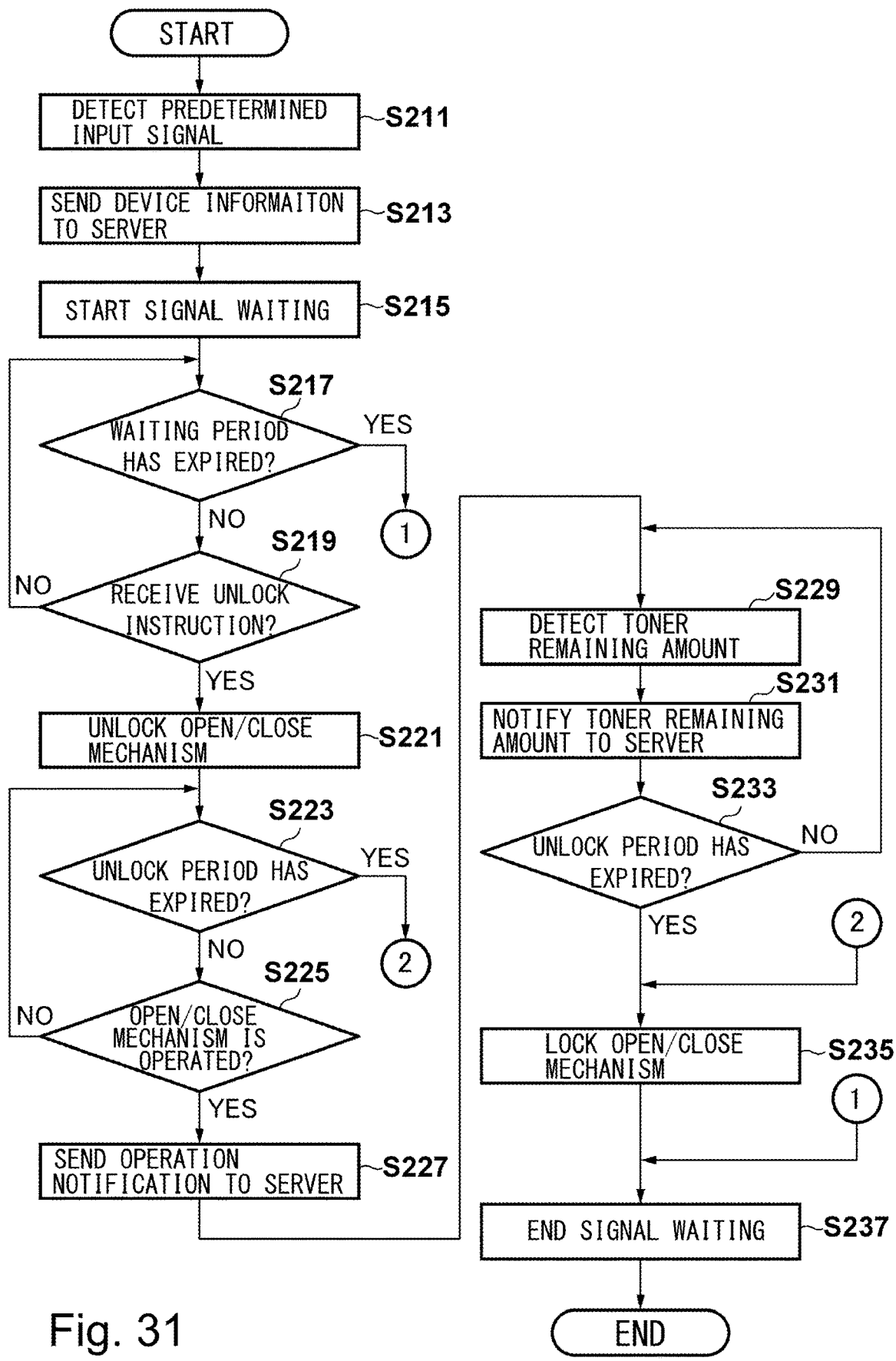

FIG. 31 is a flowchart diagram illustrating a flow of a lock control process performed by the image forming apparatus.

EMBODIMENTS OF THE INVENTION

Hereinafter, with reference to the drawings, modes for implementing the present invention will be described in detail based on Embodiments. However, dimensions, materials, shapes and relative arrangement of components described in the Embodiments should be changed appropriately according to configurations and various conditions of an apparatus to which the present invention is employed. In other words, it is not intended to limit a scope of the present invention to the Embodiments described below.

In addition, hereinafter, an image forming apparatus 1, which has a configuration common to an image forming apparatus of registration-type and a standard image forming apparatus described below, and a replenishing pack 200, which has a configuration common to a replenishing pack of registration-type and a standard replenishing pack, will be described mainly. Incidentally, differences among the image forming apparatus 1, the image forming apparatus of registration-type, and the standard image forming apparatus, as well as differences among the replenishing pack 200, the replenishing pack of registration-type, and the standard replenishing pack, will be described below.

[1. Description of an Image Forming Apparatus of a Replenishing Method]

Figure 2:
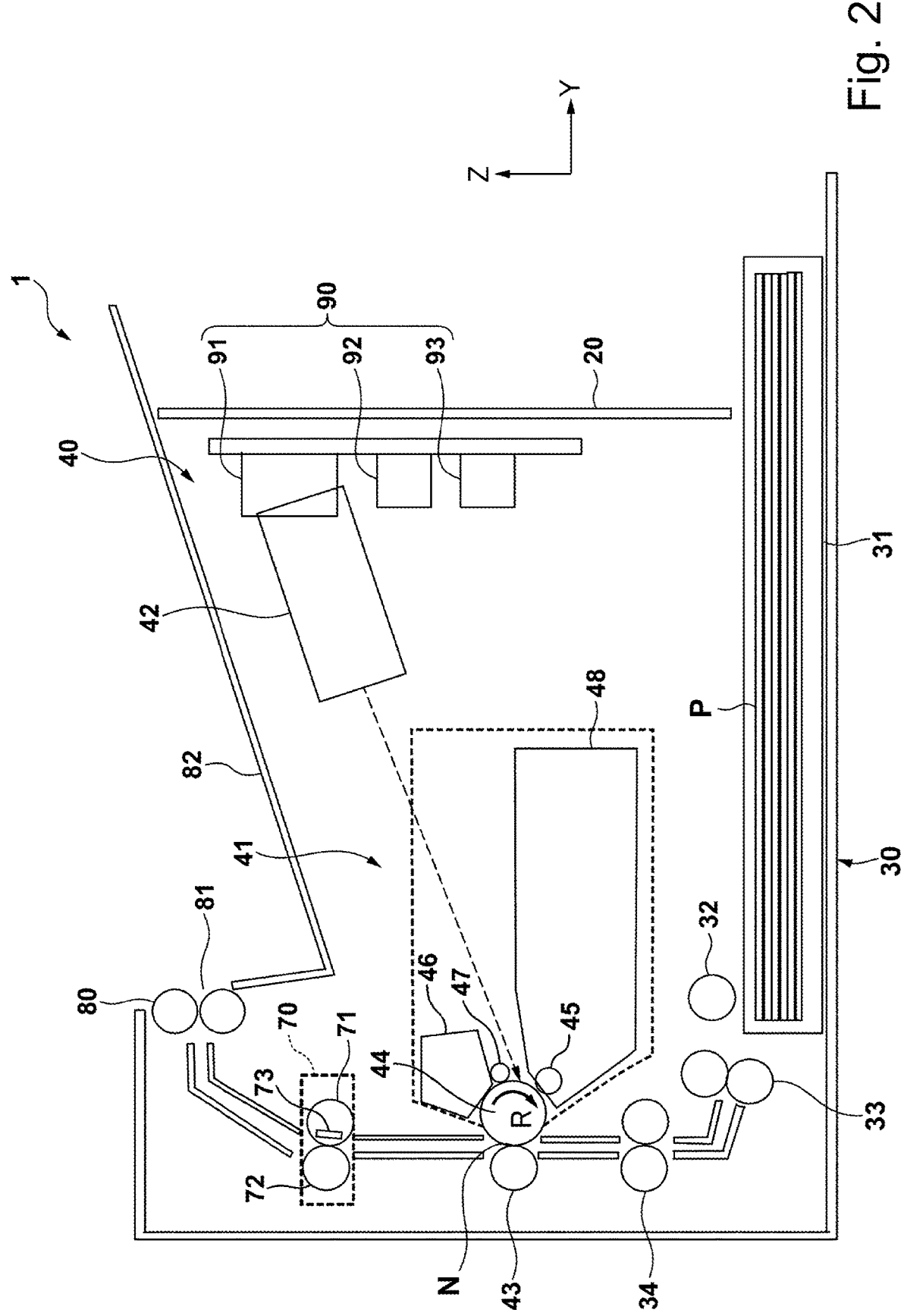
FIG. 2 is a schematic view illustrating a configuration of the image forming apparatus.

Part (a) of FIG. 1 is a perspective view illustrating the image forming apparatus 1, and part (b) of FIG. 1 is a perspective view illustrating the image forming apparatus 1 of a state in which a rear cover 22 is opened. FIG. 2 is a schematic view illustrating a configuration of the image forming apparatus 1. The image forming apparatus 1 is a monochrome printer which forms an image on a recording medium based on image information input from an external device. The recording medium includes a variety of sheet members made of different materials, such as a paper, such as a plain paper and a thick paper, a plastic film, such as a sheet for an overhead projector, a special shaped sheet, such as an envelope and an index paper, and cloth.

In the following description, a height direction (opposite to the vertical direction) of the image forming apparatus 1 in a case in which the image forming apparatus 1 is installed on a horizontal plane is referred to as a Z direction. A direction which crosses the Z direction and is parallel to a rotational axis direction (main scan direction) of a photosensitive drum 44, which will be described later, is referred to as an X direction. A direction crossed with both the X direction and the Z direction is referred to as a Y direction. The X direction, the Y direction and the Z direction are preferably crossed with each other perpendicularly. In addition, for convenience, a plus side is referred to as a right side and a minus side is referred to as a left side in the X direction, a plus side is referred to as a front side or a near side and a minus side is referred to as a back side or a rear side in the Y direction, and a plus side is referred to as an upper side and a minus side is referred to as a downside in the Z direction.

[1-1. Appearance of the Apparatus]

A housing of the image forming apparatus 1 includes a front cover 20, an exterior cover 21, a rear cover 22 and a discharge tray 82, as shown in part (a) of FIG. 1 through FIG. 2. The rear cover 22 is provided with a handle 23. The front cover 20 is provided so as to be openable and closable on one side surface of the image forming apparatus 1 and protects a processing circuit 90, which will be described below. The rear cover 22 is provided so as to be openable and closable on the other side surface of the image forming apparatus 1. It is possible for a user to perform maintenance work, such as clearing a jam or replacement of a process unit 41 by opening the rear cover 22 by grasping the handle 23 of the rear cover 22 to expose a portion of a conveyance path, on which the recording medium is conveyed, and the process unit 41. In the housing, a discharge port 81, through which a sheet to be discharged to the discharge tray 82 passes, is formed.

[1-2. Configuration of an Inside of the Apparatus]

The image forming apparatus 1 is provided with, as shown in FIG. 2, an image forming portion 40, which forms a toner image on a recording medium P by consuming toner as a consumable agent, and a feeding portion 30, which feeds the recording medium P. In addition, the image forming apparatus 1 is provided with a fixing portion 70, which fixes the toner image formed by the image forming portion 40 onto the recording medium, a discharging roller pair 80 and the processing circuit 90.

The image forming portion 40 is provided with a scanner unit 42, a process unit 41 of an electrophotographic method and a transfer roller 43, which transfers the toner image formed on the photosensitive drum 44 of the process unit 41 to the recording medium P. The process unit 41 is provided with the photosensitive drum 44 and a cleaning unit 46, a charging roller 47 and a developing roller 45, which are disposed around the photosensitive drum 44, and an accommodating portion 48, which accommodates the toner. Incidentally, the process unit 41 may be screwed to the housing of the image forming apparatus 1, and includes what can be removed by a service representative.

The photosensitive drum 44 as an image bearing member is a photosensitive member formed in a cylindrical shape. The photosensitive drum 44 in the present Embodiment has a photosensitive layer formed of a negatively charged organic photosensitive member on a drum-shaped substrate made of aluminum. In addition, the photosensitive drum 44 is rotationally driven by a motor in a predetermined direction (R direction in FIG. 2) at a predetermined process speed.

The charging roller 47 is in contact with the photosensitive drum 44 with a predetermined pressure contact force to form a charging portion. In addition, a surface of the photosensitive drum 44 is uniformly charged to predetermined potential by desired charging voltage being applied by a high-voltage power source. In the present Embodiment, the photosensitive drum 44 is charged to negative polarity by the charging roller 47.

The scanner unit 42 irradiates the photosensitive drum 44 with a laser beam corresponding to the image information input from the external device using a polygon mirror, thereby scanning and exposing the surface of the photosensitive drum 44. By this exposure, an electrostatic latent image corresponding to the image information is formed on the surface of the photosensitive drum 44. Incidentally, the scanner unit 42 is not limited to a laser scanner device but, for example, an LED exposure device provided with an LED array, in which a plurality of LEDs are arranged along a longitudinal direction of the photosensitive drum 44, may be employed.

The developing roller 45 is rotatably supported by the accommodating portion 48. In addition, the developing roller 45 is disposed at an opening portion of a developer container 100 (see FIG. 3), which includes the accommodating portion 48, so as to be opposing to the photosensitive drum 44. Incidentally, in the accommodating portion 48, a supplying roller, which supplies the toner accommodated in the accommodating portion 48 to a surface of the developing roller 45, may be provided.

The process unit 41 of the present Embodiment uses a contact developing method as a developing method. That is, a toner layer carried on the developing roller 45 is in contact with the photosensitive drum 44 in a developing portion (developing area), in which the photosensitive drum 44 and the developing roller are opposing to each other. Developing voltage is applied to the developing roller 45 by a developing high-voltage power source. Under the developing voltage, by the toner carried on the developing roller 45 being transferred from the developing roller 45 to the surface of the photosensitive drum 44 according to potential distribution on the surface of the photosensitive drum 44, the electrostatic latent image is developed into the toner image.

In addition, the toner of the present Embodiment does not contain a magnetic component and is a so-called non-magnetic one-component developer, which is carried on the developing roller 45 mainly by intermolecular force and electrostatic force (mirror image force). However, a one-component developer, which contains a magnetic component, may be used. In addition, the one-component developer may contain additives (e.g., wax or silica fine particles) to adjust flowability and chargeability of the toner in addition to toner particles. In addition, a two-component developer, which is constituted by a non-magnetic toner and a carrier having magnetic properties, may be used as the developer. In a case in which a developer having the magnetic property is used, for example, a cylindrical developing sleeve, inside which a magnet is arranged, may be used as the developer carrying member.

The fixing portion 70 is a thing of thermal fixing method which performs an image fixing process by heating and melting the toner on the recording medium. The fixing portion 70 is provided with a heating roller 71, which includes a fixing heater 73, and a pressing roller 72, which is in pressure contact with the heating roller 71. The feeding portion 30 is provided with a cassette 31 on which the recording media P are stacked, a pickup roller 32 and a separating roller pair 33. The cassette 31 can be pulled out from the housing of the image forming apparatus 1.

The processing circuit 90 is provided with a plurality of electronic components 91, 92 and 93, which are arranged on a board. For example, the electronic component 91 may be a processor, the electronic component 92 may be a memory, and the electronic component 93 may be an input/output device. The input/output device may include a communication interface. When a job, which instructs an image formation, is input to the image forming apparatus 1, an image forming process based on a received input image data, for example, from an external computer is initiated. The processing circuit 90 operates as a controller to control the image forming process.

Next, the image forming process of the image forming apparatus 1 will be described. When the image forming process is initiated, the scanner unit 42 irradiates toward the photosensitive drum 44 with the laser beam based on the input image information. At this time, the photosensitive drum 44 is charged by the charging roller 47 in advance, and the electrostatic latent image is formed on the photosensitive drum 44 by being irradiated by the laser beam. The electrostatic latent image is then developed by the developing roller 45 to form the toner image on the photosensitive drum 44.

In parallel with the image forming process described above, the pickup roller 32 of the feeding portion 30 feeds the recording medium P supported by the cassette 31. The recording medium P is separated into a single sheet by the separating roller pair 33 and conveyed to the conveying roller pair 34. The recording medium P is then conveyed by the conveying roller pair 34 to a transfer nip N formed by the transfer roller 43 and the photosensitive drum 44.

Transfer voltage is applied to the transfer roller 43 from a transfer high-voltage power source, and the toner image carried on the photosensitive drum 44 is transferred to the recording medium P, which is conveyed by the conveying roller pair 34. The recording medium P, onto which the toner image has been transferred, is conveyed to the fixing portion 70, and the toner image is heated and pressed when the recording medium P passes through the nip portion between the heating roller 71 and the pressing roller 72 of the fixing portion 70. By this, the toner image is fixed on the recording medium P by the toner particles being melt and then solidly fixed thereto. The recording material P which passes through the fixing portion 70 is discharged to an outside of the image forming apparatus 1 (outside of the apparatus) through the discharge port 81 by the discharging roller pair 80, and stacked on the discharge tray 82. After the toner image is transferred onto the recording medium P, the toner remaining on the photosensitive drum 44 is cleaned by the cleaning unit 46.

Incidentally, the image forming apparatus 1 of the present Embodiment is configured to be able to form an image on only one side of the recording medium P, however, it is not limited to this configuration. For example, the image forming apparatus 1 may be configured to be able to form images on double-side of the recording medium P by providing a double-side conveyance path for reversing the recording medium P, of which an image is formed on a first side.

[1-3. Detailed Configuration of the Developer Container]

Figure 3:
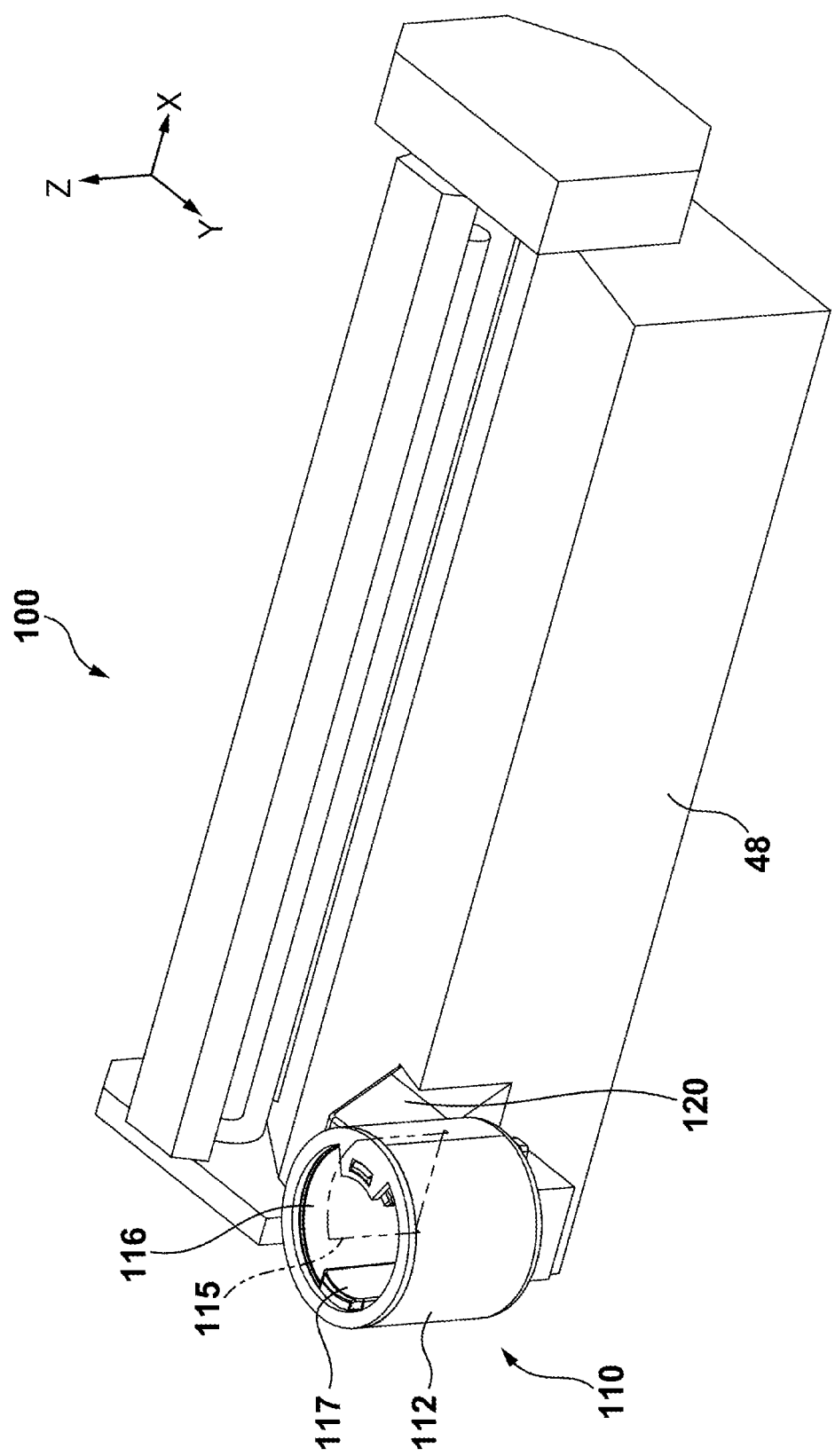
FIG. 3 is a perspective view illustrating a developer container.

Next, the developer container 100 and a surrounding configuration thereof will be described using FIG. 3 and FIG. 4. As shown in FIG. 3, the developer container 100 is constituted by the accommodating portion 48 and a toner receiving portion 110. The toner receiving portion 110 includes an operating portion 111, not shown in FIG. 3, a cylindrical portion 112 formed in cylindrical shape, a connecting portion 120, which connects the cylindrical portion 112 and the accommodating portion 48, and a main body shutter 116. In an inside surface of the cylindrical portion 112, a side surface opening 115 leading to the connecting portion 120 is formed.

Figure 4:
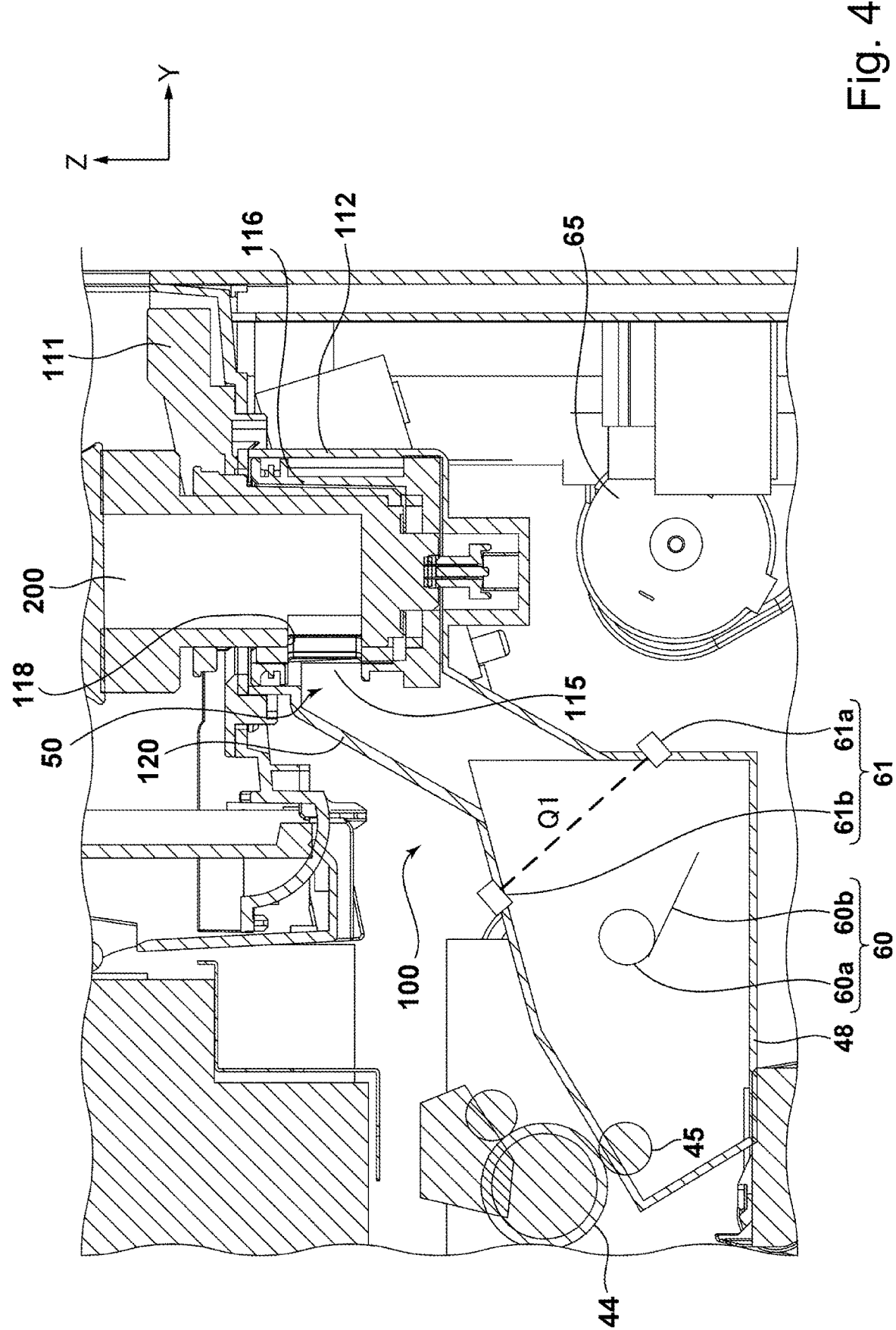
FIG. 4 is a cross-sectional view illustrating the developer container including a toner receiving portion.

As shown in FIG. 4, a replenishing pack 200, which will be described below, is mounted on the toner receiving portion 110, and the toner discharged from the replenishing pack 200 is replenished into the accommodating portion 48 through an opening 118 of the main body shutter 116, the side surface opening 115 of the cylindrical portion 112 and the connecting portion 120. The connecting portion 120 is connected to one end side of the accommodating portion 48 in a longitudinal direction of the developer container 100, in other words, in the X direction, as shown in FIG. 3.

As shown in FIG. 3 and FIG. 4, the main body shutter 116 is a cylindrical member concentric with the cylindrical portion 112 and is provided inside the cylindrical portion 112 rotatably. The main body shutter 116 includes the opening 118 and is movable to an opening position, in which the opening 118 and the side surface opening 115 are aligned, and to a closed position, in which the side surface opening 115 is blocked by a side surface of the main body shutter 116. Incidentally, a seal member may be provided on the side surface of the main body shutter 116 so as to surrounds a peripheral portion of the opening 118.

In addition, a projecting portion 117, which is projecting inwardly in a radial direction perpendicular to a rotational axis direction of the main body shutter 116, is formed on an inside surface of the main body shutter 116. The projecting portion 117, which will be described in detail below, is used to rotate the main body shutter 116 by receiving drive from the replenishing pack 200. The main body shutter 116 is moved between the closed position and the opening position by the operation portion 111 being rotationally operated from an operating position (position shown in FIG. 7) to a replenishing position in a state in which the replenishing pack 200 is mounted on the toner receiving portion 110. Incidentally, at least a portion of the replenishing pack 200 is exposed to outside the image forming apparatus 1 in the state in which the replenishing pack is mounted on the image forming apparatus 1.

In the operating portion 111, a projecting portion 111d, which is projecting inwardly in a radial direction from an inner peripheral surface of the cylindrical portion 112, is provided (see FIG. 7). The projecting portion 111d is configured to be engageable with the projecting portion 117 of the main body shutter 116 via a pair of drive transmitting surfaces 214b (see part (a) of FIG. 5) of a pack shutter 214 of the replenishing pack 200. The main body shutter 116 is moved from the closed position to the opening position by a user rotating a lever portion 111b of the operating portion 111 90 degrees counterclockwise.

Upon performing the image formation to the recording medium P, the toner is stirred in the accommodating portion 48 by a stirring member 60 (see FIG. 4), and therefore the side surface opening 115 needs to be blocked by the main body shutter 116 to prevent the toner from leaking from the side surface opening 115. Thus, upon the image formation, the operating portion 111 is positioned in the operating position so that the main body shutter 116 is positioned in the closed position. On the other hand, upon replenishing the toner from the replenishing pack 200 to the accommodating portion 48, the side surface opening 115 needs to be opened. Thus, upon replenishing the toner, the operating portion 111 is positioned in the replenishing position so that the main body shutter 116 is positioned in the opening position. The operating portion 111 is restricted in rotation so as not to rotate further counterclockwise from the replenishing position by a restricting member, which is not shown.

The operating portion 111 is normally restricted in a rotational direction by a locking mechanism 150, which will be described below, when the replenishing pack 200 is not mounted thereon. By this locking mechanism 150, a situation is prevented, where the replenishing pack 200 becomes not to be able to be mounted due to misalignment of a phase of the projecting portion 111d, which is provided on the operating portion 111 (see FIG. 7), and a phase of the projecting portion 117, which is provided on the main body shutter 116, before mounting the replenishing pack 200.

Inside the accommodating portion 48, as shown in FIG. 4, the stirring member 60 is provided, which rotates about a rotation shaft 60a extending in the X direction. The stirring member 60 includes a sheet-shaped blade portion 60b, which is fixed to the rotation shaft 60a and long in a rotational axis direction thereof, and by being rotationally driven by a driving motor 65, stirs the toner in the accommodating portion 48 and conveys the toner toward the developing roller 45. Incidentally, in the present Embodiment, the stirring member 60 is constituted by the rotation shaft 60a and the blade portion 60b, however, a spiral-shaped stirring member may be used as a configuration to spread the toner over an entire length of the accommodating portion 48.

In addition, the stirring member 60 serves to circulate the toner, which is not used for the development and is scraped from the developing roller 45, in the accommodating portion 48, and to level the toner in the accommodating portion 48. Incidentally, the stirring member 60 is not limited to a rotating shape. For example, a swinging shape may be employed for the stirring member. In addition, another stirring member may be provided in addition to the stirring member 60.

In addition, in the accommodating portion 48, a remaining amount detecting portion 61 for detecting a toner amount in the accommodating portion 48 is provided, and the remaining amount detecting portion 61 includes a light emitting portion 61a and a light receiving portion 61b. Light emitted from the light emitting portion 61a passes through inside the accommodating portion 48 and is received by the light receiving portion 61b. In other words, the light emitting portion 61a and the light receiving portion 61b form an optical passage Q1 inside the accommodating portion 48. Incidentally, it may be configured that the light emitting portion 61a and the light receiving portion 61b is disposed inside the accommodating portion 48, or it may be configured that the light emitting element and the light receiving element is disposed outside the accommodating portion 48 and the light is guided inside and outside the accommodating portion 48 by a light guiding portion.

Furthermore, the light emitting portion 61a and the light receiving portion 61b are provided in a central portion of the accommodating portion 48 in the X direction. By providing the light emitting portion 61a and the light receiving portion 61b in the central portion of the accommodating portion 48, the toner remaining amount in the accommodating portion 48 can be detected properly. In other words, it is likely that the developer (toner) may be unevenly distributed in an end portion of the accommodating portion 48 in the X direction, but less likely in the central portion of the accommodating portion 48, therefore an actual toner remaining amount can be detected.

Incidentally, in the present Embodiment, an LED is used for the light emitting portion 61a and a phototransistor, which becomes an ON state by light from the LED, is used for the light receiving portion 61b, however, it is not limited to this configuration. For example, a halogen lamp or a fluorescent lamp may be employed for the light emitting portion 61a, and a photodiode or an avalanche photodiode may be employed for the light receiving portion 61b.

The light receiving portion 61b, which is the phototransistor, receives the light emitted from the light emitting portion 61a and outputs a signal (electric current) corresponding to received light amount. The signal is converted to voltage and input to the processing circuit 90 (see FIG. 2). In other words, the light receiving portion 61b changes output value based on the amount of the toner (developer) accommodated in the accommodating portion 48.

The processing circuit 90 may, for example, estimate the remaining amount of the toner based on ratio of time, in which the light from the light emitting portion 61a is blocked (by the toner), relative to a certain time window while the toner is being stirred. Incidentally, it is not limited to an exemplary configuration of the remaining amount detecting portion 61 described above, but the toner remaining amount may be detected or estimated by any method. For example, the toner remaining amount may be estimated by subtracting an accumulated usage amount thereafter from a total amount at a last replenishment of the toner. The processing circuit 90 may calculate the usage amount of the toner based on statistical value associated with the image forming operation, such as a number of sheets of the recording medium consumed by printing or pixel counts.

[1-4. Configuration of the Replenishing Pack]

Next, a configuration of the replenishing pack 200 will be described using part (a) and part (b) of FIG. 5. Part (a) of FIG. 5 is a perspective view illustrating the replenishing pack 200 when the pack shutter 214 is positioned in the closed position, and part (b) of FIG. 5 is a perspective view illustrating the replenishing pack 200 when the pack shutter 214 is positioned in the opening position.

The replenishing pack 200 includes, as shown in part (a) and part (b) of FIG. 5, a pouch portion 211, which is a bag containing the toner to be replenished, a nozzle 212 of cylindrical shape, which is inserted into a mounting port 114 (see part (b) of FIG. 6), and the pack shutter 214. The nozzle 212 includes a gripping portion 215, which is connected to an opening portion of the pouch portion 211 of bag shape, and the pouch portion 211 is communicated with the nozzle 212 via the gripping portion 215. In the nozzle 212, an opening 213, through which the toner in the pouch portion 211 is discharged outside, is formed. Incidentally, the pouch portion 211 is constituted by a plastic bag member, which is easily deformable, and the pouch portion 211 is easily pressed to move the consumable agent (toner) in the pouch portion 211 in the gravity direction or to loosen the consumable agent. Incidentally, the pouch portion 211 is not limited to such a configuration but may be constituted of any material such as resin, paper or vinyl, and may have any shape such as a bottled shape, cylindrical shape, or boxed shape. The gripping portion 215 has a sufficiently greater rigidity than the pouch portion 211, and is suitable for the user to grasp upon mounting the replenishing pack 200 on the image forming apparatus 1. Incidentally, it may be configured that the gripping portion 215 is formed separately from the nozzle 212.

The pack shutter 214 is a cylindrical member concentric with the nozzle 212 and is provided outside the nozzle 212 in a radial direction. The pack shutter 214 includes an opening 214c and can be moved to a closed position, which blocks the opening 213 of the nozzle 212, or to an opening position, which opens the opening 213 of the nozzle 212, by being rotated with respect to the nozzle 212. When the opening 214c of the pack shutter 214 overlaps the opening 213 of the nozzle 212, the toner can be replenished from the replenishing pack 200 to the toner receiving portion 110.

In an inner peripheral surface of the pack shutter 214, a seal member 231, which can be rubbed against an outer peripheral surface of the nozzle 212, is fixed and the seal member 231 blocks the opening 213 of the nozzle 212 when the pack shutter 214 is positioned in the closed position.

In addition, a portion of an edge portion, which forms the opening 214c of the pack shutter 214, constitutes the drive transmitting surface 214b. When the drive transmitting surface 214b receives force in a peripheral direction from the projecting portion 111d of the operating portion 111, the pack shutter 214 is rotated with respect to the nozzle 212.

The drive transmitting surface 214b of the pack shutter 214 engages the projecting portion 111d of the operating portion 111 and also engages the projecting portion 117 of the main body shutter 116. The pack shutter 214 is moved (rotated) by operating (acting) force of the operating portion 111, and transmits the operating force to the main body shutter 116, causing the main body shutter 116 also to be moved.

[1-5. Replenishment of the Toner]

Next, a connection of the replenishing pack 200 to the toner receiving portion 110 will be described using part (a) of FIG. 6 through FIG. 7. The discharge tray 82 is openably and closably supported so as to be in a closed position, in which the recording medium P can be stacked thereon, as shown in part (a) of FIG. 6, and in an opening position, in which the discharge tray 82 is opened with respect to a main assembly of the image forming apparatus 1, as shown in part (b) of FIG. 6. The discharge tray 82 covers the mounting port 114 of the toner receiving portion 110 in the closed position. In other words, the discharge tray 82 also serves as a covering member, which covers the mounting port 114.

When the discharge tray 82 is opened to the opening position, a top surface portion 240 and the toner receiving portion 110, which is disposed on the top surface portion 240, are exposed. The toner receiving portion 110 is configured as the replenishing pack 200 is attachable thereto and detachable therefrom, as shown in FIG. 7, so that the user or the service representative can replenish the toner from an outside of the apparatus without removing the developer container 100 from the housing of the image forming apparatus 1.

The operating portion 111 is disposed on the top surface portion 240, as shown in part (b) of FIG. 6 and FIG. 7, and forms the mounting port 114, which is an insertion port for replenishing the toner. In addition, the operating portion 111 includes the lever portion 111b, which is operated by the user, and the projecting portion 117 described above. The operating portion 111 is a member for operating an opening/closing of the pack shutter 214 and the main body shutter 116 externally.

Next, a replenishing process of the toner as the consumable agent using the replenishing pack 200 will be described. First, the user removes the recording media P on the discharge tray 82 and opens the discharge tray 82 from the closed position to the opening position. By this, the toner receiving portion 110 is exposed. Since the toner receiving portion 110 is provided on an upper portion and on the near side of the image forming apparatus 1, it becomes easier to replenish the toner.

In a state in which the discharge tray 82 is opened to the opening position and the toner receiving portion 110 is exposed, the operating portion 111 is restricted in rotation by the locking mechanism 150, which will be described below. And the operating portion 111 is positioned in the operating position.

The user mounts the replenishing pack 200 onto the toner receiving portion 110 by positioning the projecting portion 111d, which is provided on the toner receiving portion 110, in alignment with the opening 214c, which is provided on the replenishing pack 200. It is configured that when the position of the projecting portion 111d is not aligned with the position of the opening 214c, the replenishing pack 200 is interfered with the projecting portion 111d so that the replenishing pack 200 cannot be inserted.

When the replenishing pack 200 is inserted deep into the toner receiving portion 110, the drive transmitting surface 214b of the pack shutter 214 engages the projecting portion 111d of the operating portion 111. In addition, the drive transmitting surface 214b of the pack shutter 214 engages the projecting portion 117 of the main body shutter 116.

In other words, the rotation of the operating portion 111 is transmitted to the pack shutter 214, and the rotation of the pack shutter 214 is transmitted to the main body shutter 116. As a result, the main body shutter 116 is in a state in which the main body shutter 116 and the pack shutter 214 are engaging each other and integrated, and the operating portion 111, the pack shutter 214 and the main body shutter 116 are in interrelation with each other. And when the lock of the operating portion 111 by the locking mechanism 150 is unlocked, the operating portion 111 becomes in a rotatable state. Incidentally, in a state in which the replenishing pack 200 is not mounted on the toner receiving portion 110, the operating portion 111 and the main body shutter 116 are not in interrelation with each other.

The user then turns the lever portion 111b of the operating portion 111 90 degrees counterclockwise. By this, the operating portion 111 is rotated from the operating position to the replenishing position, and the pack shutter 214 and the main body shutter 116 rotate from the closed position to the opening position. As a result, the opening 214c of the pack shutter 214, the opening 213 of the nozzle 212 of the replenishing pack 200, the opening 118 of the main body shutter 116 and the side surface opening 115 of the cylindrical portion 112 overlap. As a result, the toner in the replenishing pack 200 is discharged to the accommodating portion 48 through the connecting portion 120.

In other words, when the operating portion 111 is positioned in the replenishing position, the toner receiving portion 110 is in a replenishable state in which the toner can be replenished from the replenishing pack 200 into the accommodating portion 48. At this time, the opening 213 of the replenishing pack 200 and the side surface opening 115 of the cylindrical portion 112 communicate with each other. In other words, a replenishing passage of the toner from the replenishing pack 200 to the accommodating portion 48 is opened.

When the toner replenishment from the replenishing pack 200 to the accommodating portion 48 is completed, the user returns the operating portion 111 from the replenishing position to the operating position. That is, the user turns the operating lever portion 111b of the operating portion 111 90 degrees clockwise. As a result, the pack shutter 214 and the main body shutter 116 are rotated from the opening position to the closed position.

In other words, when the operating portion 111 is positioned in the operating position, the toner receiving portion 110 is in a non-replenishable state in which the toner cannot be replenished from the replenishing pack 200 into the accommodating portion 48. At this time, the opening 213 of the replenishing pack 200 and the side surface opening 115 of the cylindrical portion 112 do not communicate with each other.

The user then dismount the replenishing pack 200 from the toner receiving portion 110. In this manner, in a state in which the replenishing pack 200 is dismounted from the toner receiving portion 110, the pack shutter 214 is positioned in the closed position, therefore it becomes possible to prevent the toner from leaking from the opening 213 of the replenishing pack 200.

[1-6. Description of the Locking Mechanism]

Next, the locking mechanism 150, which is provided in the toner receiving portion 110, will be described with reference to FIG. 7 through part (b) of FIG. 8. Part (a) of FIG. 8 is a bottom view illustrating a lock member 152 positioned in a locking position, and part (b) of FIG. 8 is a bottom view illustrating the lock member positioned in an unlocking position.

The locking mechanism 150 includes the lock member 152, a projection 111k and a solenoid 155, as shown in part (a) and part (b) of FIG. 8. The lock member 152 is rotatably supported by a shaft 151, which is supported by the housing of the image forming apparatus 1, and includes a tip portion 153, which is capable of engaging the projection 111k. The projection 111k is integrally provided with the operating portion 111, and the rotation of the operating portion 111 is restricted by the lock member 152 engaging the projection 111k.

The lock member 152 is configured to be rotatable between the locking position (position shown in part (a) of FIG. 8), which overlaps a locus of the rotation of the projection 111k, and the unlocking position (position shown in part (b) of FIG. 8), which is retracted from the locus of rotation of the projection 111k. In other words, the locking position is a position which restricts the rotation of operating portion 111, and the unlocking position is a position which permits the rotation of the operating portion 111. The lock member 152 is urged to the locking position by an unshown spring, and is moved to the unlocking position against the urging force of the spring by the solenoid 155 being energized.

When the lock member 152 is positioned in the locking position, even if the user tries to operate the operating portion 111 in an arrow Rc direction, since the tip portion 153 of the lock member 152 and the projection 111k of the operating portion 111 engage, the rotation of the operating portion 111 is restricted. Since the rotation of the operating portion 111 from the operating position to the replenishing position is restricted, the rotation of the pack shutter 214 and the rotation of the main body shutter 116 are also restricted from the closed position to the opening position.

On the other hand, when the lock member 152 is positioned in the unlocking position, since the tip portion is retracted from the locus of the rotation of the projection 111k, the rotation of the operating portion 111 is not restricted. Therefore, the pack shutter 214 and the main body shutter 116 can be rotated from the closed position to the opening position by mounting the replenishing pack 200 on the toner receiving portion 110 and rotating the operating portion 111 from the operating position to the replenishing position.

In other words, when the lock member 152 is positioned in the locking position, the locking mechanism 150 is in a locking state restricting the rotation of the operating portion 111. In addition, when the lock member 152 is positioned in the unlocking position, the locking mechanism 150 is in an unlocking state not restricting the rotation of the operating portion 111. The solenoid 155 is controlled by the processing circuit 90. Conditions for the locking mechanism 150 to be in the unlocking state will be described below. Incidentally, a configuration of the locking mechanism 150 is not limited to the examples described above and may be any mechanism such as mechanical, electromagnetic or electrical mechanism, or a mechanism using software. For example, the lock member 152 may be driven by a motor or other types of actuator instead of the solenoid 155. If a locking mechanism, which is operated by a computer control without relying on user's operation, is employed, the locking state and the unlocking state of the locking mechanism may simply be realized by program codes.

In addition, as shown in FIG. 7, an indicator 125 is disposed near the operating portion 111. The indicator 125 is configured to change display thereof, for example, corresponding to the position of the lock member 152, and indicate the user whether the locking mechanism 150 described above is in the locking state or in the unlocking state. The indicator 125 may be constituted by, for example, a light-emitting diode (LED) disposed in the housing and a window through which light from the LED is transmitted. The user can rotate the operating portion 111 to open the replenishing passage of the toner when the indicator 125 indicates that the locking mechanism 150 is in the unlocking state.

[1-7. Example of a Configuration of the Image Forming Apparatus]

FIG. 9 is a block diagram illustrating an example of the control block of the image forming apparatus 1 according to the present Embodiment. As shown in FIG. 9, the image forming apparatus 1 is provided with a communication interface (I/F) 11, a memory 12, a user interface (I/F) 13, the image forming portion 40, an open/close mechanism 51, the locking mechanism 150, and the processing circuit 90.

The processing circuit 90 includes a CPU 94 which executes various programs. The communication I/F 11 is an interface for the image forming apparatus 1 to communicate with other devices. For example, under control of the processing circuit 90, the communication I/F 11 notifies printer statuses of a side of various image forming apparatuses, including the toner remaining amount information indicating the toner remaining amount, to remote service providing-side apparatuses.

The memory 12 may include any type of storage medium, such as, for example, a semiconductor memory such as a ROM or a RAM, an optical disk, or a magnetic disk. The memory 12 may include a non-transient computer readable storage medium. The memory 12 stores one or more computer programs to be executed by the processing circuit 90 and a variety of data. Incidentally, the memory 12 may be located on the processing circuit 90.

The user I/F 13 may include an input device for receiving an operation and information input by the user and a display device for displaying images and information. For example, the user I/F 13 may include one or more of a touch panel, a keypad, a button, a switch, a microphone and a speaker. The user I/F 13 may be treated as an operating device integrated into the image forming apparatus 1.

The image forming portion 40 consumes the toner stored in the accommodating portion 48 to form the image on the recording medium, as described using FIG. 2. The open/close mechanism 51 is a mechanism capable of opening and closing the replenishing passage 50 (see FIG. 4) from the replenishing pack 200, which is connected to the toner receiving portion 110, to the accommodating portion 48. The operating portion 111 including the lever portion 111b and the projecting portion 111d described above, the pack shutter 214 of the replenishing pack 200 and the main body shutter 116 is an example of the open/close mechanism 51.

The locking mechanism 150 unlocks the open/close mechanism 51 based on an unlock instruction from the CPU 94. For example, the CPU 94 may energize the solenoid 155 of the locking mechanism 150 to rotate the lock member 152 as shown in part (b) of FIG. 8. By this, it becomes possible for the user to rotate the main body shutter 116 and the pack shutter 214 of the replenishing pack 200 together with the operating portion 111 to open the replenishing passage 50.

In the present Embodiment, an example in which the toner replenishing passage 50 is opened by force in the rotational direction generated by the user operating the lever portion 111b of the operating portion 111 is described, however, the closing and the opening of the replenishing passage 50 may be performed without relying on the user's operation. As an example, the image forming apparatus 1 may be provided with a pack sensor, which detects that the replenishing pack 200 is connected to the toner receiving portion 110, and a driving motor, which generates driving force to rotate the operating portion 111. In this example, the processing circuit 90 may actuate the driving motor to open the replenishing passage 50 by rotating the operating portion 111 by rotational force of the driving motor under a condition that the connection of the replenishing pack 200 to the toner receiving portion 110 is detected by the pack sensor.

In addition, the open/close mechanism 51 has been described in the configuration including the rotating pack shutter 214 and the main body shutter 116 as an example, however, it is not limited to this configuration. For example, instead of these rotating shutters, a shutter movable in a straight line direction may be employed, or an open/close mechanism different from the shutters, such as a valve, may be employed. In addition, the open/close mechanism 51 need only be disposed on at least one of the accommodating device, such as the replenishing pack 200, and the image forming apparatus. That is, the replenishing passage from the accommodating device to the image forming apparatus may always be open on one side of the accommodating device and the image forming apparatus, and may only be opened and closed on the other side. Instead, the replenishing passage may be opened and closed on both the accommodating device and the image forming apparatus, as in the Embodiment described above. In addition, an additional sensor may be provided to detect an operation of the open/close mechanism by the user or to detect a state (opening state or closed state) of the open/close mechanism.

In addition, the operation of the open/close mechanism 51 described above may be directly or indirectly restricted by the locking mechanism 150 (by user's operation or automatically). In addition, similar to the open/close mechanism, the locking mechanism may also be disposed on at least one of the accommodating device and the image forming apparatus.

In addition, a leak-proof member such as a lid or a cap for preventing the toner from leaking may be attached to the mounting port 114 of the image forming apparatus 1 or the opening 213 of the replenishing pack 200. Such a leak-proof member may be freely removable by the user at any time.

Embodiment 1

[2. Different Types of the Image Forming Apparatus and the Replenishing Pack]

Here, an image forming apparatus of registration-type 400 and a standard image forming apparatus 500, which is provided with approximately the same configuration as the image forming apparatus 1 described above, and a replenishing pack of registration-type 1200 and a standard replenishing pack 501, which is provided with approximately the same configuration as the replenishing pack 200, will be described. The image forming apparatus of registration-type 400, the standard image forming apparatus 500, the replenishing pack of registration-type 1200, and the standard replenishing pack 501 constitute a replenishing system for replenishing the toner as the consumable agent.

Incidentally, differences between the image forming apparatus of registration-type 400 and the standard image forming apparatus 500 with respect to the image forming apparatus 1, and differences between the replenishing pack of registration-type 1200 and the standard replenishing pack 501 with respect to the replenishing pack 200 will be described below.

The image forming apparatus of registration-type 400 and the replenishing pack of registration-type 1200 are an image forming apparatus and a replenishing pack corresponding to a predetermined service such as a subscription service. The subscription service is, for example, a service in which a user registers the image forming apparatus to be used online in advance and pays a certain amount of money to a dealer, then the user becomes capable of performing a predetermined number of prints. The replenishing pack of registration-type 1200 may be automatically shipped to the user based on a fact, for example, that the toner remaining amount in the image forming apparatus of registration-type 400 is low, or that an arrival of a supply timing of the pack based on a contract of the subscription service, or is arbitrarily shipped based on an order from the user. In other words, the replenishing pack of registration-type 1200 is a service-only replenishing pack which is shipped in accordance with the contract of the subscription service.

On the other hand, the standard image forming apparatus 500 and the standard replenishing pack 501 are an image forming apparatus and a replenishing pack which do not conform to the predetermined service such as the subscription service. As described above, while the replenishing pack of registration-type 1200 is a dedicated product which is shipped in accordance with the contract of the subscription service, the standard replenishing pack 501 is the replenishing pack which is sold in a general market, such as electronics retail stores or e-commerce sites. Incidentally, the image forming apparatus of registration-type 400 and the standard image forming apparatus 500 may be sold in the general market, such as the electronics retail stores and the e-commerce sites as usual, or may be made available for purchase at a direct sales site dedicated to a manufacturer, and an obtaining method is not limited to a particular way.

Generally, when using the replenishing pack of registration-type 1200 and the image forming apparatus of registration-type 400, a user performs a user registration to a managing server, and then a user may receive benefit, which is not available when using the standard replenishing pack 501 and the standard image forming apparatus 500. For example, the user may have cost advantages such as low running costs by signing a contract for continuous use for a certain period of time, or experience easy maintenance such that when consumables (in the present Embodiment, for example, the replenishing pack of registration-type 1200) run low, the consumables are automatically shipped and delivered to the user. The benefits listed here are examples and are not limited to these.

The user who owns the image forming apparatus of registration-type 400 may obtain the replenishing pack of registration-type 1200 by subscribing to the subscription service described above. However, there is a possibility that the image forming apparatus of registration-type 400 and the standard image forming apparatus 500 exist in the same environment, such as in a case in which the same user owns the standard image forming apparatus 500 additionally. In such a case, if the user is allowed to use the sent replenishing pack of registration-type 1200 for the standard image forming apparatus 500 by mistake, it will be difficult to retrieve the toner from the standard image forming apparatus 500 that has been replenished at once. In addition, since the dealer has already sent the replenishing pack of registration-type 1200 to the user, if the dealer has to send a new replenishing pack of registration-type 1200 after receiving a call from the user, there is a possibility that a procedure may be complicated by charging the user an additional fee, etc. Furthermore, since there is a time lag before the new replenishing pack of registration-type 1200 arrives at the user's location, the user cannot use the image forming apparatus of registration-type 400 during the time lag, resulting in an occurrence of a period during which the user cannot receive benefit from the subscription service. In other words, it is preferable to be managed so that, for the standard image forming apparatus 500, the standard replenishing pack 501 is usable, but the replenishing pack of registration-type 1200 is not usable.

On the other hand, there are cases in which a user, who owns the image forming apparatus of registration-type 400, wants to use the standard replenishing pack 501 for the image forming apparatus of registration-type 400. For example, it is a case when the user has signed a contract to receive the replenishing pack of registration-type 1200 on a regular basis for a fixed price. If a print volume for a certain period temporarily increases, there may be a case in which the toner in the image forming apparatus of registration-type 400 runs out before the next replenishing pack of registration-type 1200 is sent in accordance with the contract of the subscription service. In that case, the user may want to use the standard replenishing pack 501, which is readily available, temporarily. In other words, it is preferable that, for the image forming apparatus of registration-type 400, both the standard replenishing pack 501 and the replenishing pack of registration-type 1200 be usable.

In summary, combination of the image forming apparatus and the replenishing pack as shown in Table 1 are preferable.

TABLE 1

|  | Standard replenishing pack | Replenishing pack of registration-type |
|---|---|---|
| Standard image forming apparatus | Usable | Not usable |
| Image forming apparatus of registration-type | Usable | Usable |

[2-1. Image Forming Apparatus of Registration-Type and Replenishing Pack of Registration-Type]

Part (a) of FIG. 10 is a perspective view illustrating an operating portion 1111 of the image forming apparatus of registration-type 400, part (b) of FIG. is a perspective view illustrating the replenishing pack of registration-type 1200, and part (c) of FIG. 10 is another perspective view illustrating the replenishing pack of registration-type 1200. Part (a) of FIG. 11 is a plan view illustrating the operating portion 1111 of the image forming apparatus of registration-type 400, and part (b) of FIG. 11 is a plan view illustrating a pack shutter 1214 of the replenishing pack of registration-type 1200. Part (c) of FIG. 11 is a plan view illustrating an operating portion 811 of the standard image forming apparatus 500, and part (d) of FIG. 11 is a plan view illustrating a pack shutter 714 of the standard replenishing pack 501. Part (a) of FIG. 12 is a perspective view illustrating a process in which the replenishing pack of registration-type 1200 is mounted on a mounting port 1114, and part (b) of FIG. 12 is another perspective view illustrating the process in which the replenishing pack of registration-type 1200 is mounted on the mounting port 1114.

As shown in part (a) of FIG. 10 and part (a) of FIG. 11, a toner receiving portion 1110 of the image forming apparatus of registration-type 400 as a second image forming apparatus includes the operating portion 1111. The operating portion 1111 includes the mounting port 1114 as a second mounting port, a groove 611 as a second groove provided in the projecting portion 111d, and a groove 612 as a third groove provided in a position approximately 180° different from the groove 611 in a peripheral direction. Incidentally, the groove 611 and the groove 612 are continuous with the mounting port 1114 and included in the mounting port 1114. In other words, in the mounting port 1114, an approximately circular opening is provided, and the groove 611 and the groove 612 are disposed in the opening so as to be different in a phase from each other by approximately 180 degrees.

The groove 611 and the groove 612 extend from a center of the mounting port 1114 to outward in a radial direction of the mounting port 1114, respectively. In addition, the operating portion 1111 is provided with a sliding member 615, which is provided so as to overlap the groove 611 in a mounting direction M of the replenishing pack of registration-type 1200 and is capable of sliding move in a direction of an arrow F by being pressed by a projecting portion 621 of the replenishing pack of registration-type 1200, which will be described below. Incidentally, a tapered surface disposed on a contacting portion between the projecting portion 621 and the sliding member 615 is provided on at least one of the projecting portion 621 and the sliding member 615. The tapered surface is inclined with respect to the mounting direction M. In addition, the sliding member 615 as a second moving member is urged to a standby position by, for example, a spring, which is not shown, in a state in which the sliding member 615 is not pressed by the projecting portion 621, and is moved to a moved position as a second position by being pressed by the projecting portion 621.

The operating portion 1111 has the same configuration as the operating portion 111 (see FIG. 7) described above, except that the operating portion 1111 includes the groove 611, the groove 612 and the sliding member 615. In addition, the toner receiving portion 1110 has the same configuration as the toner receiving portion 110 (see FIG. 3), except that the toner receiving portion 1110 includes the operating portion 111 instead of the operating portion 111.

As shown in part (b) and part (c) of FIG. 10 and part (b) of FIG. 11, the pack shutter 1214 of the replenishing pack of registration-type 1200 as a second accommodating device includes the projecting portion 621 and a projecting portion 622 which is provided in a position approximately 180° different from the projecting portion 621 in a peripheral direction. The projecting portion 621 and the projecting portion 622 extend in a direction crossing the mounting direction M of the replenishing pack of registration-type 1200, respectively. The pack shutter 1214 and the nozzle 212 of the replenishing pack of registration-type 1200 constitute an interface portion 1300 as a second interface portion, which is mountable on the mounting port 1114. The interface portion 1300 is provided on a downstream end with respect to the mounting direction M of the replenishing pack of registration-type 1200. In the present Embodiment, since the mounting direction M is facing downward in the gravity direction, the interface portion 1300 is provided on a lower end of the replenishing pack of registration-type 1200 in a state of being mounted on the mounting port 1114.

The projecting portion 621 as a second projecting portion is configured to be insertable into the groove 611 of the operating portion 1111, and the projecting portion 622 as a third projecting portion is configured to be insertable into the groove 612 of the operating portion 1111. Incidentally, the pack shutter 1214 has the same configuration as the pack shutter 214 (see part (a) and part (b) of FIG. 5) described above, except that the pack shutter 1214 includes the projecting portion 621 and the projecting portion 622.

As shown in part (a) and part (b) of FIG. 12, when the replenishing pack of registration-type 1200 is mounted on the mounting port 1114, the user positions the projecting portion 621 and the projecting portion 622 of the pack shutter 1214 to the groove 611 and the groove 612 of the operating portion 1111, respectively. Incidentally, since the replenishing pack of registration-type 1200 is provided with the gripping portion 215 which is more rigid than the pouch portion 211, the user can easily mount the replenishing pack of registration-type 1200 on the mounting port 1114 by gripping the gripping portion 215. In the peripheral direction of the operating portion 1111, a width 611$t$ of the groove 611 is greater than a width 621$t$ of the projecting portion 621. In addition, in the peripheral direction of the operating portion 1111, a width 612$t$ of the groove 612 is greater than a width 622$t$ of the projecting portion 622.

Thus, when the replenishing pack of registration-type 1200 is mounted on the mounting port 1114, the projecting portion 621 and the projecting portion 622 are insertable into the groove 611 and the groove 612, respectively, without interference. In other words, the interface portion 1300 of the replenishing pack of registration-type 1200 is mountable on the mounting port 1114 of the image forming apparatus of registration-type 400. When the replenishing pack of registration-type 1200 is mounted on the mounting port 1114 and the projecting portion 621 is inserted into the groove 611, the sliding member 615, which is positioned so as to overlap the groove 611, is pressed by the projecting portion 621 and is moved in the arrow F direction from the standby position to the moved portion.

In response that the sliding member 615 is moved from the standby position to the moved position, the solenoid 155 of the locking mechanism 150 (see part (a) of FIG. 8) is activated and the locking mechanism 150 comes to be in the unlocking state. For example, it may be configured that, as a sensor, which is not shown, is turned on by the sliding member 615 being moved from the standby position to the moved position in the direction of the arrow F, the solenoid 155 may be activated based on the sensor being turned on.

By the locking mechanism 150 of the image forming apparatus of registration-type 400 being in the unlocking state, that is, by the lock member 152 as a second restricting portion being moved from the locking position as a second restricting position to the unlocking position as a second permitting position, the operating portion 1111 becomes rotatable. In other words, the pack shutter 1214 and the main body shutter 116, as second open/close portions, which are in interrelation with the operating portion 1111, become openable and closable. The pack shutter 1214 and the main body shutter 116 are configured to be capable of opening and closing the replenishing passage 50 (see FIG. 4) of the consumable agent (toner), as a second replenishing passage, from the replenishing pack of registration-type 1200 to the image forming apparatus of registration-type 400. Incidentally, in the present Embodiment, both the pack shutter 1214 and the main body shutter 116 are provided, however, it may be configured that only either one of the pack shutter 1214 or the main body shutter 116 is provided. When the operating portion 1111 is rotated by the user from the operating position to the replenishing position and the pack shutter 1214 and the main body shutter 116 are opened, it becomes possible for the replenishing pack of registration-type 1200 to replenish the toner.

[2-2. Standard Replenishing Pack]

Part (a) of FIG. 13 is a perspective view illustrating the standard replenishing pack 501, and part (b) of FIG. 13 is another perspective view illustrating the standard replenishing pack 501. As shown in part (d) of FIG. 11 and part (a) and part (b) of FIG. 13, a pack shutter 714 of the standard replenishing pack 501 as a first accommodating device is provided with a projecting portion 721 as a first projecting portion. The projecting portion 721 extends in a direction crossing a mounting direction M of the standard replenishing pack 501. Incidentally, at a position approximately 180° different from the projecting portion 721 in a peripheral direction of the pack shutter 714, a projecting portion, such as the projecting portion 622 described above, is not provided.

The pack shutter 714 and nozzle 212 of the standard replenishing pack 501 constitute an interface portion 503 as a first interface portion mountable on a mounting port 514 of the standard image forming apparatus 500, which will be described below. The interface portion 503 is provided on a downstream end with respect to the mounting direction M of the standard replenishing pack 501. In the present Embodiment, since the mounting direction M is facing downward in the gravity direction, the interface portion 503 is provided on a lower end of the standard replenishing pack 501 in a state of being mounted on the mounting port 514. Incidentally, the pack shutter 714 has the same configuration as the pack shutter 214 (see part (a) and part (b) of FIG. 5) described above, except that the pack shutter 714 includes a projecting portion 721.

Part (a) of FIG. 14 is a perspective view illustrating a process in which the standard replenishing pack 501 is mounted on the mounting port 1114 of the image forming apparatus of registration-type 400. Part (b) of FIG. 14 is another perspective view illustrating the process in which the standard replenishing pack 501 is mounted on the mounting port 1114 of the image forming apparatus of registration-type 400.

As shown in part (a) and part (b) of FIG. 14, when the standard replenishing pack 501 is mounted on the mounting port 1114, the user positions the projecting portion 721 of the pack shutter 714 to the groove 611 of the operating portion 1111. In the peripheral direction of the operating portion 1111, the width 611$t$ of the groove 611 is greater than a width 721$t$ of the projecting portion 721. In addition, the pack shutter 714 is not provided with a projecting portion on the groove 612 side.

Therefore, upon mounting the standard replenishing pack 501 on the mounting port 1114, the projecting portion 721 is insertable without interfering with the groove 611. In other words, the interface portion 503 of the standard replenishing pack 501 is mountable on the mounting port 1114 of the image forming apparatus of registration-type 400. When the standard replenishing pack 501 is mounted on the mounting port 1114 and the projecting portion 721 is inserted into the groove 611, the sliding member 615, which is provided inside the groove 611, is moved in the direction of the arrow F from the standby position to the moved portion by being pressed by the projecting portion 721. As a result, the locking mechanism 150 becomes unlocking state, as described above, and it becomes possible for the standard replenishing pack 501 to replenish the toner.

[2-3. Standard Image Forming Apparatus]

FIG. 15 is a perspective view illustrating an operating portion 811 of the standard image forming apparatus 500. Part (a) of FIG. 16 is a perspective view illustrating a process in which the standard replenishing pack 501 is mounted on the mounting port 514 of the standard image forming apparatus 500. Part (b) of FIG. 16 is another perspective view illustrating the process in which the standard replenishing pack 501 is mounted on the mounting port 514 of the standard image forming apparatus 500.

As shown in part (c) of FIG. 11 and FIG. 15, a toner receiving portion 2110 of the standard image forming apparatus 500 as a first image forming device includes the operating portion 811. The operating portion 811 includes the mounting port 514 as a first mounting port and a groove 911 as a first groove provided in the projecting portion 111$d$. The operating portion 811 is not provided with a groove at a position which is approximately 180° different from the groove 911 in a peripheral direction. Incidentally, the groove 911 is continuous with and is included in the mounting port 514. In other words, in the mounting port 514, an approximately circular opening is provided, and the groove 911 is provided in the opening. The groove 911 extends from a center of the mounting port 514 to outward in a radial direction of the mounting port 514. In addition, the operating portion 811 includes a sliding member 915, which is provided inside the groove 911 and is capable of sliding move in a direction of an arrow F by being pressed by the projecting portion 721 of the standard replenishing pack 501. Incidentally, a tapered surface, which is disposed on a contacting portion between the projecting portion 721 and the sliding member 915, is provided on at least one of the projecting portion 721 and the sliding member 915. The tapered surface is inclined with respect to a mounting direction M. In addition, the sliding member 915 as a first moving member is urged to a standby position by, for example, a spring, which is not shown, in a state in which the sliding member 915 is not pressed by the projecting portion 721, and is moved to a moved position as a first position by being pressed by the projecting portion 721.

The operating portion 811 has the same configuration as the operating portion 111 (see FIG. 7) described above, except that the operating portion 811 includes the groove 911 and the sliding member 915. In addition, the toner receiving portion 2110 also has the same configuration as the toner receiving portion 110 (see FIG. 3), except that the toner receiving portion 2110 includes the operating portion 811 instead of the operating portion 111.

As shown in part (a) and part (b) of FIG. 16, when the standard replenishing pack 501 is mounted on the mounting port 514 of the standard image forming apparatus 500, the user positions the projecting portion 721 of the pack shutter 714 to the groove 911 of the operating portion 811. Incidentally, since the standard replenishing pack 501 is provided with the gripping portion 215 which is more rigid than the pouch portion 211, the user can easily mount the standard replenishing pack 501 on the mounting port 514 by gripping the gripping portion 215. In the peripheral direction of the operating portion 811, a width 911$t$ of the groove 911 (see part (c) of FIG. 11) is greater than the width 721$t$ of the projecting portion 721 (see part (d) of FIG. 11).

Therefore, upon mounting the standard replenishing pack 501 on the mounting port 514, the projecting portion 721 is insertable without interfering with the groove 911. In other words, the interface portion 503 of the standard replenishing pack 501 is mountable on the mounting port 514 of the standard image forming apparatus 500. When the standard replenishing pack 501 is mounted on the mounting port 514 and the projecting portion 721 is inserted into the groove 911, the sliding member 915, which is provided so as to overlap the groove 911, is moved in the direction of the arrow F from the standby position to the moved position by being pressed by the projecting portion 721.

In response that the sliding member 915 is moved from the standby position to the moved position, the solenoid 155 of the locking mechanism 150 (see part (a) of FIG. 8) is activated and the locking mechanism 150 becomes in the unlocking state. For example, it may be configured that, as an unshown sensor is turned on by the sliding member 915 being moved from the standby position to the moved position in the direction of the arrow F, the solenoid 155 is activated based on the sensor being turned on.

By the locking mechanism 150 of the standard image forming apparatus 500 being in the unlocking state, that is, by the lock member 152 as a first restricting portion being moved from the locking position as a first restricting position to the unlocking position as a first permitting position, the operating portion 811 becomes rotatable. In other words, the pack shutter 714 and the main body shutter 116, as a first open/close portion, which are in interrelation with the operating portion 811, become openable and closable. The pack shutter 714 and the main body shutter 116 are configured to be capable of opening and closing the replenishing passage 50 (see FIG. 4) of the consumable agent (toner), as a first replenishing passage, from the standard replenishing pack 501 to the standard image forming apparatus 500. Incidentally, in the present Embodiment, both the pack shutter 714 and the main body shutter 116 are provided, however, it may be configured that only either one of the pack shutter 714 or the main body shutter 116 is provided. When the operating portion 811 is rotated by the user from the operating position to the replenishing position and the pack shutter 714 and the main body shutter 116 are opened, it becomes possible for the standard replenishing pack 501 to replenish the toner.

[2-4. Mounting of the Replenishing Pack of Registration-Type on the Standard Image Forming Apparatus]

Part (a) of FIG. 17 is a perspective view illustrating a process in which the replenishing pack of registration-type 1200 is mounted on the mounting port 514 of the standard image forming apparatus 500. Part (b) of FIG. 17 is another perspective view illustrating the process in which the replenishing pack of registration-type 1200 is mounted on the mounting port 514 of the standard image forming apparatus 500.

As described above, in the operating portion 811, a groove is not provided at the position which is approximately 180° different from the groove 911 in the peripheral direction. On the other hand, the pack shutter 1214 of the replenishing pack of registration-type 1200 includes the projecting portion 622 provided at the position approximately 180° different from the projecting portion 621 in the peripheral direction.

As shown in part (a) and part (b) of FIG. 17, when the user attempts to mount the replenishing pack of registration-type 1200 on the mounting port 514 of the standard image forming apparatus 500, the projecting portion 622 of the replenishing pack of registration-type 1200 interferes with a contacting portion W, which is part of the mounting port 514 of the operating portion 811. Therefore, the replenishing pack of registration-type 1200 cannot be mounted on the mounting port 514 of the standard image forming apparatus 500. In other words, the interface portion 1300 of the replenishing pack of registration-type 1200 cannot be mounted on the mounting port 514 of the standard image forming apparatus 500. Therefore, the sliding member 915 provided in the operating portion 811 is not moved in the direction of the arrow F from the standby position to the moved position, and the locking mechanism 150 remains in the locking state. As a result, the replenishing pack of registration-type 1200 cannot perform the replenishment of the toner to the standard image forming apparatus 500.

Incidentally, in the above description, the image forming apparatus of registration-type is illustrated in part (a) of FIG. 10, the replenishing pack of registration-type is illustrated in part (b) and part (c) of FIG. 10, the standard replenishing pack is illustrated in part (a) and part (b) of FIG. 13, and the standard image forming apparatus is illustrated in FIG. 15, respectively, however, it is not limited to this combination. For example, what is illustrated in FIG. 5 may be applied to the registered replenishing pack, what is illustrated in FIG. 6 may be applied to the image forming apparatus of registration-type (without grooves or sliding members provided in the operating portion), what is illustrated in part (a) of FIG. 10 may be applied to the standard image forming apparatus, and what is illustrated in part (b) and part (c) of FIG. 10 may be applied to the standard replenishing pack, respectively. In this case also, the replenishing pack of FIG. 5 can be mounted on the apparatus main assembly without being restricted in moving by the shape of the mounting port of part (a) of FIG. 10, and the replenishing pack of part (b) and part (c) of FIG. 10 cannot be mounted since the replenishing pack do not fit the shape of the mounting port of FIG. 6. In other words, the same effect can be obtained. Incidentally, with respect to the locking mechanism 150, the locking mechanism 150 may be removed from the apparatus or the criteria for locking may be changed.

As described above, in the present Embodiment, by the mechanical configurations provided in each replenishing pack and image forming apparatus, it becomes possible to realize the combination of usability shown in Table 1. Thus, in the image forming apparatus of the replenishing method, it becomes possible to suppress that the accommodating device for replenishing the consumable agent, which is provided through the predetermined service, is used by the image forming apparatus which is not subject to the predetermined service.

Embodiment 2

Next, an Embodiment 2 of the present invention will be described, however, the Embodiment 2 of the present invention is what realizes the combination of usability shown in Table 1 described above by mechanical configurations different from those of the Embodiment 1. Therefore, with respect to the same configurations as in the Embodiment 1, illustrations in Figures will be omitted, or the same reference numerals will be attached in Figures.

[3-1. The Image Forming Apparatus of Registration-Type and the Replenishing Pack of Registration-Type]

Part (a) of FIG. 18 is a plan view illustrating an operating portion 2111 of the image forming apparatus of registration-type 400 (see part (a) of FIG. 10) according to the Embodiment 2, and part (b) of FIG. 18 is a plan view illustrating a pack shutter 2214 of a replenishing pack of registration-type 2200 according to the Embodiment 2.

As shown in part (a) of FIG. 18, the operating portion 2111 of the image forming apparatus of registration-type 400 (see part (a) of FIG. 10) includes a mounting port 2114 as the second mounting port and a groove 2611 as the second groove provided in the projecting portion 111d. Incidentally, the groove 2611 is continuous with and included in the mounting port 2114. In other words, in the mounting port 2114, an approximately circular opening is provided, and the groove 2611 is disposed in the opening. The groove 2611 extends from a center of the mounting port 2114 to outward in a radial direction of the mounting port 2114. In addition, the operating portion 2111 is provided with a sliding member 615, which is provided so as to overlap the groove 2611 in a mounting direction M of the replenishing pack of registration-type 2200 and is capable of sliding move in a direction of an arrow F by being pressed by a projecting portion 2621, which will be described below.

As shown in part (b) of FIG. 18, the replenishing pack of registration-type 2200 includes an interface portion 2300 as the second interface portion including the nozzle 212 (see part (b) of FIG. 5) and the pack shutter 2214. The pack shutter 2214 includes the projecting portion 2621 as the second projecting portion, which is provided on an outer peripheral surface thereof, and the projecting portion 2621 is configured to be insertable into the groove 2611.

Upon mounting the interface portion 2300 of the replenishing pack of registration-type 2200 to the mounting port 2114, the user positions the projecting portion 2621 of the pack shutter 2214 to the groove 2611 of the operating portion 2111. In a peripheral direction of the operating portion 2111, a width 2611t of the groove 2611 as a second width is wider than a width 2621t of the projecting portion 2621 as a third width.

Thus, upon mounting the replenishing pack of registration-type 2200 to the mounting port 2114, the projecting portion 2621 can be inserted without interfering with the groove 2611. In other words, the interface portion 2300 of the replenishing pack of registration-type 2200 is mountable on the mounting port 2114 of the image forming apparatus of registration-type 400. When the replenishing pack of registration-type 2200 is mounted on the mounting port 2114 and the projecting portion 2621 is inserted into the groove 2611, the sliding member 615, which is positioned so as to overlap the groove 2611, is moved in the direction of the arrow F from the standby position to the moved position by being pressed by the projecting portion 2621.

In response that the sliding member 615 is moved from the standby position to the moved position, the solenoid 155 of the locking mechanism 150 (see part (a) of FIG. 8) is activated and the locking mechanism 150 becomes in the unlocking state. As a result, it becomes possible for the replenishing pack of registration-type 2200 to replenish the toner.

[3-2. The Standard Image Forming Apparatus and the Standard Replenishing Pack]

Part (c) of FIG. 18 is a plan view illustrating an operating portion 2811 of the standard image forming apparatus 500 (see FIG. 15) according to the Embodiment 2, and part (d) of FIG. 18 is a plan view illustrating a pack shutter 2714 of a standard replenishing pack 2501 according to the Embodiment 2.

As shown in part (c) of FIG. 18, the operating portion 2811 of the standard image forming apparatus 500 (see FIG. 15) includes a mounting port 2514 as the first mounting port and a groove 2911 as the first groove provided in the projecting portion 111d. Incidentally, the groove 2911 is continuous with and included in the mounting port 2514. In other words, in the mounting port 2514, an approximately circular opening is provided, and the groove 2911 is provided in the opening. The groove 2911 extends from a center of the mounting port 2514 to outward in a radial direction of the mounting port 2514. In addition, the operating portion 2811 is provided with a sliding member 915, which is provided so as to overlap the groove 2911 in the mounting direction M of the standard replenishing pack 2501 and is capable of sliding move in a direction of an arrow F by being pressed by a projecting portion 2721, which will be described below.

As shown in part (d) of FIG. 18, the standard replenishing pack 2501 includes an interface portion 2503 as the first interface portion including the nozzle 212 (see part (b) of FIG. 5) and the pack shutter 2714. The pack shutter 2714 includes the projecting portion 2721 as the first projecting portion provided on an outer peripheral surface thereof, and the projecting portion 2721 is configured to be insertable into the groove 2911.

Upon mounting the interface portion 2503 of the standard replenishing pack 2501 to the mounting port 2514, the user positions the projecting portion 2721 of the pack shutter 2714 to the groove 2911 of the operating portion 2811. In a peripheral direction of the operating portion 2811, a width 2911t of the groove 2911 as a first width is wider than a width 2721t of the projecting portion 2721.

Therefore, upon mounting the standard replenishing pack 2501 on the mounting port 2514, the projecting portion 2721 is insertable without interfering with the groove 2911. In other words, the interface portion 2503 of the standard replenishing pack 2501 is mountable on the mounting port 2514 of the standard image forming apparatus 500. When the standard replenishing pack 2501 is mounted on the mounting port 2514 and the projecting portion 2721 is inserted into the groove 2911, the sliding member 915, which is positioned so as to overlap the groove 2911, is moved in the direction of the arrow F from the standby position to the moved portion by being pressed by the projecting portion 2721.

In response that the sliding member 915 is moved from the standby position to the moved position, the solenoid 155 of the locking mechanism 150 (see part (a) of FIG. 8) is activated and the locking mechanism 150 becomes in the unlocking state. As a result, it becomes possible for the standard replenishing pack 2501 to replenish the toner.

[3-3. Relationship Between Widths of Each Groove and Each Projecting Portion]

Here, relationship between the width 2611t of the groove 2611, the width 2911t of the groove 2911, the width 2621t of the projecting portion 2621 and the width 2721t of the projecting portion 2721 will be described. As mentioned above, the width 2611t of the groove 2611 is wider than the width 2621t of the projecting portion 2621, and the width 2911t of the groove 2911 is wider than the width 2721t of the projecting portion 2721. Furthermore, the width 2621t of the projecting portion 2621 is wider than the width 2911t of the groove 2911. Thus, the relationship between the widths of each groove and each projecting portion is as follows.

$$(\text{Width } 2721t) < (\text{Width } 2911t) < (\text{Width } 2621t) < (\text{Width } 2611t)$$

Due to the relationship between the widths of each groove and each projecting portion, when the standard replenishing pack 2501 is mounted on the mounting port 2114 of the image forming apparatus of registration-type 400, the projecting portion 2721 is insertable without interfering with the groove 2611. In other words, the interface portion 2503 of the standard replenishing pack 2501 is mountable on the mounting port 2114 of the image forming apparatus of registration-type 400. When the standard replenishing pack 2501 is mounted on the mounting port 2114 and the projecting portion 2721 is inserted into the groove 2611, the sliding member 615, which is provided inside the groove 2611, is moved in the direction of the arrow F from the standby position to the moved position by being pressed by the projecting portion 2721. As a result, the locking mechanism 150 becomes unlocking state, as described above, and it becomes possible for the standard replenishing pack 2501 to replenish the toner.

On the other hand, when the user attempts to mount the replenishing pack of registration-type 2200 to the mounting port 2514 of the standard image forming apparatus 500, the projecting portion 2621 of the replenishing pack of registration-type 2200 interferes with the groove 2911 of the mounting port 2514. Therefore, the replenishing pack of registration-type 2200 cannot be mounted on the mounting port 2514 of the standard image forming apparatus 500. In other words, the interface portion 2300 of the replenishing pack of registration-type 2200 cannot be mounted on the mounting port 2514 of the standard image forming apparatus 500. Therefore, the sliding member 915 provided in the operating portion 2811 is not moved in the direction of the arrow F from the standby position to the moved portion, and the locking mechanism 150 remains in the locking state. As a result, the replenishing pack of registration-type 2200 cannot perform the replenishment of the toner to the standard image forming apparatus 500.

As described above, in the present Embodiment, by the mechanical configurations provided in each replenishing pack and image forming apparatus, it becomes possible to realize the combination of usability shown in Table 1. Thus, in the image forming apparatus of the replenishing method, it becomes possible to suppress that the accommodating device for replenishing the consumable agent, which is provided through the predetermined service, is used by the image forming apparatus which is not subject to the predetermined service.

Embodiment 3

In the Embodiment 1, examples in which the projecting portion 621 in part (b) of FIG. 10 and the projecting portion 721 in part (a) of FIG. 13 are positioned in an upper portion of the interface portion 1300 and an upper portion of the interface portion 503 in postures in which the replenishing packs are mounted, respectively, are described. However, it is not limited to these configurations. Other examples are shown in part (a) of FIG. 19 through part (b) of FIG. 20. Incidentally, with respect to the same configurations as in the Embodiment 1, illustrations in Figures will be omitted, or the same reference numerals will be attached in Figures.

In the present Embodiment, the replenishing pack of registration-type 1200 includes a projecting portion 3621, which extends to a lower end of the interface portion 1300, and the protruding portion 622, as shown in part (b) and part (c) of FIG. 19. As shown in part (a) of FIG. 19, the operating portion 111 of the image forming apparatus of registration-type 400 includes the groove 612, into which the projecting portion 3621 is insertable, and the groove 611, into which the projecting portion 622 is insertable. In addition, the image forming apparatus of registration-type 400 is provided with the sliding member 615, which is moved in a direction of an arrow G by being pressed by the projecting portion 622, which is inserted into the groove 611.

In addition, the standard replenishing pack 501 includes the projecting portion 721, which is the same as the projecting portion 622 (see part (c) of FIG. 10) of the Embodiment 1, as shown in part (c) of FIG. 20. The groove 911 and the sliding member 915 of the operating portion 811 of the standard image forming apparatus 500 according to present Embodiment are in a form that a phase thereof is moved 180 degrees with respect to the groove 911 and the sliding member 915 of the Embodiment 1. That is, the projecting portion 721 of the standard replenishing pack 501 is insertable into the groove 911, and the sliding member 915 is moved in the direction of the arrow G by being pressed by the projecting portion 721, which is inserted into the groove 911.

Thus, the replenishing pack of registration-type 1200 is configured to be mountable on the image forming apparatus of registration-type 400, and the standard replenishing pack 501 is configured to be mountable on the standard image forming apparatus 500. In addition, the projecting portion 721 of the standard replenishing pack 501 is configured to be insertable into the groove 611 of the image forming apparatus of registration-type 400. Therefore, the standard replenishing pack 501 is also configured to be mountable on the image forming apparatus of registration-type 400.

On the other hand, the protruding portion 3621 of the replenishing pack of registration-type 1200 is extended to the lower end of the interface portion 1300 in the present Embodiment. When the replenishing pack of registration-type 1200 is attempted to be mounted on the standard image forming apparatus 500, the projecting portion 3621 abuts a contacting portion W of the operating portion 811. Therefore, the replenishing pack of registration-type 1200 cannot be mounted on the standard image forming apparatus 500, and the user can notice that a shape of the interface portion of the replenishing pack of registration-type 1200 does not match a shape of the mounting port of the standard image forming apparatus 500 at an earlier stage.

Embodiment 4

Furthermore, it may be configured that a recessed portion, which extends in an entire area in the vertical direction, is provided on a side surface of the interface portion of the standard replenishing pack, and a projecting portion, which projects toward inside of an inner peripheral surface of the mounting port of a main assembly side, is provided in the operating portion so that a number of the recessed portions and a number of the projecting portions for the standard-type is greater than those for the registration-type. Incidentally, the "standard-type" refers to the standard replenishing pack and the standard image forming apparatus, and the "registration-type" refers to the replenishing pack of registration-type and the image forming apparatus of registration-type. More specifically, with regard to the shapes of the replenishing pack and the mounting port, it is characterized in that the registration-type is provided with more portions having a longer radius length than the standard-type. The radius length here corresponds to a distance from a center of a bottom surface of the cylindrical interface portion, or a distance from a center of the circular mounting port. When the accommodating device and the image forming apparatus main assembly are compatible, the projecting portion on the mounting port side (operating portion side) enters the recessed portion on the interface portion side, and the mounting is performed.

In the replenishing systems in each of the Embodiments described above, the toner is replenished by mounting the replenishing pack on the mounting port provided in the image forming apparatus. In addition, as shown in FIG. 7, when the replenishing pack is mounted on the mounting port, most of the replenishing pack is exposed outside the apparatus main assembly, and only a portion of the interface portion is inserted inside the apparatus main assembly. And since, in the present replenishing system, it is configured that the toner is replenished from the replenishing pack to the image forming apparatus using gravity, the interface portion is provided at a downstream side of the replenishing pack in the gravity direction. In the present replenishing system, it is characterized in that the mechanical configurations described above are provided in the interface portion downstream of the gravity direction in order to satisfy the relationship between the image forming apparatus and the replenishing pack as shown in Table 1.

On the other hand, in a conventional detachable cartridge method, since the cartridge is mounted completely inside the apparatus main assembly and used, the cartridge is not exposed to the outside of the apparatus main assembly. In other words, in a case in which the cartridge method is employed to the image forming apparatus, in order to prevent a particular cartridge from being inserted into an incompatible image forming apparatus main assembly, the mechanical configurations may be provided at any portion of a housing of the cartridge. In contrast, the replenishing pack of the present Embodiment is characterized also by a position where the characteristic mechanical configurations described above is provided in the replenishing pack.

In a case of a well-known cartridge, which includes the consumable agent such as the toner and functional components such as the developing roller, a mounting direction to the image forming apparatus main assembly is generally a direction crossing perpendicularly with or parallel to a longitudinal direction of the functional component. In addition, such cartridge generally includes a stirring/moving member, which rotates or reciprocates, for stirring/moving the accommodated consumable agent after the cartridge is mounted. On the other hand, the accommodating device according to the present invention does not include such a functional component. In addition, the accommodating device does not include a stirring/moving member for stirring/moving the consumable agent within the accommodating device. In contrast, when one end of the accommodating device is considered as an end portion of the pouch and the other as the interface portion, the user mounts the accommodating device on the mounting port of the image forming apparatus main assembly with placing the end portion of the pouch facing above and the interface portion facing below. By this, it becomes possible for the toner accommodated in the pouch to be easily moved toward the accommodating portion 48 by being loosened via the pouch portion and action of gravity. In addition, it becomes possible to realize the simple accommodating device not including the stirring/moving member, which rotates or reciprocates.

The user moves the accommodating device downward in the gravity direction, while approximately maintaining a posture direction of the accommodating device at the time of mounting, and mounts the accommodating device on the apparatus main assembly. For the user, since a final mounting posture of the accommodating device and the posture of the accommodating device at the time of mounting operation are similar, it is easy to understand the mounting operation intuitively. And, in the description above, when the accommodating device moves in the direction in which the pouch portion and the interface portion are disposed (gravity-acting direction) during mounting on the main assembly, the recessed portion or the projecting portion on the accommodating device side are restricted or permitted to move by the corresponding projecting portion or the recessed portion on the mounting port side. It becomes easier for the user to confirm the mechanical compatibility of the accommodating device and the mounting port during the mounting operation of the accommodating device on the mounting port.

In addition, it becomes possible for the user to confirm the mechanical compatibility before operating the operating portion to move (open/close) the main body shutter and/or the pack shutter, i.e., before the accommodating device is positioned in a mounting complete position. For example, it may be assumed that the user is informed of the compatibility of the accommodating device with the apparatus main assembly after the accommodating device is mounted, however, according to the present invention, it becomes possible for the user to be informed of the incompatibility between the replenishing pack and the image forming apparatus at an earlier stage than in the assumed case. In addition, the groove portions and the contacting portions are provided on the operating portion 1111 and the operating portion 811, and the projecting portions are provided on the pack shutter 1214 and the pack shutter 714. By this, it also becomes possible for the pack shutter, in the case in which the interface portion of the accommodating device and the shape of the mounting port of the image forming apparatus are compatible and the accommodating device can be mounted to a mounted position, to be easily in interrelation with the moving of the operating portion continuously. In addition, effects such as reduction in a number of components can be obtained.

OTHER EMBODIMENTS

Incidentally, in any of the aforementioned Embodiments, the arrangement and the shapes of the grooves of the image forming apparatus and the projecting portions of the replenishing pack are not limited thereto. In other words, the arrangement and the shapes of the grooves and the projecting portions may be set arbitrarily as long as those correspond to Table 1 above.

In addition, in any of the aforementioned Embodiments, the locking mechanism 150 is configured to restrict or permit the rotation of the operating portion, however, it is not limited to this configuration. For example, instead of the configuration in which the locking mechanism 150 transitions from the locking state to the unlocking state, it may be configured that either of the operating portion, the pack shutter or the main body shutter rotates so as to open the replenishing passage.

In addition, in any of the aforementioned Embodiments, it is described with using the image forming apparatus of the electrophotographic method, however, the present invention is not limited to this configuration. For example, the present invention can also be applied to an image forming apparatus of inkjet method which forms an image on a sheet by ejecting ink solution from a nozzle. In this case, the consumable agent consumed by the image forming apparatus by forming an image is ink, and the replenishing pack accommodates the ink.

The present invention may also be realized by a process in which a program realizing one or more functions of the Embodiments described above is provided to the system or to the apparatus via a network or via a storage medium, and a one or more processors in a computer of the system or of the apparatus read out and execute the program. In addition, the present invention may also be realized by a circuit which realizes one or more functions (e.g., ASIC).

Embodiment 5

In the Embodiment 1 through the Embodiment 4 described above, the toner is prevented from being replenished to another printer which is not subject to the contract depending on whether or not the replenishing pack 200 can be mounted on the toner receiving portion 110. On the other hand, in the present Embodiment, a replenishing system in which the replenishing pack 200 is permitted to be mounted on the toner receiving portion 110, and then whether or not to unlock the locking mechanism 150 is determined by an authentication process of the replenishing pack 200, will be described. Incidentally, a configuration of the apparatus which will be based is the same as those described in FIG. 1 through FIG. 8, and only points different from the Embodiment 1 through Embodiment 4 will be described in the present Embodiment. For example, the control block diagram for the image forming apparatus 1 of the Embodiment 1 through the Embodiment 4 is shown in FIG. 9, however, a control block diagram for the image forming apparatus 1 of the present Embodiment is shown in FIG. 26.

Although the example in which the replenishing passage 50 of the toner is opened by force in the rotational direction generated by the user operating the lever portion 111*b* of the operating portion 111 has been described, in the present Embodiment, the closing and the opening of the replenishing passage 50 may be performed without relying on the user's operation. As an example, the image forming apparatus 1 may be provided with a pack sensor, which detects that the replenishing pack 200 is connected to the toner receiving portion 110, and a driving motor, which generates driving force to rotate the operating portion 111. In this example, it may be configured that a processing circuit 90 (see FIG. 26) may actuate the driving motor under a condition that the connection of the replenishing pack 200 to the toner receiving portion 110 is detected by the pack sensor, and the operating portion 111 is rotated by rotational force of the driving motor to open the replenishing passage 50. Here, by saying the replenishing pack 200 is connected to the toner receiving portion 110, it means, for example, a state in which the projecting portion 111*d* of the operating portion 111 and the projecting portion 117 of the main body shutter 116 enter the opening 214*c* for the engagement with the drive transmitting surface 214*b* of the pack shutter 214.

In addition, with respect to an open/close mechanism 51 (see FIG. 26), which is exemplified by the operating portion 111, the pack shutter 214 of the replenishing pack 200, and the main body shutter 116 described above, the configuration including the rotating pack shutter 214 and the rotating main body shutter 116 has been described as an example, however, it is not limited to this configuration. For example, instead of these rotating shutters, a shutter which is movable in a straight line direction may be employed, or an open/close mechanism different from the shutters, such as a valve, may be employed. In addition, the open/close mechanism 51 need only be disposed on at least one of the accommodating device, such as the replenishing pack 200, and the image forming apparatus. That is, the replenishing passage from the accommodating device to the image forming apparatus may always be open on one side of the accommodating device and the image forming apparatus, and may only be opened and closed on the other side. Instead, the replenishing passage may be opened and closed on both the accommodating device and the image forming apparatus, as in the Embodiments described above. In addition, an additional sensor may be provided to detect an operation of the open/close mechanism by the user or to detect a state of the open/close mechanism (opening state or closed state).

In addition, the operation of the open/close mechanism 51 described above may be directly or indirectly restrained by the locking mechanism 150 (by user's operation or automatically). In addition, similar to the open/close mechanism, the locking mechanism may also be disposed on at least one of the accommodating device and the image forming apparatus.

In addition, a leak-proof member such as a lid or a cap for preventing the toner from leaking may be attached to the mounting port 114 of the image forming apparatus 1 or the opening 213 of the replenishing pack 200. Such a leak-proof member may be freely removable by the user at any time.

Hereinafter, the present Embodiment using a replenishment managing system 300 will be described.

[4. Replenishment Managing System]

An image forming apparatus of a replenishing method described in the International Patent Application Laid-Open No. 2020/046338 determines whether to start a replenishment of toner from an accommodating device connected to the image forming apparatus by an authentication in a local site. However, the simple local authentication can only verify compatibility between the image forming apparatus and the accommodating device, and it is difficult to permit or restrict the replenishment with taking other conditions into consideration, such as whether the replenishment is being performed by a registered user under a certain contract. For an image forming apparatus, which is attracting attention because of low cost and low environmental load, extending conditions to be verified within the local authentication would increase complexity and cost of the device, which could undermine the inherent advantages of the replenishing method. Therefore, in the present Embodiment described in the following section, a mechanism, which involves a server apparatus operating in a remote environment for managing replenishment of the toner to image forming apparatus, is employed.

[4-1. Overview of a System]

FIG. 21 is a schematic diagram illustrating an example of a configuration of a replenishment managing system 300 according to the present Embodiment. As shown in FIG. 21, the replenishment managing system 300 includes the image forming apparatus 1, a managing server 301, and a user terminal device 401.

The image forming apparatus 1 is installed in a user's environment E1 in which the user resides. In addition, the user terminal device 401 also resides in the user's environment E1 and is held by the user. The image forming apparatus 1 and the user terminal device 401 are connected to a local network N1, which may be, for example, a local area network (LAN). The managing server 301 is located in a remote environment E2. The remote environment E2 is connected to the local network N1 via an external network N2. The external network N2 may be, for example, the Internet or a virtual private network (VPN). Each of the local network N1 and the external network N2 may include any number of network devices of any kind, such as routers, switches, gateways, wireless access points, and base stations.

In the user's environment E1, the user uses the image forming apparatus 1. The image forming apparatus 1 consumes the toner as the consumable agent to form the image on the recording medium, as described above. When the toner stored in the image forming apparatus 1 is depleted, the user connects a replenishing pack 200, which is an accommodating device containing the toner, to the image forming apparatus 1, and replenishes the toner from the replenishing pack 200 to the image forming apparatus 1. If the replenishing pack 200 becomes empty and there is no spare replenishing pack 200 in the user's environment E1, the image forming apparatus 1 becomes unavailable when the toner is depleted next time. In the present Embodiment, the managing server 301 remotely manages usage status of the image forming apparatus 1 and the replenishing pack 200 by each user in order to prevent such a situation.

The managing server 301 is a server apparatus for managing the replenishment of the toner from the replenishing pack 200 to the image forming apparatus 1. The managing server 301 may be an apparatus for managing the usage status of each of the image forming apparatuses and of the toner by multiple users in a centralized manner. The managing server 301 may be implemented as an application server, a database server, or a cloud server, for example, using a high-performance general-purpose computer. The user terminal device 401 is a terminal device which provides the user a user interface for supporting a replenishment managing function of the managing server 301. The user terminal device 401 may be a general-purpose terminal device, such as a smart phone, a cell phone, a personal computer (PC) and a personal digital assistant (PDA). In addition, the image forming apparatus 1 may also provide the user interface to the user.

Incidentally, functions of the managing server 301, which will be described in more detail below, may be provided by a single apparatus or by multiple apparatuses, which are physically separated, working in cooperation with each other. In addition, some of databases, which are described as included in the managing server 301, may be included in a separate apparatus (e.g., another database server) other than the managing server 301.

In the present Embodiment, to each of the replenishing packs 200, the unique code 201 for uniquely identifying the replenishing pack 200 is assigned. The code 201 may be what is referred to, for example, as a production number, a serial number, a pack identifier, or the like. On a surface of a pouch portion 211 of each replenishing pack 200, or on a package of each replenishing pack 200, the code 201 is printed in a readable format artificially for the user or optically for the user terminal device 401. The optically readable format may include a format such as a one-dimensional bar code and a two-dimensional QR code (registered trademark). The code 201 read by the user or by the user terminal device 401 may be sent to the managing server 301 and used for the replenishment management, which will be described below.

[4-2. Example of a Configuration of the Managing Server]

FIG. 22 is a block diagram illustrating an example of a configuration of the managing server 301 according to the present Embodiment. As shown in FIG. 22, the managing server 301 includes a communication interface (I/F) 311, a memory 312, a management database (DB) 313, and a processing circuit 314. The communication OF 311 is an interface for the managing server 301 to communicate with other devices. For example, the communication OF 311 communicates with the image forming apparatus 1 and the user terminal device 401 in the user's environment E1. The communication OF 311 may be a wired communication interface or a wireless communication interface.

The memory 312 may include any type of storage media, such as, for example, a semiconductor memory such as a read only memory (ROM) and a random access memory (RAM), an optical disk and a magnetic disk. The memory 312 may include a non-transient and computer-readable storage medium. The memory 312 stores one or more computer programs to be executed by the processing circuit 314 and a variety of data.

The managing DB 313 includes a set of tables for managing the replenishment of the toner to one or more image forming apparatuses under the management of the replenishment managing system 300. More specifically, as shown in FIG. 22, the managing DB 313 includes an account table 320, an device registration table 330, and a delivery pack table 340.

The account table 320 is a table which stores information about accounts of users using the replenishing pack 200 supplied by the replenishment managing system 300. The account table 320 may include one or more of the following information items, for example:

"User ID"
"Password"
"Name"
"Email address"
"Address"
"Contract type"
"Payment method"

The "user ID" is identification information which uniquely identifies each of user accounts. The "password" is used for user authentication when a user logs into the system. The "name" indicates a user name for each account. The user name may be displayed on a screen after login and may be used, for example, as a name of recipient upon a delivery of the replenishing pack 200. The "address" may be used as a delivery address upon the delivery of the replenishing pack 200. The "email address" may be used by the system to send various notifications to each user via email. The "contract type" indicates a type of the contract with which each user signs with an operator of the replenishment managing system 300. A supply managing portion 360, which will be described below, may determine when to deliver the replenishing pack 200 to each user, depending on the contract type of the user. The "payment method" is information about a means by which payment for the replenishing pack 200 provided to each user is settled.

The device registration table 330 is a table which stores information about image forming apparatuses registered to the replenishment managing system 300 as an apparatus of each user. The device registration table 330 may include one or more of the following information items, for example:

"Owner"
"Device ID"
"Registration Date"
"Status"
"Toner remaining amount"

The "owner" indicates the accounts of the user, who owns or manages each image forming apparatus, with the "user ID" registered in the account table 320. The "device ID" is identification information to uniquely identify each image forming apparatus. By a pair of the "owner" and the "device ID", an association between each user account and at least one image forming apparatus registered as a device of the user having that account is found. Incidentally, two or more image forming apparatuses may be associated with one user account. The "registration date" indicates a date when the "device ID" of each image forming apparatus is registered in the device registration table 330. The "status" indicates a status on verification whether each image forming apparatus is actually installed in a user's environment of the "owner".

At the time of an initial registration of the "device ID", the "status" indicates "not verified", and when the verification is completed, the "status" may be changed to "verified". The "toner remaining amount" indicates the latest value of the toner remaining amount detected and reported by each image forming apparatus. For example, the "toner remaining amount" may be indicated in a percentage.

The delivery pack table 340 is a table which stores information about the replenishing pack shipped to each user. The delivery pack table 340 may include one or more of the following information items, for example:

"Contractor"
"Pack ID"
"Shipping Date"
"Status"
"Date of use"

The "contractor" indicates the account of the user, to whom each replenishing pack is supplied, with the "user ID" registered in the account table 320. The "pack ID" is identification information to uniquely identify each replenishing pack. By a pair of the "contractor" and the "pack ID", an association between each user account and at least one replenishment pack supplied to the user is found. Since each user consumes the toner repeatedly, a number of the replenishment packs associated with a single user account in the delivery pack table 340 increases over time. The "shipping date" indicates a date on which each replenishing pack is shipped to the "contractor". The "status" indicates a status of each replenishing pack as to whether or not the replenishing pack has been used for replenishment of the toner to the image forming apparatus. At the time of shipment, the "status" indicates "unused", and may be changed to "used" once each replenishing pack arrives at the user's environment, is authenticated and the replenishment of the toner is performed. The "date of use" indicates a date on which each replenishing pack is used for the replenishment of the toner.

The processing circuit 314 may be, for example, a central processing unit (CPU), and provides various functions of the managing server 301 by executing computer programs stored in the memory 312. More specifically, as shown in FIG. 22, the processing circuit 314 may function as a data managing portion 350, the supply managing portion 360, and an authenticating portion 370.

The data managing portion 350 manages registration of data to the managing DB 313 and updates data in the managing DB 313. The data managing portion 350 may display a screen on the user terminal device 401 for receiving input of an account information to be registered to the account table 320, receive the input account information via the communication OF 311, and register the account information to the account table 320. Similarly, the data managing portion 350 may display a screen on the user terminal device 401 for receiving input of an device information of an image forming apparatus owned by each user, receive the input device information via the communication OF 311, and register the device information to the device registration table 330. These input screens may be provided in any format, for example, a web page, an input form, an application screen, etc. Typically, receiving of the input of the device information may be performed during a period of time when user authentication using the user ID and the password stored in the account table 320 is successful and the user is logging in the system.

Specifically, in the present Embodiment, the data managing portion 350 may perform simple verification as to whether the apparatus registered in the device registration table 330 is actually installed in a user's environment of a corresponding user. For example, when a user logs into the system and inputs the device information of the image forming apparatus 1 to the input screen, the data managing portion 350 shows a message prompting the user to perform a predetermined operation on the image forming apparatus 1. The predetermined operation may include, for example, pressing of a specific physical button on the image forming apparatus 1 or touching of a button on a graphical user interface (GUI). Additionally or alternatively, the message sent here may include contents prompting the user to turn on power of the image forming apparatus 1 (in a case in which the image forming apparatus 1 is turned off). When the user performs the operation on the image forming apparatus 1 as prompted, the image forming apparatus 1 sends a device ID which identifies the apparatus itself to the managing server 301. The data managing portion 350 waits to receive the device ID from the image forming apparatus 1 until a predetermined period of time has elapsed since the show of the above message. And when the same device ID as the input device ID by the user is received from the image forming apparatus 1 before a timeout, the data managing portion 350 determines that the image forming apparatus 1 identified by the device ID is actually installed in the user's environment. The data managing portion 350 sets a value of the "status" in the device registration table 330 to "unverified" for an apparatus before completion of such verification, and sets the value of the "status" in the device registration table 330 to "verified" for an apparatus after completion of the verification. In the present Embodiment, the data managing portion 350 also manages updating a value of the "toner remaining amount" in the device registration table 330. For example, the data managing portion 350 receives, via the communication I/F 311, remaining amount information with respect to the toner remaining amount in the accommodating portion 48 of the apparatus from the registered image forming apparatus 1. And based on the received remaining amount information, the data managing portion 350 updates status information regarding the toner remaining amount, that is, the value of the "toner remaining amount" in the device registration table 330.

The supply managing portion 360 manages the supply of the replenishing pack 200 to the user of the replenishment managing system 300. For example, the supply managing portion 360 monitors an occurrence of a trigger event which triggers the supply of the replenishing pack 200 to the user.

An example of the trigger event may be purchase of the replenishing pack 200 by the user. The supply managing portion 360 may begin the supply of the replenishing pack 200 to the user as the purchaser, for example, when an order for the replenishing pack 200 is received (i.e., when an individual contract is signed) at a website which sells the toner for the image formation.

Another example of the trigger event may be an arrival of the supply timing based on the contract with the user. For example, assume that a user has entered into a regular purchase agreement with the operator to purchase a certain number of the replenishing packs 200 on a regular basis (e.g., once a month or every few months). The supply managing portion 360 may begin the supply of the replenishing pack 200 to such a user when it is determined that the supply timing of the next replenishing pack 200 has arrived for such a user.

Another example of the trigger event may be detection of the low toner remaining amount in the image forming apparatus 1 which is registered in the device registration table 330. For example, assume that a user has entered into an automatic purchase agreement with the operator to automatically receive the new replenishing pack 200 when the toner remaining amount in the image forming apparatus 1 owned by the user becomes low. In this case, the supply managing portion 360 may monitor the value of the "toner remaining amount" of the registered image forming apparatus 1 in the device registration table 330, and may begin the supply of the replenishing pack 200 to the user when it is determined that the toner remaining amount is below a predetermined threshold value. Additionally or alternatively, the trigger event for the automatic purchase of the replenishing pack 200 may be reaching to a threshold value for a number of operation of the registered image forming apparatus 1 (e.g., a number of job execution or cumulative consumed sheets of the recording medium).

Additionally or alternatively, the triggering event regarding the automatic purchase of the replenishing pack 200 may be detection of use of the replenishing pack 200 by a user which is provided to the user in the past. For example, the supply managing portion 360 may monitor the "status" of the replenishing pack 200 which is supplied to the user who has entered into the automatic purchase agreement in the delivery pack table 340, and may begin the supply of the replenishing pack 200 when the value thereof changes from "unused" to "used".

In response to the detection of these trigger events, by supplying the new replenishing pack 200 to the user periodically or automatically, it becomes possible to reduce possibility that the image forming apparatus 1 becomes unavailable due to running out of the toner at an unexpected timing for the user.

The supply managing portion 360 may determine which of the trigger events described above to be monitored for each user based on a value of the "contract type" in the account table 320. If the supply managing portion 360 determines that the trigger event occurred for a user, the supply managing portion 360 allocates a new replenishing pack 200 to the user and sends a message, which instructs the delivery of the allocated replenishing pack 200 to the user, to a delivery representative. In addition, the supply managing portion 360 registers association between the user account and the replenishing pack 200 in the managing DB 313 by adding new records, which indicate the user ID of the user to whom the delivery is made and the pack ID identifying the allocated replenishing pack 200, to the delivery pack table 340. The "shipping date" in the delivery pack table 340 may be set to a date on which the replenishing pack 200 is shipped, and the "status" and the "used date" can be initially set to "unused" and blank, respectively.

The authenticating portion 370 performs authentication to permit the replenishment with respect to the replenishing pack 200 which is about to be used for the toner replenishment (hereinafter referred to as a pre-replenishment authentication) in addition to the user authentication (e.g., password authentication) when the user logs into the system. The pre-replenishment authentication may include a determination of whether the replenishing pack 200 is an object of which the use can be permitted (e.g., whether the replenishing pack 200 is supplied to the user through a legitimate channel). As explained using FIG. 21, in the present Embodiment, the unique code 201 is assigned to each replenishing pack 200 for uniquely identifying each replenishing pack 200. The code 201 may be printed, for example, in the readable format for the user or for the user terminal device 401 on each replenishing pack 200 or on the package thereof. The authenticating portion 370 receives the code of the replenishing pack 200, which is about to be used for the replenishment, from a code acquiring means residing in the user's environment E1, and performs pre-replenishment authentication based on the received code. It will be explained below that how the code of the replenishing pack 200 is acquired in the user's environment E1 with some examples.

As an example, the code 201 may be identical to the pack ID of each replenishing pack 200, and in this case, the authenticating portion 370 may use the received code directly for the pre-replenishment authentication. As another example, the code 201 may be what is generated by encoding the pack ID of each replenishing pack 200, and in this case, the authenticating portion 370 may use the pack ID derived by decoding the code 201 for the pre-replenishment authentication.

The pre-replenishing authentication may include determination whether the replenishing pack 200 identified based on the code 201 has correspondence to the user account of the logged-in user. For example, the authenticating portion 370 checks whether an association between the pack ID based on the code 201 and the user ID of the logged-in user is registered in the delivery pack table 340. If this association is registered in the delivery pack table 340, the authenticating portion 370 may determine that the replenishing pack 200 which is about to be used for the replenishment has correspondence to the user account of the user who is going to perform the replenishment. As such, by verifying the correspondence between the replenishing pack 200 and the user account, it is possible to prevent the replenishing pack 200 which is obtained not in accordance with the contract from being used for the replenishment of the toner.

Additionally or alternatively, the pre-replenishment authentication may include determination whether the image forming apparatus 1 to which the toner is replenished has correspondence to the user account of the logged-in user. For example, the authenticating portion 370 shows a message prompting the user, who is going to replenish the toner, to perform a predetermined operation on the image forming apparatus 1 to be replenished. Again, the predetermined operation may include, for example, the pressing of a specific physical button on the image forming apparatus 1 or the touching of a button on the GUI. When the user performs the operation on the image forming apparatus 1 as prompted, the image forming apparatus 1 sends the device ID which identifies the apparatus itself to the managing server 301. The authenticating portion 370 waits to receive the device ID from the image forming apparatus 1 until a predetermined period of time has elapsed since the show of the above message.

Then, the authenticating portion 370 checks whether the association between the device ID received from the image forming apparatus 1 before a timeout and the user ID of the logged-in user is registered in the device registration table 330. If the association is registered in the device registration table 330, the authenticating portion 370 can determine that the image forming apparatus 1 to be replenished has the correspondence to the user account of the logged-in user. As such, by making it a condition for successful authentication that the apparatus to be replenished is registered as the user's device registration of device information to the database may be promoted. By receiving the device ID from the image forming apparatus 1, it becomes possible for the managing server 301 to reliably recognize the apparatus to which the user is going to replenish the toner and to send subsequent control instructions (e.g., unlock instruction or open instruction as described below) to the apparatus to be replenished.

In response to the above predetermined operation, the authenticating portion 370 may receive the remaining amount information indicating the latest toner remaining amount along with the device ID. The authenticating portion 370 may then refuse to replenish the toner to the image forming apparatus 1 if the received remaining amount information indicates that there is sufficient toner remaining. In other words, the authenticating portion 370 may refuse to replenish the toner to the image forming apparatus 1 if an amount of the toner which can be additionally replenished to the accommodating portion 48 is less than an amount of the toner in the replenishing pack 200. By this, it becomes possible to prevent an excessive amount of toner from being replenished to the image forming apparatus 1.

Additionally or alternatively, the pre-replenishment authentication may include determination whether the replenishing pack 200 identified based on the code 201 has been used based on the value of the "status" in the delivery pack table 340. For example, the authenticating portion 370 may refer to a record in the delivery pack table 340 for the pack ID based on the code 201, and if the value of the "status" is "unused", then the authenticating portion 370 may permit the replenishing pack 200 to be used for the replenishment. On the other hand, if the value of the "status" of the referred record is "used", then the authenticating portion 370 may refuse the replenishing pack 200 to be used for the replenishment. As such, by making it a condition for successful authentication that the replenishing pack 200 is unused, it becomes possible to prevent unauthorized or accidental reuse of the replenishing pack 200.

Additionally or alternatively, the pre-replenishment authentication may include determination whether the replenishing pack 200 identified based on the code 201 is a genuine product compatible with the apparatus to be replenished. For the determination of the genuine product, the device registration table 330 may include a model number of each image forming apparatus, and the delivery pack table 340 may include a model number of each replenishing pack as additional data items, respectively. In addition, the managing DB 313 may include an additional table indicating one or more model numbers of the replenishing pack for each model number of the image forming apparatus, which are compatible thereto. In this case, the authenticating portion 370 may permit the replenishing pack 200 to be used for the replenishment only if both the apparatus to be replenished and the replenishing pack 200 are determined to be compatible with each other based on the respective model numbers.

As mentioned above, at least one of the replenishing pack 200 and the image forming apparatus 1 includes the open/close mechanism which is capable of opening and closing the replenishing passage of the toner. The open/close mechanism is locked by the locking mechanism so that it is not opened during a normal operation. When the pre-replenishment authentication is successful, the authenticating portion 370 of the managing server 301 sends the result of the successful authentication to the image forming apparatus 1 via the communication I/F 311 and permits the image forming apparatus 1 to open the replenishing passage by the open/close mechanism (i.e., causes the locking mechanism to unlock the open/close mechanism). Incidentally, in the case in which the open/close mechanism is actuated by the computer control in the image forming apparatus 1 without relying on the user's operation, the authenticating portion 370 may cause the open/close mechanism of the image forming apparatus 1 to open the replenishing passage of the toner instead of unlocking the open/close mechanism. The unlock instruction (or open instruction) for the image forming apparatus 1 may be sent directly from the managing server 301 to the image forming apparatus 1. Instead, the unlock instruction (or open instruction) may be sent to the image forming apparatus 1 by the user terminal device 401 upon receiving the result of the successful authentication from the managing server 301. If the pre-replenishment authentication fails due to any of the conditions described above not being met, the authenticating portion 370 sends the result of authentication failure to the image forming apparatus 1 or the user terminal device 401 via the communication I/F 311. The authenticating portion 370 may show a message on the screen of either device indicating a cause of the authentication failure (e.g., improper pack, apparatus not registered, or pack used).

When the open/close mechanism is unlocked based on the authentication result, the replenishing passage is opened and the toner is replenished from the replenishing pack 200 to the image forming apparatus 1, and the toner remaining amount in the accommodating portion 48 of the image forming apparatus 1 increases. As described below, the image forming apparatus 1 detects the toner remaining amount in the accommodating portion 48 and sends the remaining amount information to the managing server 301. The data managing portion 350 receives the remaining amount information via the communication I/F 311 and updates the value of the "toner remaining amount" in the device registration table 330. In addition, if the received remaining amount information indicates that the toner remaining amount is increased, then the data managing portion 350 changes the "status" of the replenishing pack 200 in the delivery pack table 340 to "used". By this, in a case in which the same replenishing pack 200 is subsequently attempted to be reused, it becomes possible for the authenticating portion 370 not to permit the reuse of the replenishing pack 200 based on the status information. In addition, it also becomes possible for the supply managing portion 360 to allocate the new replenishing pack 200 to the user in response to detecting the use of the replenishing pack 200.

Hereinafter, updating the contents of the managing DB 313 according to a typical process flow will be described using FIG. 23 and FIG. 24. FIG. 23 illustrates an example of updating the device registration table 330 at the time of device registration. In an upper part of FIG. 23, the account table 320, which include the user ID 321 and the name 322 as data items, is illustrated. Other data items in the account table 320 are omitted in the FIG. 23. In a middle part of FIG. 23, the device registration table 330, which includes the owner 331, the device ID 332, the registration date 333, the status 334, and the toner remaining amount 335 as data items, is illustrated. In the example of FIG. 23, an account of the user identified by the user ID "U01" (hereinafter referred to as a user U01) has already been registered in the account table 320. In addition, an image forming apparatus identified by the device ID "D00" has already been registered in the device registration table 330 as the apparatus of the user U01.

The user U01 newly installs the image forming apparatus identified by the device ID "D01" (hereinafter referred to as an "device D01") in the user's environment E1. When the user U01 enters the device information of the device D01 via the input screen provided by the managing server 301, a record for the device information of the device D01 is added to the device registration table 330 by the managing server 301. In the added record, it is indicated that the owner 331 is "U01", the device ID 332 is "D01", the registration date 333 is the date YMD2 when the registration was made, the status 334 is "unverified", and the toner remaining amount 335 is "0%", respectively.

Furthermore, the user U01 performs the operation for the device registration for the newly installed device D01, for example, according to the message shown on a screen. The device D01 stores the device ID of its own "D01" in advance, and sends the device information including the device ID to the managing server 301 in response to the user's operation. If the received device ID matches the device ID input by user U01, the data managing portion 350 changes the value of the status 334 of the record added to the device registration table 330 from "unverified" to "verified" as shown in a lower portion of FIG. 23.

FIG. 24 illustrates an example of updating the delivery pack table 340 during the pack delivery. In an upper part of FIG. 24, the contents of the account table 320, which is the same as in FIG. 23, is illustrated. In a middle part of FIG. 24, the delivery pack table 340, which includes the contractor 341, the pack ID 342, the shipping date 343, the status 344, and the date of use 345, is illustrated. In the example of FIG. 24, the replenishing pack identified by the pack ID "P01" has already been delivered to the user U01, and the replenishing pack has been used.

The supply managing portion 360 newly allocates the replenishing pack identified by the pack ID "P11" (hereinafter referred to as a "replenishing pack P11") to the user U01, in response to detecting one of the trigger events described above. In addition, the supply managing portion 360 adds a record to the delivery pack table 340 to manage the status of the allocated replenishing pack P11. In the added record, it is indicated that the contractor 341 is "U01", the pack ID 342 is "P11", the shipping date 343 is the date YMD3 when the shipping is performed, the status 344 is "shipped", and the date of use 345 is blank.

When the authentication by the authenticating portion 370 is successful and the toner is replenished from the replenishment pack P11 to the apparatus to be replenished, the replenished apparatus reports the increase of the toner remaining amount to the managing server 301. Based on the report, the data managing portion 350 changes the value of the status 344 of the record added to the delivery pack table 340 from "shipped" to "used", and adds a date YMD4 when the increase of the toner remaining amount is reported to the date of use 345.

[4-3. Example of a Configuration of the User Terminal Device]

FIG. 25 is a block diagram illustrating an example of a configuration of the user terminal device 401 according to the present Embodiment. With reference to FIG. 25, the user terminal device 401 is provided with a communication I/F 411, a memory 412, a camera 413, an input device 414, a display device 415, and a processing circuit 416.

The communication OF 411 is an interface for the user terminal device 401 to communicate with other devices. For example, the communication OF 411 communicates with the image forming apparatus 1 in the user's environment E1 and the managing server 301 in the remote environment E2. The communication I/F 411 may be a wired communication interface or a wireless communication interface. If the communication OF 411 is a wireless communication interface, the communication OF 411 may be, for example, a WLAN interface, which communicates with a WLAN access point, or a cellular communication interface, which communicates with a cellular base station. Incidentally, only a single communication I/F 411 is shown in FIG. 25, however, the user terminal device 401 may be provided with multiple different communication modules for communicating with the image forming apparatus 1 and the managing server 301, respectively. The communication between the user terminal device 401 and the image forming apparatus 1 may be performed using a communication protocol for peripheral device connection, such as Bluetooth (registered trademark) or a universal serial bus (USB), for example.

The memory 412 may include any type of storage medium, such as, for example, a semiconductor memory such as a ROM or a RAM, an optical disk, or a magnetic disk. The memory 412 may include a non-transient and computer-readable storage medium. The memory 412 stores one or more computer programs to be executed by the processing circuit 416 and a variety of data.

The camera 413 is a module capable of capturing images or video of a subject. Incidentally, the camera 413 may be used to optically read the code 201 which is unique to the replenishing pack 200.

The input device 414 is used as a user interface to receive operations and information input by the user. The input device 414 may include, for example, one or more of a touch sensor, a keypad, a keyboard, a pointing device and a microphone. Incidentally, the code 201 which is unique to the replenishing pack 200 may be input by the user via the input device 414.

The display device 415 is used to display images and information. The display device 415 may be constituted by, for example, a liquid crystal display (LCD) or an organic light-emitting diode (OLED).

The processing circuit 416 may be, for example, a CPU and provide various functions of the user terminal device 401 by executing computer programs stored in the memory 412. More specifically, as shown in FIG. 25, the processing circuit 416 may function as an apparatus control portion 420, a code acquiring portion 430, and an application portion 440. Incidentally, in the present description, only the functions related to the management of the toner replenishment to the image forming apparatus 1 will be described, however, the processing circuit 416 may also provide many other functions, which a user terminal device generally includes, to the user.

The apparatus control portion 420 controls the image formation and other operations performed in the image forming apparatus 1. The apparatus control portion 420 may include a driver software for the image forming apparatus 1. For example, the apparatus control portion 420 detects one or more apparatuses available by the user terminal device 401 in the user's environment E1 and shows a list of the detected devices to the user on a screen of the display device 415. The apparatus control portion 420 may acquire the status of each device (e.g., power on/off, the toner remaining amount, etc.) and show the acquired status to the user. When the image forming apparatus 1 is selected and a printing is instructed by the user, the apparatus control portion 420 sends a print job including an image data of an image to be printed to the image forming apparatus 1 and causes the image forming apparatus 1 to print the image.

The code acquiring portion 430 acquires the code 201 unique to the replenishing pack 200, which the user intends to use for the replenishment of the toner. As an example, in a case in which the code 201 is an optically readable code printed on the replenishing pack 200 or the package thereof (e.g., a wrapping, a piece of paper included in the package, etc.), the code acquiring portion 430 may optically read the code 201 using the camera 413. As another example, in a case in which the code 201 is an artificially readable code (e.g., through vision), the code acquiring portion 430 may have the user input the code 201 using the input device 414 and acquire the input code 201.

The application portion 440 may be an application for the supply management, operating in cooperation with the managing server 301. The application portion 440 may be a web browser. For example, the application portion 440 causes an account information input screen to be shown on the display device 415 upon a registration of a new user and when a change occurs in the account information. When the account information is input on the account information input screen, the application portion 440 sends the received account information to the managing server 301 via the communication OF 411. In addition, the application portion 440 shows the device information input screen on the display device 415 when the image forming apparatus 1 is installed in the user's environment E1. When the device information is input on the device information input screen, the application portion 440 sends the received device information to the managing server 301 via the communication I/F 411.

In addition, the application portion 440 may provide a user interface for a user, who wishes to replenish the toner from the replenishing pack 200 to the image forming apparatus 1, to request the managing server 301 to perform the pre-replenishment authentication. For example, when a button for the authentication request is operated by the user, the application portion 440 activates the code acquiring portion 430 to acquire the code which is unique to the replenishing pack 200 and sends the acquired code 201 to the managing server 301 via the communication OF 411. The application portion 440 may send the code 201 to the managing server 301 as a part of a request for the permission of the replenishment of the toner.

In addition, the application portion 440 may send the code 201 to the managing server 301 as a part of a request to open the replenishing passage (or unlock the open/close mechanism).

Incidentally, the application portion 440 may send a sending request to the image forming apparatus 1 to send the device ID, which is required for the pre-replenishment authentication by the managing server 301, to the managing server 301. In another example, the application portion 440 may show a message on the display device 415 prompting the user to perform an operation for sending the device ID at the image forming apparatus 1.

When pre-replenishment authentication is performed by the managing server 301 based on the code 201 which is unique to the replenishment pack 200, the application portion 440 receives a result of the pre-replenishment authentication from the managing server 301. When the authentication result indicates that the pre-replenishment authentication is successful, then the application portion 440 may cause the apparatus control portion 420 to send the unlock instruction to unlock the open/close mechanism or the open instruction to open the replenishing passage to the image forming apparatus 1. Incidentally, in a case in which these instructions are sent directly from the managing server 301 to the image forming apparatus 1, the user terminal device 401 need not send these instructions to the image forming apparatus 1.

The application portion 440 shows the result of the pre-replenishment authentication received from the managing server 301 on the display device 415. For example, in the case in which the result of the pre-replenishment authentication indicates that the authentication is successful, the user can connect the replenishing pack 200 to the image forming apparatus 1, open the replenishing passage by operating the open/close mechanism which has closed the replenishing passage of the toner, and replenish the toner from the replenishing pack 200 to the image forming apparatus 1. At this time, since the open/close mechanism is unlocked by the image forming apparatus 1, the user's operation to open the replenishing passage is not prevented. Incidentally, the connection of the replenishing pack 200 to the image forming apparatus 1 may be performed before the request for the pre-replenishment authentication, or after the successful authentication. As described above, instead of the user operating the open/close mechanism, the image forming apparatus 1 may automatically actuate the open/close mechanism. In the case in which the result of the pre-replenishment authentication indicates that the authentication is failed, the user may retry the pre-replenishment authentication after an appropriate action or give up the toner replenishment for the time being, depending on a cause of the failure, which may be shown on the screen. At this time, the open/close mechanism remains locked by the image forming apparatus 1, or the replenishing passage remains closed without the automatic actuation of the open/close mechanism being performed.

[4-4. Example of a Configuration of the Image Forming Apparatus]

FIG. 26 is a block diagram illustrating an example of a configuration of a functional aspect of the image forming apparatus 1 according to the present Embodiment. As shown in FIG. 26, the image forming apparatus 1 includes the communication I/F 11, the memory 12, the user I/F 13, the image forming portion 40, the open/close mechanism 51, the locking mechanism 52, and the processing circuit 90.

The communication I/F 11 is the interface for the image forming apparatus 1 to communicate with other devices. For example, the communication I/F 11 communicates with the user terminal device 401 in the user's environment E1 and the managing server 301 in the remote environment E2. More specifically, under the control of the processing circuit 90, the communication OF 11 notifies the printer statuses of a side of various image forming apparatuses, including the toner amount information indicating the toner remaining amount, to remote apparatuses of service providing side. The communication I/F 11 may be a wired communication interface or a wireless communication interface. If the communication I/F 11 is a wireless communication interface, the communication I/F 11 may be, for example, a WLAN interface or a cellular communication interface. Incidentally, although only a single communication I/F 11 is shown in FIG. 26, the image forming apparatus 1 may include multiple different communication modules for communicating with the user terminal device 401 and the managing server 301, respectively.

The memory 12 may include any type of storage medium, such as, for example, a semiconductor memory such as a ROM or a RAM, an optical disk, or a magnetic disk. The memory 12 may include a non-transient and computer-readable storage medium. The memory 12 stores one or more computer programs to be executed by the processing circuit 90 and a variety of data. The memory 12 stores, for example, the device ID (also referred to as device identification information), which uniquely identifies the image forming apparatus 1, in advance. Incidentally, the memory 12 may be provided on the processing circuit 90.

The user interface 13 may include an input device for receiving an operation and information input by the user and a display device for displaying images and information. For example, the user I/F 13 may include one or more of a touch panel, a keypad, a button, a switch, a microphone, and a speaker. The user I/F 13 may be treated as an operating device integrated into the image forming apparatus 1. For example, the user I/F 13 may be used to receive input of the unique code 201 attached to the replenishing pack 200.

The image forming portion 40 forms the image on the recording medium by consuming the toner stored in the accommodating portion 48, as described using FIG. 2. The open/close mechanism 51 is a mechanism capable of open and close the replenishing passage 50 from the replenishing pack 200, which is connected to the toner receiving portion 110, to the accommodating portion 48. The operating portion 111 including the lever portion 111*b* and the projecting portion 111*d* described above, the pack shutter 214 of the replenishing pack 200 and the main body shutter 116 are examples of the open/close mechanism 51. The locking mechanism 52 is a mechanism for restricting (i.e., locking) and releasing (i.e., unlocking) the operation of the open/close mechanism 51 by the user or the automatic actuation of the open/close mechanism 51 by the image forming apparatus. The locking mechanism 150 described above is an example of the locking mechanism 52. For example, the CPU 94 of the processing circuit 90 may energize the solenoid 155 of the locking mechanism 150 to rotate the lock member 152 as shown in the example of part (b) of FIG. 8. By this, it becomes possible for the user to rotate the main body shutter 116 and the pack shutter 214 of the replenishing pack 200 together with the operating portion 111 to open the replenishing passage 50.

From a functional point of view, the plurality of electronic components 91, 92 and 93 of the processing circuit 90 may function mainly as a print control portion 95 and a lock control portion 96. The print control portion 95 controls the operation for the image formation by the image forming portion 40. For example, when a print job is received from an external device via the communication I/F 11, the print control portion 95 controls the image forming portion 40 to form an image on the recording medium based on the input image data included in the print job.

The lock control portion 96 controls the locking and unlocking of the open/close mechanism 51 by the locking mechanism 52. For example, the lock control portion 96 sends the device ID stored in the memory 12 to the managing server 301 when a predetermined input signal is detected. The device ID, which is sent to the managing server 301, may be used to verify whether the image forming apparatus 1 identified by the device ID, which is specified by the user for the device registration, is actually installed in the user's environment E1. In addition, the device ID sent to the managing server 301 may be used to perform the pre-replenishment authentication by the managing server 301. The lock control portion 96 may send information indicating the latest toner remaining amount, along with the device ID, to the managing server 301.

For example, the above input signal, which triggers the sending of the device ID, is the received signal (e.g., the sending request which requests the sending of the device ID), which is received from the user terminal device 401 via the communication I/F 11. In this case, the lock control portion 96 reads out the device ID from the memory 12 in response to the receiving of the sending request and sends the read-out device ID to the managing server 301. In another example, the above input signal which triggers the sending of the device ID is a user input signal detected via the user I/F 13 (e.g., an operating signal indicating that a predetermined button is operated). In this case, the lock control portion 96 reads out the device ID from the memory 12 in response to detecting the user input signal and sends the read-out device ID to the managing server 301.

After sending the device ID to the managing server 301 for the pre-replenishment authentication, the lock control portion 96 waits for receiving an unlock instruction, which is a control signal based on the result of the pre-replenishment authentication, for a predetermined waiting period. Then, when the unlock instruction is received before the expiration of the predetermined waiting period, the lock control portion 96 causes the lock mechanism 52 to unlock the open/close mechanism 51 in accordance with the unlock instruction. For example, the lock control portion 96 may energize the solenoid 155 of the locking mechanism 150 to rotate the lock member 152 as shown in the example of part (b) of FIG. 8. By this, it becomes possible for the user to rotate the main body shutter 116 and the pack shutter 214 of the replenishing pack 200 together with the operating portion 111 to open the replenishing passage 50. Incidentally, in a case where a configuration in which the image forming apparatus 1 is configured to automatically actuate the open/close mechanism 51 is employed, the lock control portion 96 may wait for receiving the open instruction instead of the unlock instruction and open the replenishing passage 50 by actuating the open/close mechanism 51 in accordance with the received opening instruction.

If the waiting period expires without receiving the unlock instruction or the open instruction (i.e., in a case of a timeout), the lock control portion 96 terminates the wait for the instruction. For example, the wait for the unlock instruction or the open instruction may be performed by temporarily opening a specific receiving port of the communication I/F 11. By performing the wait for the control signals from outside only during a limited period triggered by the detection of the predetermined input signal in this manner, it becomes possible to minimize risk of an unauthorized operation of the image forming apparatus 1 by a malicious third party. In addition, by putting the image forming apparatus 1 into a sleep state in a period when it is not in the waiting period, it becomes also possible to reduce power consumption of the image forming apparatus 1.

If the unlock instruction or the open instruction is received before the expiration of the waiting period, the lock control portion 96 may maintain the open/close mechanism 51 in the unlocking state for a predetermined unlocking period from the receiving of the instruction and re-lock the open/close mechanism 51 after expiration of the predetermined unlocking period. In the examples in part (a) and part (b) of FIG. 8, when the energizing of the solenoid 155 is finished while the open/close mechanism 51 is in the opening state, the counterclockwise rotation of the operating portion 111 is possible. The user may, for example, rotate the operating portion 111 clockwise in FIG. 8 to open the replenishing passage after the open/close mechanism 51 is unlocked, thereby initiating the replenishment of the toner. After finishing the replenishment of the toner, the user rotates the operating portion 111 counterclockwise to close the replenishing passage. When the energizing of the solenoid 155 is finished and the rotational position of the operating portion 111 is returned to an original position thereof, the tip portion 153 of the lock member 152 returns to the position shown in part (a) of FIG. 8 by elastic force of the spring. By this, even if the user attempts to open the replenishing passage by rotating the operating portion 111 clockwise again, the rotation of the operating portion 111 is restricted by the lock member 152. The re-lock of the open/close mechanism 51 can be achieved in this manner. Incidentally, again, the configuration shown in part (a) and part (b) of FIG. 8 is only an example of the open/close mechanism 51 and the locking mechanism 52, and any other configurations may be employed.

The printing control portion 95 controls the remaining amount detecting portion 61 to detect the toner remaining amount in the accommodating portion 48 when, for example, the image forming operation is performed and the replenishment of the toner is performed. For example, the remaining amount detecting portion 61 emits light from the light emitting portion 61a and acquires a light detecting signal from the light receiving portion 61b while the toner stored in the accommodating portion 48 is being stirred by the stirring member 60. The remaining amount detecting portion 61 estimates the toner remaining amount based on the acquired light detection signal, and reports the estimated toner remaining amount to the print control portion 95. The print control portion 95 reports the toner remaining amount detected in this manner to the managing server 301 via the communication I/F 11. Instead of being sent directly to the managing server 301, the report of the toner remaining amount may be sent to the managing server 301 via the user terminal device 401.

As the toner is replenished, the toner remaining amount increases. By detecting the increase in the toner remaining amount based on the remaining amount information, as described above, the managing server 301 can recognize that the replenishing pack 200 which has been successfully authenticated before the replenishment is used by the user. Incidentally, instead of the managing server 301, the image forming apparatus 1 or the user terminal device 401 may detect the increase in the toner remaining amount and send a notification signal to the managing server 301 indicating that the replenishing pack 200 is used.

[4-5. Flow of Process]

In this section, some examples of a flow of process which may be performed in the replenishment managing system 300 according to the present Embodiment using sequence diagrams in FIG. 27 through FIG. 29 and flowchart diagrams in FIG. 30 and FIG. 31. Incidentally, in the description below, a processing step is abbreviated as S (step).

[4-5-1. Registration of Device Information]

FIG. 27 is a sequence diagram illustrating an example of a schematic flow of processes associated with the device registration. In the sequence shown in FIG. 27, the image forming apparatus 1, the managing server 301 and the user terminal device 401 are mainly involved. Incidentally, prior to a start of the sequence, it is assumed that the user's account information has already been registered in the account table 320 of the managing DB 313.

First, in S11, the user inputs the user ID and the password on the login screen provided by the application portion 440 of the user terminal device 401, for example. In S12, the application portion 440 sends the input user ID and the input password to the managing server 301 for the logging-in. In S13, the authenticating portion 370 of the managing server 301 performs the user authentication based on the received user ID and the received password. Here, it is assumed that the user authentication is successful and the logging-in to the system is established. Subsequent processes in FIG. 27 are performed while the login session continues.

In S14, the user inputs the device information including the device ID of the image forming apparatus 1 installed in the user's environment E1 on the device information input screen provided by the application portion 440, for example. In S15, the application portion 440 sends the device registration request including the input device information to the managing server 301. In S16, the data managing portion 350 registers the device information included in the received device registration request in the device registration table 330. In S17, the data managing portion 350 instructs the application portion 440 to show the message prompting the user to perform the predetermined operation on the image forming apparatus 1, and then the message is shown on the display device 415.

In S21, the user performs the predetermined operation on the user interface 13 of the image forming apparatus 1. Then, in S22, the lock control portion 96 of the image forming apparatus 1 reads out the device ID from the memory 12 and sends the device information including the read-out device ID to the managing server 301. In S23, the data managing portion 350 checks the device ID included in the device information received from the image forming apparatus 1 with the device ID registered to the device registration table 330 in S16. And if these device IDs correspond, then the data managing portion 350 updates the corresponding value of the "status" in the device registration table 330 to "verified". In S24, the data managing portion 350 notifies the application portion 440 of the user terminal device 401 of the result of the verification. The application portion 440 shows the notified verification result on the screen.

[4-5-2. Supply of the Replenishing Pack]

FIG. 28 is a sequence diagram illustrating some examples of a schematic flow of processes associated with supply of the replenishing pack to the user. In the sequence shown in FIG. 28, the image forming apparatus 1, the managing server 301 and the user terminal device 401 are mainly involved. Incidentally, the supply managing portion 360 of the managing server 301 continuously monitors the occurrence of the trigger events which trigger the supply of the replenishing pack 200 to the user. Here, a decrease in the toner remaining amount will be described as a first example of the trigger events, an order of the replenishing pack 200 by the user will be described as a second example, and the arrival of the supply timing based on the regular purchase agreement as a third example.

In the first example, in S31, the print control portion 95 of the image forming apparatus 1 detects the toner remaining amount in the accommodating portion 48 when, for example, the image forming operation is performed. It is assumed that the toner remaining amount is below a threshold value of the remaining amount which triggers the supply of the new replenishing pack 200. In S32, the print control portion 95 reports the remaining amount information indicating the detected toner remaining amount to the managing server 301. In S33, the supply managing portion 360 of the managing server 301 recognizes that the toner remaining amount of the image forming apparatus 1 is low, and allocates the new replenishing pack 200 to the user who owns the image forming apparatus 1. Allocating the replenishing pack 200 to the user may include adding a new record indicating the user ID and the pack ID identifying the replenishing pack 200 to the delivery pack table 340. In addition, the supply managing portion 360 sends the message instructing the delivery of the allocated replenishing pack 200 to the delivery representative. In S34, when the new replenishing pack 200 is shipped to the user, the supply managing portion 360 sends a shipping notification to the user terminal device 401.

In the second example, in S36, the user accesses a website which sells the replenishment pack 200 using, for example, the user terminal device 401, and orders the new replenishing pack 200. In S37, the user terminal device 401 sends order information indicating, for example, an ordered type and an ordered number of the replenishment pack 200 to the managing server 301. In S38, the supply managing portion 360 of the managing server 301 allocates the specified type and number of the replenishment packs 200 to the user, who is the purchaser, in response to the receiving of the order information. In addition, the supply managing portion 360 sends the message instructing the delivery of the allocated replenishing pack 200 to the delivery representative. When the replenishing pack 200 is shipped to the user, the supply managing portion 360 sends the shipping notification to the user terminal device 401 in S39.

In the third example, in S41, the supply managing portion 360 determines that the supply timing of the replenishing pack 200 has arrived for the user who has entered into the regular purchase agreement. In S42, the supply managing portion 360 allocates the new replenishing pack 200 for the user, whose supply timing has arrived. In addition, the supply managing portion 360 sends the message instructing the delivery of the allocated replenishing pack 200 to the delivery representative. When the replenishing pack 200 is shipped to the user, the supply managing portion 360 sends the shipping notification to the user terminal device 401 in S43.

[4-5-3. Authentication and the Replenishment of the Toner]

FIG. 29 is a sequence diagram illustrating a schematic flow of processes upon the toner replenishment. In the sequence shown in FIG. 29, the image forming apparatus 1, the managing server 301 and the user terminal device 401 are mainly involved. Incidentally, it is assumed that the new unused replenishing pack 200 has already been delivered to the user's environment E1 prior to a start of the sequence.

First, in S60, the user enters the user ID and the password on the login screen. In S61, the application portion 440 of the user terminal device 401 sends the input user ID and the input password to the managing server 301. In S62, the authenticating portion 370 of the managing server 301 performs the user authentication based on the received user ID and the received password. Here, it is assumed that the user authentication is successful and the logging-in to the system is established. Subsequent processes in FIG. 29 are performed while the login session continues.

In S65, the application portion 440 activates the code acquiring portion 430 in response to the operation by the user. The code acquiring portion 430 acquires the code 201 which is unique to the replenishing pack 200 by, for example, optically reading the code 201 using the camera 413 or receiving the user input. Next, in S66, the application portion 440 sends the unlock request including the code 201 acquired by the code acquiring portion 430 to the managing server 301.

The authenticating portion 370 of the managing server 301 begins the pre-replenishment authentication upon the receiving of the unlock request. S67 is a first step of the pre-replenishment authentication, and the authenticating portion 370 determines whether the replenishing pack 200 identified by the code 201 included in the unlock request has the correspondence to the user account of the logged-in user by referring to the delivery pack table 340. Here, it is assumed that the replenishing pack 200 has the correspondence to the user account, therefore the first step of the authentication is successful. In response to the success of the authentication of the first step, in S68, the authenticating portion 370 instructs the application portion 440 to show the message prompting the user to perform the predetermined operation on the apparatus to be replenished, and then the message is shown on the display device 415.

In S72, the user performs the predetermined operation on the user I/F 13 of the image forming apparatus 1 which is to be replenished. Then, in S73, the lock control portion 96 of the image forming apparatus 1 reads out the device ID from the memory 12 and sends the device information including the read-out device ID to the managing server 301. S74 is a second step of the pre-replenishment authentication, and the authenticating portion 370 determines, based on the device ID included in the received device information, whether the image forming apparatus 1 which is to be replenished has the correspondence to the user account of the logged-in user by referring to the device registration table 330. Here, it is assumed that the image forming apparatus 1 has the correspondence to the user account, therefore the second step of the authentication is also successful. In S75, the authenticating portion 370 notifies the user terminal device 401 of the result of the successful authentication in response to the success of the pre-replenishment authentication. In addition, in S76, the authenticating portion 370 sends the unlock instruction to the image forming apparatus 1 to have the locking mechanism 52 of the image forming apparatus 1 unlock the open/close mechanism 51.

Incidentally, the device information sent in S73 includes not only the device ID but also information to identify the apparatus to be replenished on the network, such as IP address thereof. By this it becomes possible for the managing server 301 to determine a target for sending the unlock instruction. In addition, by the operation being performed in S72, a communication connection using the HTTP protocol is established between the apparatus to be replenished and the managing server 301. By this, it becomes possible for the apparatus to be replenished to receive the unlock instruction from the managing server 301. In S77, the lock control portion 96 of the image forming apparatus 1 has the locking mechanism 52 unlock the open/close mechanism 51 in response to the receiving of the unlock instruction from the managing server 301. In S78, the unlocked open/close mechanism 51 is operated by the user (or automatically actuated), the replenishing passage 50 is opened and the replenishment of the toner from the replenishing pack 200 to the image forming apparatus 1 is performed. In S79, the print control portion 95 detects the toner remaining amount in the accommodating portion 48, and reports the remaining amount information indicating the toner remaining amount to the managing server 301. In S80, the data managing portion 350 of the managing server 301 updates the value of the "toner remaining amount" in a record of the device registration table 330 corresponding to the image forming apparatus 1 in response to the receiving of the remaining amount information. In addition, the data managing portion 350 changes the value of the "status" of the record in the delivery pack table 340 corresponding to the replenishing pack 200, which has been used, to "used".

Meanwhile, in S81, the lock control portion 96 of the image forming apparatus 1 locks the open/close mechanism 51 again after the predetermined unlock period elapses from the receiving of the unlock instruction or the unlock of the open/close mechanism 51.

Incidentally, as described above, only the pre-replenishment authentication for the replenishing pack 200 in S67 may be performed, and the pre-replenishment authentication for the image forming apparatus 1 in S74 may be omitted. In this case, the user operation in S72 and the sending of the device information in S73 may also be omitted. However, in a case in which the image forming apparatus 1 is turned off, the managing server 301 may instruct the user to turn on the image forming apparatus 1 in S68 since the image forming apparatus 1 cannot receive the unlock instruction from the managing server 301.

[4-5-4. Compatibility Authentication Process]

Here, the image forming apparatus 1, which has been described, is reworded as the image forming apparatus of registration-type 1, and the replenishing pack 200, which has been described, is reworded as the replenishing pack of registration-type 200. These image forming apparatus of registration-type 1 and the replenishing pack of registration-type 200 are managed by the managing server 301 based on the user account.

In addition, the image forming apparatus of registration-type 1 and the replenishing pack of registration-type 200 are the image forming apparatus and the replenishing pack for a predetermined service, such as the subscription service. In other words, here, the contract type described above is set to the subscription service. Here, the subscription service is, for example, a service in which the user registers the image forming apparatus to be used online in advance and pays a certain amount of money to a dealer, then the user becomes capable of performing a predetermined number of prints. The replenishing pack of registration-type 200 is automatically shipped to the user based on, for example, the toner remaining amount in the image forming apparatus of registration-type 1 becoming low or the arrival of the supply timing based on the contract of the subscription service, or arbitrarily shipped in response to the order by the user. In other words, the replenishing pack of registration-type 200 is the service-only replenishing pack which is shipped in accordance with the contract of the subscription service.

In addition, it is assumed that there are the standard image forming apparatus 500 and the standard replenishing pack 501 which has approximately the same configuration as the image forming apparatus of registration-type 1 and the replenishing pack of registration-type 200. These standard image forming apparatus 500 and the standard replenishing pack 501 are the image forming apparatus and the replenishing pack which are not subject to the predetermined service such as the subscription service. As described above, while the replenishing pack of registration-type 200 is a dedicated product which is shipped in accordance with the contract of the subscription service, the standard replenishing pack 501 is the replenishing pack which is sold in a general market, such as electronics retail stores or e-commerce sites. Incidentally, the image forming apparatus of registration-type 1 and the standard image forming apparatus 500 may be sold in the general market, such as the electronics retail stores and the e-commerce sites as usual, or may be made available for purchase at a direct sales site dedicated to a manufacturer, and an obtaining method is not limited to a particular way.

The standard image forming apparatus 500 has the same configuration as the image forming apparatus of registration-type 1 shown in FIG. 26. That is, the standard image forming apparatus 500 is provided with the communication I/F 11, the memory 12, the user I/F 13, the image forming portion 40, the open/close mechanism 51, the locking mechanism 52, and the processing circuit 90.

Next, the standard replenishing pack 501 and the replenishing pack of registration-type 200 will be described. The standard replenishing pack 501 has the same configuration as the replenishing pack of registration-type 200 shown in FIG. 5. On the other hand, the unique code 201, which is given to the replenishing pack of registration-type 200, is capable of uniquely identifying the replenishing pack of registration-type 200, and information, which is capable of identifying that the replenishing pack is the registration type, is given to the unique code 201. In addition, a unique code 502 is also given to the standard replenishing pack 501 (see FIG. 21).

And the unique code 502 is capable of uniquely identifying the standard replenishing pack, and information, which is capable of identifying that the replenishing pack is the standard type, is given to the unique code 502.

The user who owns the image forming apparatus of registration-type 1 may obtain the replenishing pack of registration-type 200 by subscribing to the subscription service described above. However, there is a possibility that the image forming apparatus of registration-type 1 and the standard image forming apparatus 500 exist in the same environment, such as when the same user also owns the standard image forming apparatus 500. In such a case, if the user is allowed to use the sent replenishing pack of registration-type 200 for the standard image forming apparatus 500 by mistake, it will be difficult to retrieve the toner from the standard image forming apparatus 500, which has been replenished at once. In addition, since the dealer has already sent the replenishing pack of registration-type 200 to the user, if the dealer has to send the new replenishing pack of registration-type 200 after receiving a call from the user, there is a possibility that a procedure may be complicated by charging the user an additional fee, etc. Furthermore, since there is a time lag before the new replenishing pack of registration-type 200 arrives at the user's location, the user cannot use the image forming apparatus of registration-type 1 during the time lag, resulting in an occurrence of a period during which the user cannot benefit from the subscription service. In other words, there is a case it may be preferable to be managed that, for the standard image forming apparatus 500, the standard replenishing pack 501 is usable and the replenishing pack of registration-type 200 is not usable.

On the other hand, there are cases in which the user, who owns the image forming apparatus of registration-type 1, wants to use the standard replenishing pack 501 for the image forming apparatus of registration-type 1. For example, it is the case when the user has signed the contract to receive the replenishing pack of registration-type 200 on a regular basis for a fixed price. If a print volume for a certain period temporarily increases, there may be a case in which the toner in the image forming apparatus of registration-type 1 runs out before the next replenishing pack of registration-type 200 is sent in accordance with the contract of the subscription service. In that case, the user may want to use the standard replenishing pack 501, which is readily available, temporarily. In other words, it is preferable that, for the image forming apparatus of registration-type 1, both the standard replenishing pack 501 and the replenishing pack of registration-type 200 be usable.

In summary, the combination of the image forming apparatus and the replenishing pack as shown in Table 1 above is preferable.

The managing server 301 executes a compatibility authentication process, which will be described hereinafter, to achieve the combination of the image forming apparatus and the replenishing pack shown in Table 1. FIG. 30 is a flowchart diagram illustrating an example of a flow of the compatibility authentication process performed by the managing server 301. This compatibility authentication process may be realized, for example, by the processing circuit 314 executing a computer program, which is stored in the memory 312 of the managing server 301 in advance.

In the following, it is assumed that a case in which the image forming apparatus of registration-type 1 and the standard image forming apparatus 500 are installed in the user's environment E1, connected to a network, and managed by the managing server 301. Hereinafter, the processes of the managing server 301 will be described in detail using the flowchart of FIG. 30.

First, in S111, the authenticating portion 370 receives the input user ID and the input password, which are input on the login screen. Next, in S113, the authenticating portion 370 performs the user authentication based on the received user ID and the received password. Here, it is assumed that the user authentication is successful, and a flow of processes for a case in which the user authentication is failed will be omitted.

Next, in S115, the authenticating portion 370 receives the code 201 unique to the replenishing pack of registration-type 200 or the code 502 unique to the standard replenishing pack 501, which is acquired in the user's environment E1.

Next, in S116, the authenticating portion 370 determines whether the replenishing pack is the replenishing pack of registration-type 200 or the standard replenishing pack 501 based on the received code (201, 502). If the authenticating portion 370 determines in S116 that the replenishing pack to be used is the standard replenishing pack 501, the managing server 301 proceeds the process to S125. The details for the flow in this case will be described below.

On the other hand, if the authenticating portion 370 determines in S116 that the replenishment pack to be used is the replenishing pack of registration-type 200, then in S117, the authenticating portion 370 determines whether the replenishing pack of registration-type 200 identified based on the received code 201 has correspondence with the user account of the logged-in user. For example, if the association between the pack ID based on the received code 201 and the user ID of the logged-in user is registered in the delivery pack table 340, it is determined that the replenishing pack of registration-type 200 is an object of which the use can be permitted (e.g., that the replenishing pack of registration-type 200 is supplied through a legitimate channel), and the process is proceeded to S121. On the other hand, if the association between the pack ID based on the received code 201 and the user ID of the logged-in user is not registered in the delivery pack table 340, it is determined that the replenishing pack of registration-type 200 is not an object of which the use can be permitted, and the process is proceeded to S119.

In S119, since it is determined that the replenishing pack of registration-type 200 is not an object of which the use can be permitted, the authenticating portion 370 determines not to permit the replenishment of the toner from the replenishing pack of registration-type 200. In this case, the authenticating portion 370 sends an authentication result notification to the user terminal device 401 indicating that the use is not permitted for the replenishing pack of registration-type 200 and that the pre-replenishment authentication failed.

In S121, the authenticating portion 370 determines whether the status of the replenishing pack of registration-type 200 identified by the received code 201 is "unused" by referring to the delivery pack table 340. If the status is "unused", then the process is proceeded to S125. On the other hand, if the status is "used", then the process is proceeded to S123.

In S123, since the replenishing pack of registration-type 200 has already been used, the authenticating portion 370 determines not to permit the replenishment of the toner from the replenishing pack of registration-type 200. In this case, the authenticating portion 370 sends the authentication result notification to the user terminal device 401 as a notification signal indicating that the pre-replenishment authentication failed because the replenishing pack of registration-type 200 has already been used.

If the replenishing pack of registration-type 200 identified by the received code 201 is the object of which the use can be permitted and has not been used then, in S125, the authenticating portion 370 instruct the user to perform a predetermined operation on the apparatus to be replenished (e.g., by displaying a message on a screen). The predetermined operation is, for example, pressing a button provided on the apparatus to be replenished, etc. By this operation, the communication connection between the managing server 301 and the apparatus to be replenished is established using the HTTP protocol. Next, in S127, the authenticating portion 370 receives the device information including the device ID from the image forming apparatus of registration-type 1 or the standard image forming apparatus 500, which is the apparatus to be replenished. At this time, the authenticating portion 370 also receives information associated with a type (model) of the apparatus indicating whether the apparatus to be replenished is the image forming apparatus of registration-type 1 or the standard image forming apparatus 500, as the device information.

In S128, the authenticating portion 370 performs the same determination process as in S116. In other words, the authenticating portion 370 determines whether the replenishing pack to be used is the replenishing pack of registration-type 200 or the standard replenishing pack 501 based on the received code (201, 502). If the authenticating portion 370 determines in S128 that the replenishing pack to be used is the standard replenishing pack 501, the managing server 301 proceeds the process to S133. On the other hand, if the authenticating portion 370 determines in S128 that the replenishing pack to be used is the replenishing pack of registration-type 200, the managing server 301 proceeds the process to S129.

Here, as explained using Table 1, the authenticating portion 370 permits the use of standard replenishing pack 501 for both the image forming apparatus of registration-type 1 and the standard image forming apparatus 500. Therefore, if it is determined in S128 that the replenishing pack to be used is the standard replenishing pack 501, the managing server 301 proceeds to S133 regardless of the type of the apparatus and sends the unlock instruction to the image forming apparatus of registration-type 1 or the standard image forming apparatus 500. The unlock instruction is an instruction to unlock the lock of the open/close mechanism 51 by the locking mechanism 52 of the image forming apparatus of registration-type 1 or the standard image forming apparatus 500. In addition, the authenticating portion 370 sends the authentication result notification indicating that the authentication is successful to the user terminal device 401 along with the sending of the unlock instruction.

Incidentally, the managing server 301 can determine a target for sending the unlock instruction since the managing server 301 has received information to identify the apparatus to be replenished on the network, such as the IP address as well as the device ID in S127. In addition, since the communication connection using the HTTP protocol has already been established between the apparatus to be replenished and the managing server 301, the apparatus to be replenished can receive the unlock instruction from the managing server 301. After the apparatus to be replenished receives the unlock instruction, the communication connection using the HTTP protocol between the apparatus to be replenished and the managing server 301 is terminated.

Next, in S129, the authenticating portion 370 first determines whether or not to permit the use of the replenishing pack of registration-type 200, depending on the type (model) of the apparatus to be replenished, to which the replenishing pack of registration-type 200 is used. As described above using Table 1, if the authenticating portion 370 receives a request for permission to use the replenishing pack of registration-type 200 for the image forming apparatus of registration-type 1, the authenticating portion 370 permits the use of the replenishing pack of registration-type 200. On the other hand, if the authenticating portion 370 receives a request for permission to use the replenishing pack of registration-type 200 for the standard image forming apparatus 500, the authenticating portion 370 does not permit the use of the replenishing pack of registration-type 200. After the determination that the use of the replenishing pack of registration-type 200 is not permitted by the authenticating portion 370, the managing server 301 proceeds the process to S131. The process of S131 will be described in detail below.

Here, in the case in which the replenishing pack of registration-type 200 is used for the image forming apparatus of registration-type 1, the authenticating portion 370 further performs the following determination process. The authenticating portion 370 determines whether the apparatus to be replenished identified by the received device ID is already registered as an apparatus of the logged-in user. For example, if association between the received device ID and the user ID of the logged-in user is registered in the device registration table 330, then the apparatus to be replenished is already registered as the apparatus of the logged-in user, therefore the process is proceeded to S133. On the other hand, if the association between the received device ID and the logged-in user ID is not registered in the device registration table 330, then the apparatus to be replenished is not registered as the apparatus of the logged-in user, therefore the process is proceeded to S131.

In S131, the authenticating portion 370 determines not to permit the replenishment of the toner to the apparatus since the apparatus to be replenished is not registered as the apparatus of the logged-in user. In this case, the authenticating portion 370 sends the authentication result notification to the user terminal device 401 indicating that the pre-replenishment authentication failed due to the no registration of the apparatus.

In addition, as explained in S129, the authenticating portion 370 does not permit the replenishing pack of registration-type 200 to be used for the standard image forming apparatus 500. In this case, the authenticating portion 370 may not only send an authentication result notification to the user terminal device 401, but may also show a message on the user terminal device 401 indicating that the replenishing pack, which is subject to the authentication, and the image forming apparatus are incompatible. In other words, the display device 415 as the display portion of the user terminal device 401 may display the message indicating that the replenishing pack of registration-type 200 is not compatible with the standard image forming apparatus 500.

In S133, the authenticating portion 370 determines to permit the replenishment of the toner from the replenishing pack of registration-type 200 to the image forming apparatus of registration-type 1 since the apparatus to be replenished has already been registered as the apparatus of the logged-in user. In this case, the authenticating portion 370 sends the unlock instruction to the locking mechanism 52 of the image forming apparatus of registration-type 1 to unlock the open/close mechanism 51, and also sends an authentication result notification indicating that the authentication is successful to the user terminal device 401. Incidentally, although not shown in FIG. 30, in S133, the authenticating portion 370 may permit the replenishment of the toner to the apparatus to be replenished, only when the remaining amount indicates that the toner remaining amount in the apparatus to be replenished is below a predetermined remaining amount threshold value, as described above. In addition, in cases in which it is determined that the replenishment of the toner to the apparatus to be replenished is not permitted in S119, S123 and S131, the authenticating portion 370 of the managing server 301 does not send the unlock instruction to the locking mechanism 52, therefore the open/close mechanism remains in the locking state. Thus, the replenishment from the replenishing pack of registration-type 200 to the image forming apparatus of registration-type 1 or the standard image forming apparatus 500 is restricted.

Incidentally, in the flowchart of FIG. 30, in the case in which it is determined that the replenishing pack to be used is the standard replenishing pack 501, the managing server 301 omits the determination process in S121 and S129. However, it is not limited to this configuration.

For example, the process of S121 may be performed by the managing server 301 having the delivery pack table 340 store the pack ID based on the code 502 of the standard replenishing pack 501. In other words, even if the pack is the standard replenishment pack 501, if the "status" of the corresponding pack ID is "used", then the use of the standard replenishment pack 501 is not permitted (S123). On the other hand, if the "status" of the corresponding pack ID is "unused", then the use of the standard replenishment pack 501 is determined to be permitted and the process may be proceeded to S125. Then, after the processes of S125, S127 and S128, the process of S133 described above may be performed.

In addition, since the standard image forming apparatus 500 is not subject to the subscription service, it is assumed that the standard image forming apparatus 500 is not registered in the device registration table 330. However, it is possible that the standard image forming apparatus 500 is also registered in the device registration table 330 for a purpose, such as product warranty service, other than the subscription service. Therefore, even if it is determined that the replenishing pack to be used is the standard replenishing pack 501, the managing server 301 may perform the process of S129. In other words, if the image forming apparatus of registration-type 1 or the standard image forming apparatus 500 corresponding to the notified device ID is not registered in the device registration table 330, the use of the standard replenishing pack 501 is not permitted (S131). On the other hand, if the image forming apparatus of registration-type 1 or the standard image forming apparatus 500 corresponding to the notified device ID is registered in the device registration table 330, the use of the standard replenishing pack 501 may be determined to be permitted (S133).

Incidentally, in the flowchart of FIG. 30, the flow is configured that the processes of S111 and S113 are performed even if the user is using the standard image forming apparatus 500. However, it is not limited to this configuration.

Basically, since a user who is using the standard image forming apparatus 500 is not required to subscribe to the subscription service, the user registration is not mandatory. Therefore, S111 and S113 may be omitted and the user authentication may be omitted. In this case, the application portion 440 may set up a guest account for the user using the user terminal device 401 in order to send the code 502 of the standard replenishing pack 501 to the managing server 301. The guest account is an account which allows the user to temporarily use an application without the user registration.

[4-5-5. Lock Control Process]

FIG. 31 is a flowchart diagram illustrating an example of a flow of a lock control process performed by the image forming apparatus of registration-type 1 or the standard image forming apparatus 500. The lock control process of FIG. 31 corresponds to the process performed by the lock control portion 96 of the image forming apparatus of registration-type 1 or the standard image forming apparatus 500 from S72 through S81 of FIG. 29. This lock control process can be realized, for example, by the processing circuit 90 executing the computer program stored in advance in the memory 12 of the image forming apparatus of registration-type 1 or the standard image forming apparatus 500.

First, in S211, the lock control portion 96 detects the predetermined input signal. The input signal here may be, for example, an ID sending request received from the user terminal device 401 via the communication I/F 11 or a user input signal detected via the user I/F 13. In S213, the lock control portion 96 reads out the device ID from the memory 12 in response to the detection of the predetermined input signal and sends the device information including the read-out device ID to the managing server 301. Next, in S215, the lock control portion 96 begins a wait for receiving the unlock instruction, which is the control signal based on the result of the pre-replenishment authentication.

In S217, the lock control portion 96 determines whether the predetermined waiting period has expired, for example, by referring to a value of a timer which starts at the beginning of the wait. If the waiting period has expired, the process is proceeded to S237. On the other hand, if the waiting period has not expired, the process is proceeded to S219.

In S219, the process branches off depending on whether or not the unlock instruction is received from the managing server 301. If the unlock instruction is received from the managing server 301, the process is proceeded to S221. If the unlock instruction is not received, the process returns to S217.

In S221, the lock control portion 96 causes the locking mechanism 52 to unlock the open/close mechanism 51 in response to the unlock instruction received from the managing server 301. Next, in S223, the lock control portion 96 waits until the expiration of the unlock period, for example, using a timer which starts when the open/close mechanism 51 is unlocked. In the meantime, in S225, the lock control portion 96 monitors the operation of the open/close mechanism 51 by the user. When the open/close mechanism 51 is operated by the user and the replenishing passage 50 is opened, the process is proceeded to S227.

In S227, the lock control portion 96 sends an operation notification to the managing server 301 indicating that the replenishing passage 50 is opened. In addition, in S229, the remaining amount detecting portion 61 detects the toner remaining amount in the accommodating portion 48. In S231, the print control portion 95 reports the toner remaining amount detected by the remaining amount detecting portion 61 to the managing server 301. The detection and the reporting of the toner remaining amount in S229 and S231 may be repeated until the unlock period in S233 is determined to have expired.

If the unlock period is determined to have expired in S223 or S233, the lock control portion 96 causes the locking mechanism 52 to lock the open/close mechanism 51 again in S235. In addition, in S237, the lock control portion 96 terminates the wait for the receiving of the control signal from the external device. The lock control process of FIG. 31 is then terminated.

The present Embodiment is summarized hereinafter. The replenishment managing system 300 as a replenishing system is provided with the image forming apparatus of registration-type 1, the standard image forming apparatus 500, the replenishing pack of registration-type 200, the standard replenishment pack 501, and the managing server 301 as a server including the authenticating portion 370.

A first account of a first user and a second account of a second user, which is different from the first account, are registered in the account table 320 of the managing server 301. The image forming apparatus of registration-type 1 as a first image forming apparatus is associated with the first user. The standard image forming apparatus 500 as a second image forming apparatus is associated with the second user. These first account and the second account differ, inter alia, in the "contract type". Specifically, the first account is subscribed to the subscription service and the second account is not subscribed to the subscription service.

The image forming apparatus of registration-type 1 is provided with the accommodating portion 48 as a first accommodating portion for accommodating the consumable agent consumed for the image formation, and the replenishing passage 50 as a first replenishing passage for replenishing the consumable agent from the replenishing pack to the accommodating portion 48. In addition, the image forming apparatus of registration-type 1 is provided with the open/close mechanism 51 as a first opening/closing portion for opening/closing the replenishing passage 50. The locking position as a first restricting position is a position for restricting that the open/close mechanism 51 is opened, and the unlocking position as a first permitting position is a position for permitting that the open/close mechanism 51 is opened.

In addition, the image forming apparatus of registration-type 1 is provided with the lock member 152 as a first restricting portion, which is movable between the locking position and the unlocking position, and the solenoid 155 as a first actuator, which moves the lock member 152 between the locking position and the unlocking position. The open/close mechanism 51 is provided with the main body shutter 116 as a first apparatus shatter and the operating portion 811 as a first operating portion for opening/closing the main body shutter 116. The lock member 152 restricts the moving of the operating portion 811 in the locking position and permits the moving of the operating portion 811 in the unlocking position.

Similarly, the standard image forming apparatus 500 is provided with the accommodating portion 48 as a second accommodating portion for the consumable agent consumed for the image formation, and the replenishing passage 50 as a second replenishing passage for replenishing the consumable agent from the replenishing pack to the accommodating portion 48. In addition, the standard image forming apparatus 500 is provided with the open/close mechanism 51 as a second opening/closing portion for opening/closing the replenishing passage 50. The locking position as a second restricting position is a position for restricting that the open/close mechanism 51 is opened, and the unlocking position as a second permitting position is a position for permitting that the open/close mechanism 51 is opened. In addition, the standard image forming apparatus 500 is provided with the lock member 152 as a second restricting portion, which is movable between the locking position and the unlocking position, and the solenoid 155 as a second actuator, which moves the lock member 152 between the locking position and the unlocking position. The open/close mechanism 51 is provided with the main body shutter 116 as a second apparatus shutter, and the operating portion 811 as a second operating portion for opening/closing the main body shutter 116.

The replenishing pack of registration-type 200 as a first accommodating device is provided with the unique code 201 as a first authentication information. The standard replenishing pack 501 as a second accommodating device is provided with the unique code 502 as a second authentication information, which is different from the first authentication information. The authenticating portion 370 as an authenticating means outputs the unlock instruction (S76) as an authentication signal based on a fact that the information about the code 201 or the code 502 (first identification information) is input by the first user, or that the information about the code 502 is input by the second user. In addition, the authenticating portion 370 does not output the unlock instruction (S76) when the information about code 201 is input by the second user.

When focusing on the managing server 301 as an information processing apparatus, the managing server 301 is provided with the communication I/F as an acquiring means, the authenticating portion 370 as a determining means, and the device registration table 330 as a storing means. Before the replenishment pack (including the replenishing pack of registration-type 200 and the standard replenishing pack 501) is used for the image forming apparatus (the image forming apparatus of registration-type 1 and the standard image forming apparatus 500), the communication I/F acquires the first identification information identifying whether the replenishment pack is the replenishing pack of registration-type 200 or the standard replenishing pack 501. The authenticating portion 370 determines whether or not to permit the use of the replenishing pack based on the first identification information (S66) and a second identification information (S73) to identify whether the target (apparatus), to which the replenishing pack is mounted and the consumable agent is replenished, is the image forming apparatus of registration-type 1 or the standard image forming apparatus 500.

The device registration table 330 stores information about the image forming apparatus, which is subject to a predetermined service, such as the subscription service. For example, it is assumed that, in the device registration table 330, information regarding a fact that the image forming apparatus of registration-type 1 is subject to the predetermined service is stored, and information regarding a fact that the standard image forming apparatus 500 is subject to the predetermined service is not stored. In this case, the authenticating portion 370 permits the use of the replenishing pack in the case in which the replenishing pack of registration-type 200 is used for the image forming apparatus of registration-type 1, and in the case in which the standard replenishing pack 501 is used for the image forming apparatus of registration-type 1. In addition, the authenticating portion 370 does not permit the use of the replenishing pack in the case in which the replenishing pack of registration-type 200 is used for the standard image forming apparatus 500, and permits the use of the replenishing pack in the case in which the standard replenishing pack 501 is used for the standard image forming apparatus 500.

And the solenoid 155 of the image forming apparatus of registration-type 1 moves the lock member 152 from the locking position to the unlocking position in the case in which the unlock instruction is input to the image forming apparatus of registration-type 1, i.e., in the case in which the use of the replenishing pack is permitted. The solenoid 155 of the standard image forming apparatus 500 moves the lock member 152 from the locking position to the unlocking position in the case in which the unlock instruction is input to the standard image forming apparatus 500, i.e., in the case in which the use of the replenishing pack is permitted. In addition, the solenoid 155 keeps the lock member 152 in the locking position in the case in which the unlock instruction is not input to the standard image forming apparatus 500, i.e., in the case in which the use of the replenishing pack is not permitted.

Further, a first condition is defined that the replenishment pack of registration-type 200 has not been used, and a second condition is defined that the standard replenishing pack 501 has not been used. In this case, the authenticating portion 370 outputs the unlock instruction based on facts that the first condition and the second condition is met and information about the code 201 or the code 502 is input by the first user, or facts that the second condition is met and information about the code 502 is input by the second user. In addition, the authenticating portion 370 does not output the unlock instruction in a case in which the first condition or the second condition is not met and either the information about the code 201 or the information about the code 502 is input by either the first user or the second user. In other words, the authenticating portion 370 does not permit the use of the replenishing pack even in the case in which the replenishing pack of registration-type 200 is used for the image forming apparatus of registration-type 1, in the case in which the standard replenishing pack 501 is used for the image forming apparatus of registration-type 1, and in the case in which the standard replenishing pack 501 is used for the standard image forming apparatus 500, if the replenishing pack has already been used. Incidentally, the information regarding the code 201 and the information regarding the code 502 are sent to the authenticating portion 370 via the user terminal device 401.

As described above, in the present Embodiment, the combination of usability shown in Table 1 can be realized since the managing server 301 performs the authentication of the correspondence between the image forming apparatus and the replenishing pack. Thus, in the image forming apparatus of the replenishing method, it becomes possible to suppress that the accommodating device for replenishing the consumable agent, which is provided through the predetermined service, is used by the image forming apparatus which is not subject to the predetermined service. In addition, it becomes possible to provide a scheme which improves usability of the image forming apparatus.

OTHER EMBODIMENTS

Incidentally, in the Embodiments described above, the process, in which the user terminal device 401 reads the code 201 such as a bar code or a QR code (registered trademark) and send the read information to the managing server 301, is described. However, the acquiring means for acquiring the information of the replenishing pack 200 is not limited to this configuration. For example, it may be configured that the replenishing pack 200 is provided with a tag memory, which may contain the production number, the serial number, and even information which distinguishes whether the replenishing pack 200 is the registration-type or the standard-type. And the image forming apparatus 1, on which the replenishing pack 200 is mounted, may then read the information from the tag memory and send the read information to the managing server 301. According to this configuration, it becomes possible to improve usability since the user no longer need to use the user terminal device 401 to perform the compatibility authentication process.

Furthermore, it may be configured that the code 201 is printed on the surface of the pouch portion 211 of the replenishing pack of registration-type 200 or on the package thereof in the optically readable format, but the code 502 not on the standard replenishing pack 501. And, instead, it may be configured that the standard replenishing pack 501 is provided with the tag memory described above and the compatibility authentication process is automatically performed when the standard replenishment pack 501 is mounted on the image forming apparatus of registration-type 1 or the standard image forming apparatus 500. In this case, while it is needed for a specific user, who uses the replenishing pack of registration-type 200, to use the user terminal device 401 to perform the compatibility authentication process, it becomes no need for a general user, who uses the standard replenishing pack 501 to install an application, etc. to the user terminal device 401 to perform the compatibility authentication process. As a result, it becomes possible to improve the usability for the general user who use the standard replenishing pack 501 only for the standard image forming apparatus 500.

In addition, in any of the aforementioned Embodiments, the locking mechanism 150 is configured to restrict or permit the rotation of the operating portion, however, it is not limited to this configuration. For example, instead of the configuration in which the locking mechanism 150 transitions from the locking state to the unlocking state, it may be configured that either of the operating portion, the pack shutter or the main body shutter rotates so as to open the replenishing passage.

In addition, in any of the aforementioned Embodiments, it is described with using the image forming apparatus of the electrophotographic method, however, the present invention is not limited to this configuration. For example, the present invention can also be applied to an image forming apparatus of inkjet method which forms an image on a sheet by ejecting ink solution from a nozzle. In this case, the consumable agent consumed by the image forming apparatus by forming an image is ink, and the replenishing pack accommodates the ink.

The present invention may also be realized by a process in which a program realizing one or more functions of the Embodiments described above is provided to the system or to the apparatus via a network or a storage medium, and one or more processors in a computer of the system or of the apparatus read out and execute the program. In addition, the present invention may also be realized by a circuit which realizes one or more functions (e.g., ASIC).

INDUSTRIAL APPLICABILITY

A replenishing system, which can suppress a use of an accommodating device for replenishing a consumable agent by an image forming apparatus which is not subject to a predetermined service, is provided.

The present invention is not limited to the Embodiments described above, and various changes and variations are possible without departing from the spirit and the scope of the present invention. Accordingly, the following claims are appended to make public the scope of the present invention.

This application claims priority based on Japanese Patent Application No. 2021-130309 filed on Aug. 6, 2021 and Japanese Patent Application No. 2021-196005 filed on Dec. 2, 2021, all of which are hereby incorporated herein by reference.

The invention claimed is:

1. A replenishing system comprising:
   a first image forming apparatus including a first image forming portion for forming an image on a recording material with a consumable agent, a first accommodating portion for accommodating the consumable agent and a first mounting port;
   a second image forming apparatus including a second image forming portion for forming an image on a recording material with a consumable agent, a second accommodating portion for accommodating the consumable agent and a second mounting port different from the first mounting port in a shape;
   a first accommodating device provided with a first interface portion and configured to accommodate a consumable agent consumed for image formation; and
   a second accommodating device provided with a second interface portion different from the first interface portion in a shape and configured to accommodate a consumable agent consumed for the image formation,
   wherein the first interface portion is mountable on the first mounting port, the consumable agent accommodated by the first accommodating device is capable of being replenished to the first accommodating portion and the second interface portion is not mountable on the first mounting port, and
   wherein each of the first interface portion and the second interface portion is mountable on the second mounting port, the consumable agent accommodated by the first accommodating device and the consumable agent accommodated by the second accommodating device are capable of being replenished to the second accommodating portion.

2. A replenishing system according to claim 1, wherein the first mounting port includes a first groove,
   the first interface portion includes a first projecting portion for engaging the first groove while the first interface portion is mounted on the first mounting port,
   the second mounting port includes a second groove and a third groove disposed at a position different from the second groove,
   the second interface portion includes a second projecting portion for engaging with the second groove and a third projecting portion for engaging the third groove while the second interface portion is mounted on the second mounting port,
   the first interface portion is mountable on the second mounting port without interfering of the first projection portion with the second groove and the third groove, and
   the second interface portion is not mountable on the first mounting port by interfering of the third projection portion with the first mounting port.

3. A replenishing system according to claim 2, wherein the first projecting portion, the second projecting portion and the third projecting portion extend in a direction crossing a mounting direction of the first accommodating device and the second accommodating device, respectively.

4. A replenishing system according to claim 2, wherein the first image forming apparatus includes a first open/close portion capable of opening and closing a first replenishing passage of the consumable agent from the first accommodating device to the first accommodating portion, and
   wherein the second image forming apparatus includes a second open/close portion capable of opening and closing a second replenishing passage of the consumable agent from the second accommodating device to the second accommodating portion.

5. A replenishing system according to claim 4, wherein the first image forming apparatus includes a first restricting portion movable between a first restricting position for restricting the first open/close portion to be opened and a first permitting position for permitting the first open/close portion to be opened, and
   wherein the second image forming apparatus includes a second restricting portion movable between a second restricting position for restricting the second open/close portion to be opened and a second permitting position for permitting the second open/close portion to be opened.

6. A replenishing system according to claim 5, wherein the first image forming apparatus includes a first moving member moved to a first position by the first projecting portion inserted into the first groove being pressed,
  the second image forming apparatus includes a second moving member moved to a second position by the second projecting portion inserted into the second groove being pressed,
  the first restricting portion is moved from the first restricting position to the first permitting position based on movement of the first moving member to the first position, and
  the second restricting portion is moved from the second restricting position to the second permitting position based on movement of the second moving member to the second position.

7. A replenishing system according to claim 2, wherein the first interface portion includes a first open/close portion capable of opening and closing a first replenishing passage of the consumable agent from the first accommodating device to the first accommodating portion, and
  wherein the second interface portion includes a second open/close portion capable of opening and closing a second replenishing passage of the consumable agent from the second accommodating device to the second accommodating portion.

8. A replenishing system according to claim 1, wherein the first mounting port includes a first groove having a first width,
  the first interface portion includes a first projecting portion for engaging the first groove while the first interface portion is mounted on the first mounting port,
  the second mounting port includes a second groove having a second width wider than the first width,
  the second interface portion includes a second projecting portion for engaging the second groove while the second interface portion is mounted on the second mounting port,
  the second projecting portion has a third width wider than the first width and narrower than the second width,
  the first interface portion is mountable on the second mounting port without interfering of the first projection portion with the second groove, and
  the second interface portion is not mountable on the first mounting port by interfering of the second projection portion with the first groove.

9. A replenishing system according to claim 8, wherein the first projecting portion and the second projecting portion extend in a direction crossing a mounting direction of the first accommodating device and the second accommodating device, respectively.

10. A replenishing system according to claim 1, wherein the first interface portion is provided on a downstream end with respect to a mounting direction of the first accommodating device, and
  wherein the second interface portion is provided on a downstream end with respect to a mounting direction of the second accommodating device.

11. A replenishing system according to claim 1, wherein the first interface portion is provided on a lower end of the first accommodating device in a state of being mounted on the first mounting port, and
  wherein the second interface portion is provided on a lower end of the second accommodating device in a state of being mounted on the second mounting port.

12. A replenishing system according to claim 1, wherein at least a part of the first accommodating device is exposed to outside the first image forming apparatus in a state of being mounted on the first image forming apparatus, and
  wherein at least a part of the second accommodating device is exposed to outside the second image forming apparatus in a state of being mounted on the second image forming apparatus.

13. A replenishing system comprising:
  a first image forming apparatus including a first image forming portion for forming an image on a recording material with a consumable agent, a first accommodating portion for accommodating the consumable agent, a first mounting port and a first open/close portion capable of opening and closing a first replenishing passage of the consumable agent from the first mounting port to the first accommodating portion;
  a second image forming apparatus including a second image forming portion for forming an image on a recording material with a consumable agent, a second accommodating portion for accommodating the consumable agent, a second mounting port and a second open/close portion capable of opening and closing a second replenishing passage of the consumable agent from the second mounting port to the second accommodating portion;
  a first accommodating device and a second accommodating device configured to accommodate the consumable agent consumed for image formation;
  an acquiring means for acquiring code inherent to the first accommodating device and the second accommodating device, respectively; and
  a server apparatus configured to perform authentication of the first accommodating device and the second accommodating device based on the code acquired by the acquiring means,
  wherein the server apparatus permits to open the first replenishing passage by moving the first open/close portion in a case in which the first accommodating device is used for the first image forming apparatus and in a case in which the second accommodating device is used for the first image forming apparatus, and
  wherein the server apparatus does not permit to open the second replenishing passage in a case in which the first accommodating device is used for the second image forming apparatus and permits to open the second replenishing passage by moving the second open/close portion in a case in which the second accommodating device is used for the second image forming apparatus.

14. A replenishing system according to claim 13, wherein the server apparatus receives account information of a user, and
  wherein the authentication performed by the server apparatus includes determination whether an accommodating device identified by the code has a corresponding relationship to an account indicated by the account information.

15. A replenishing system according to claim 14, further comprising a database showing a relationship between each account and at least one accommodating device provided to the user having the account,
  wherein the server apparatus determines that the accommodating device has the corresponding relationship to the account in a case in which the accommodating device identified by the code is related to the account shown by the account information.

16. A replenishing system according to claim 15, wherein the first image forming apparatus and the second image forming apparatus store device identification information for identifying an image forming apparatus in advance, and send the device identification information to the server apparatus in a case of detecting a predetermined input signal, and wherein the authentication performed by the server apparatus further includes determination whether the image forming apparatus identified by the device identification information has the corresponding relationship to the account.

17. A replenishing system according to claim 16, wherein the database shows the relationship between each account and at least one image forming apparatus registered as an apparatus of the user having the account, and wherein the server apparatus determines that the image forming apparatus has the corresponding relationship to the account in a case in which the image forming apparatus identified by the device identification information is related to the account shown by the account information.

18. A replenishing system according to claim 17, wherein the predetermined input signal is a user input signal detected through a user interface of the first image forming apparatus or the second image forming apparatus.

19. A replenishing system according to claim 13, wherein the code is an optically readable code printed on the accommodating device or a package of the accommodating device, and wherein the acquiring means acquires the code by optically reading the code.

20. A replenishing system according to claim 13, wherein the acquiring means acquires the code inputted by a user through a user interface.

21. A replenishing system according to claim 13, wherein the server apparatus does not permit opening the first replenishing passage in a case in which the accommodating device has been used even when the first accommodating device is used to the first image forming apparatus or the second accommodating device is used to the first image forming apparatus.

22. A replenishing system according to claim 13, wherein the first image forming apparatus includes a first restricting portion movable between a first restricting position for restricting the first open/close portion to be opened and a first permitting position for permitting the first open/close portion to be opened, a first actuator for moving the first restricting portion between the first restricting position and the first permitting position, and a first controlling portion for controlling the first actuator, wherein the second image forming apparatus includes a second restricting portion movable between a second restricting position for restricting the second open/close portion to be opened and a second permitting position for permitting the second open/close portion to be opened, a second actuator for moving the second restricting portion between the second restricting position and the second permitting position, and a second controlling portion for controlling the second actuator, wherein the first controlling portion controls the first actuator to move the first restricting portion from the first restricting position to the first permitting position in a case in which the server apparatus permits opening the first replenishing passage, and wherein the second controlling portion controls to hold the second restricting portion to the second restricting position in a case in which the server apparatus does not permit opening the second replenishing passage, and the second controlling portion controls the second actuator to move the second restricting portion from the second restricting position to the second permitting position in a case in which the server apparatus permits opening the second replenishing passage.

23. A replenishing system according to claim 13, wherein the first image forming apparatus includes a first actuator for moving the first open/close portion and a first controlling portion for controlling the first actuator, wherein the second image forming apparatus includes a second actuator for moving the second open/close portion and a second controlling portion for controlling the second actuator, wherein the first controlling portion controls the first actuator to move the first open/close portion in a case in which the server apparatus permits opening the first replenishing passage, and wherein the second controlling portion does not move the second open/close portion in a case in which the server apparatus does not permit opening the second replenishing passage, and the second controlling portion controls the second actuator to move the second open/close portion in a case in which the server apparatus permits opening the second replenishing passage.

* * * * *